United States Patent [19]
Tremblay et al.

[11] Patent Number: 6,038,643
[45] Date of Patent: Mar. 14, 2000

[54] STACK MANAGEMENT UNIT AND METHOD FOR A PROCESSOR HAVING A STACK

[75] Inventors: Marc Tremblay, Palo Alto; James Michael O'Connor, Mountain View, both of Calif.

[73] Assignee: Sun Microsystems, Inc., Palo Alto, Calif.

[21] Appl. No.: 08/787,736

[22] Filed: Jan. 23, 1997

Related U.S. Application Data

[63] Continuation-in-part of application No. 08/642,253, May 2, 1996, abandoned.

[60] Provisional application No. 60/010,527, Jan. 24, 1996.

[51] Int. Cl.[7] .................................................. G06F 13/00
[52] U.S. Cl. .................................................. 711/132
[58] Field of Search .................................................. 711/132

[56] References Cited

U.S. PATENT DOCUMENTS

| | | | |
|---|---|---|---|
| 3,810,117 | 5/1974 | Healey | 711/3 |
| 3,878,513 | 4/1975 | Werner | 711/154 |
| 3,889,243 | 6/1975 | Drimak | 711/132 |
| 3,924,245 | 12/1975 | Eaton et al. | 711/219 |
| 4,268,903 | 5/1981 | Miki et al. | 711/220 |

(List continued on next page.)

OTHER PUBLICATIONS

Electronic Engineering, vol. 61, No. 750, Jun. 1989, p. 79, XP000033120, "Up Pops A 32Bit Stack Microprocessor."

Atkinson, R.R., et al., "The Dragon Processor", Second International Conference on Architectural Support for Programming Languages and Operating Systems, No. 1987, Oct. 5, 1987, pp. 65–69, XP000042867.

Stanley, et al., "A Performance Analysis of Automatically Managed Top of Stack Buffers", 14th Annual International Symposium on Computer Architecture, Jun. 2, 1987, pp. 272–281, XP002032257.

Burnley, P: "CPU Architecture for Realtime VME Systems", Microprocessors and Microsystems, London, GB, vol. 12, No. 3; Apr. 1988; pp. 153–158; XP000002633.

Lopriore, L: "Line Fetch/Prefetch in a Stack Cache Memory", Microprocessors and Microsystems, vol. 17, No. 9, Nov. 1, 1993, pp. 547–555, XP00413173.

*Microsoft Press Computer Dictionary*, 2$^{nd}$ Ed., p. 279, 1994.

*Primary Examiner*—David L. Robertson
*Attorney, Agent, or Firm*—Forrest Gunnison

[57] ABSTRACT

The present invention provides a stack management unit including a stack cache to accelerate data transfers between the stack-based computing system and the stack. In one embodiment, the stack management unit includes a stack cache, a dribble manager unit, and a stack control unit. The dribble manager unit includes a fill control unit and a spill control unit. Since the vast majority of memory accesses to the stack occur at or near the top of the stack, the dribble manager unit maintains the top portion of the stack in the stack cache. Specifically, when the stack-based computing system is pushing data onto the stack and a spill condition occurs, the spill control unit transfers data from the bottom of the stack cache to the stack so that the top portion of the stack remains in the stack cache. When the stack-based computing system is popping data off of the stack and a fill condition occurs, the fill control unit transfer data from the stack to the bottom of the stack cache to maintain the top portion of the stack in the stack cache. Typically, a fill condition occurs as the stack cache becomes empty and a spill condition occurs as the stack cache becomes full.

26 Claims, 17 Drawing Sheets

U.S. PATENT DOCUMENTS

| | | | |
|---|---|---|---|
| 4,354,232 | 10/1982 | Ryan | 711/118 |
| 4,375,678 | 3/1983 | Krebs, Jr. | 365/189.04 |
| 4,524,416 | 6/1985 | Stanley et al. | 711/200 |
| 4,530,049 | 7/1985 | Zee | 711/132 |
| 4,600,986 | 7/1986 | Sheuneman et al. | 711/169 |
| 4,674,032 | 6/1987 | Michaelson | 711/169 |
| 4,761,733 | 8/1988 | McCrocklin et al. | 711/212 |
| 4,811,208 | 3/1989 | Myers et al. | 711/132 |
| 4,951,194 | 8/1990 | Bradley et al. | 711/132 |
| 5,043,870 | 8/1991 | Ditzel et al. | 711/132 |
| 5,093,777 | 3/1992 | Ryan | 711/3 |
| 5,107,457 | 4/1992 | Hayes et al. | 711/132 |
| 5,142,635 | 8/1992 | Saini | 395/566 |
| 5,157,777 | 10/1992 | Lai et al. | 395/425 |
| 5,210,874 | 5/1993 | Karger | 395/684 |
| 5,485,572 | 1/1996 | Overly | 364/242.91 |
| 5,535,350 | 7/1996 | Maemura | 711/3 |
| 5,603,006 | 2/1997 | Satake et al. | 711/132 |
| 5,634,027 | 5/1997 | Saito | 711/3 |
| 5,636,362 | 6/1997 | Stone et al. | 711/129 |
| 5,687,336 | 11/1997 | Shen et al. | 395/378 |
| 5,784,553 | 7/1998 | Kolawa et al. | |

STACK MANAGEMENT UNIT AND METHOD FOR A PROCESSOR HAVING A STACK

RELATED APPLICATIONS

This application claims the benefit of U.S. Provisional Application No. 60/010,527, filed Jan. 24, 1996, entitled "Methods and Apparatuses for Implementing the JAVA Virtual Machine" (JAVA is a trademark of Sun Microsystems, Inc.) and naming Marc Tremblay, James Michael O'Connor, Robert Garner, and William N. Joy as inventors, and is a continuation-in-part application of U.S. application Ser. No. 08/642,253, filed May 2, 1996, abandoned, entitled "METHODS AND APPARATUSES FOR IMPLEMENTING OPERAND STACK CACHE AS A CIRCULAR BUFFER" and naming Marc Tremblay and James Michael O'Connor as inventors that also claimed the benefit of U.S. Provisional Application No. 60/010,527, filed Jan. 24, 1996, entitled "Methods and Apparatuses for Implementing the JAVA Virtual Machine" and naming Marc Tremblay, James Michael O'Connor, Robert Garner, and William N. Joy as inventors.

Reference to Appendix I

A portion of the disclosure of this patent document including Appendix I, The JAVA Virtual Machine Specification and Appendix A thereto, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates generally to computer systems and, in particular, to caching of stack memory architectures.

2. Discussion of Related Art

Many individuals and organizations in the computer and communications industries tout the Internet as the fastest growing market on the planet. In the 1990s, the number of users of the Internet appears to be growing exponentially with no end in sight. In June of 1995, an estimated 6,642,000 hosts were connected to the Internet; this represented an increase from an estimated 4,852,000 hosts in January, 1995. The number of hosts appears to be growing at around 750% per year. Among the hosts, there were approximately 120,000 networks and over 27,000 web servers. The number of web servers appears to be approximately doubling every 53 days.

In July 1995, with over 1,000,000 active Internet users, over 12,505 usenet news groups, and over 10,000,000 usenet readers, the Internet appears to be destined to explode into a very large market for a wide variety of information and multimedia services.

In addition to the public carrier network or Internet, many corporations and other businesses are shifting their internal information systems onto an intranet as a way of more effectively sharing information within a corporate or private network. The basic infrastructure for an intranet is an internal network connecting servers and desktops, which may or may not be connected to the Internet through a firewall. These intranets provide services to desktops via standard open network protocols which are well established in the industry. Intranets provide many benefits to the enterprises which employ them, such as simplified internal information management and improved internal communication using the browser paradigm. Integrating Internet technologies with a company's enterprise infrastructure and legacy systems also leverages existing technology investment for the party employing an intranet. As discussed above, intranets and the Internet are closely related, with intranets being used for internal and secure communications within the business and the Internet being used for external transactions between the business and the outside world. For the purposes of this document, the term "networks" includes both the Internet and intranets. However, the distinction between the Internet and an intranet should be born in mind where applicable.

In 1990, programmers at Sun Microsystems wrote a universal programming language. This language was eventually named the JAVA programming language. (JAVA is a trademark of Sun Microsystems of Mountain View, Calif.) The JAVA programming language resulted from programming efforts which initially were intended to be coded in the C++ programming language; therefore, the JAVA programming language has many commonalties with the C++ programming language. However, the JAVA programming language is a simple, object-oriented, distributed, interpreted yet high performance, robust yet safe, secure, dynamic, architecture neutral, portable, and multi-threaded language.

The JAVA programming language has emerged as the programming language of choice for the Internet as many large hardware and software companies have licensed it from Sun Microsystems. The JAVA programming language and environment is designed to solve a number of problems in modern programming practice. The JAVA programming language omits many rarely used, poorly understood, and confusing features of the C++ programming language. These omitted features primarily consist of operator overloading, multiple inheritance, and extensive automatic coercions. The JAVA programming language includes automatic garbage collection that simplifies the task of programming because it is no longer necessary to allocate and free memory as in the C programming language. The JAVA programming language restricts the use of pointers as defined in the C programming language, and instead has true arrays in which array bounds are explicitly checked, thereby eliminating vulnerability to many viruses and nasty bugs. The JAVA programming language includes objective-C interfaces and specific exception handlers.

The JAVA programming language has an extensive library of routines for coping easily with TCP/IP protocol (Transmission Control Protocol based on Internet protocol), HTTP (Hypertext Transfer Protocol) and FTP (File Transfer Protocol). The JAVA programming language is intended to be used in networked/distributed environments. The JAVA programming language enabled the construction of virus-free, tamper-free systems. The authentication techniques are based on public-key encryption.

Many stack-based computing systems, including those implementing the JAVA virtual machine, use relatively slow memory devices to store the stack. In general, adding a cache for slow memory devices increases overall memory performance only if the vast majority of memory requests result in cache hits, i.e. the requested memory address is within the cache. Conventional cache designs are designed for random access memory architectures and do not perform well with stack-based memory architectures. Therefore, a caching method and a caching apparatus targeted to improve stack-based memory architectures is desirable.

SUMMARY OF THE INVENTION

Accordingly, the present invention provides a stack management unit including a stack cache to accelerate data transfers between the stack-based computing system and the stack. In one embodiment, the stack management unit includes a stack cache, a dribble manager unit, and a stack control unit. Since the vast majority of memory accesses to the stack occur at or near the top of the stack, the dribble manager unit maintains the top portion of the stack in the stack cache. Specifically, when the stack-based computing system is pushing data onto the stack and the stack cache is almost full, the dribble manager unit transfers data from the bottom of the stack cache to the stack so that the top portion of the stack remains in the stack cache. When the stack-based computing system is popping data off of the stack and the stack cache is becoming empty, the dribble manager unit transfer data from the stack to the bottom of the stack cache to maintain the top portion of the stack in the stack cache.

The stack cache includes a stack cache memory circuit, one or more read ports, and one or more write ports. In one embodiment the stack cache memory circuit is a register file configured in a circular buffer memory architecture. For the circular buffer architecture, the registers can be addressed using modulo addressing. Typically, an OPTOP pointer is used to define and point to the top memory location in the stack cache memory circuit and a bottom pointer is used to define and point to the bottom memory location in the stack cache memory circuit. As data words are pushed or popped off of the stack, the OPTOP pointer is incremented or decremented, respectively. Similarly, as data words are spilled or filled between the stack cache memory circuit and the stack, the bottom pointer is incremented or decremented, respectively.

Some embodiments of the stack management unit include a fill control unit and a spill control unit. If the fill control unit detects a fill condition, the fill control unit transfers data from the stack to the stack cache memory circuit. In one embodiment of the stack management unit a fill condition occurs if an optop pointer is greater than a high water mark. In another embodiment, a fill condition occurs if the number of free memory locations in the stack cache memory circuit is greater than a low cache threshold or the number of used memory locations is less than the low cache threshold. Typically, the low water mark and the low cache threshold are stored in programmable registers. The number of free memory locations can be determined with a modulo subtractor.

In one embodiment of the stack management unit a spill condition occurs if the optop pointer is less than a low water mark. In another embodiment a spill condition occurs if the number of free locations in the stack cache memory circuit is less than a high cache threshold or the number of used memory locations is greater than the high cache threshold. Typically, the low water mark and the low cache threshold are stored in programmable registers. The number of free memory locations can be determined with a modulo subtractor.

For embodiments of the invention used with computing systems using method calls, method frames are stored in two different memory circuits. The first memory circuit stores the execution environment of each method call, and the second memory circuit stores parameters, variables or operands of the method calls. In one embodiment the execution environment includes a return program counter, a return frame, a return constant pool, a current method vector, and a current monitor address. In some embodiments, the memory circuits are stacks; therefore, the stack management unit described herein can be used to cache the memory circuits.

Figure 1A:
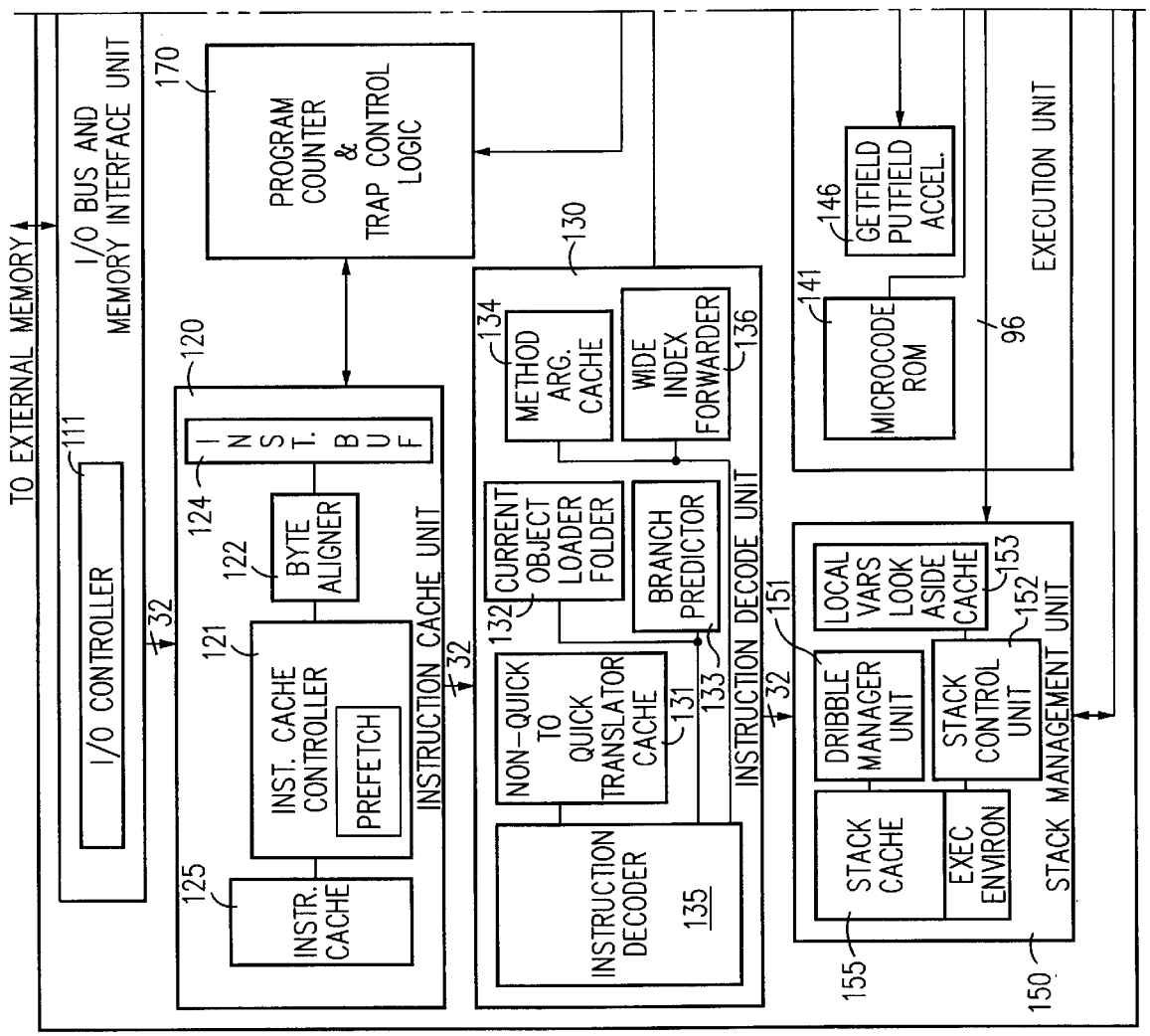
FIG. 1 is a key to FIGS. 1A and 1B, which are a block diagram of one embodiment of virtual machine hardware processor that utilizes the a stack management unit of this invention.

These and other features and advantages of the present invention will be apparent from the Figures as explained in the Detailed Description of the Invention. Like or similar features are designated by the same reference numeral(s) throughout the drawings and the Detailed Description of the Invention.

DETAILED DESCRIPTION OF THE INVENTION

Figure 1B:
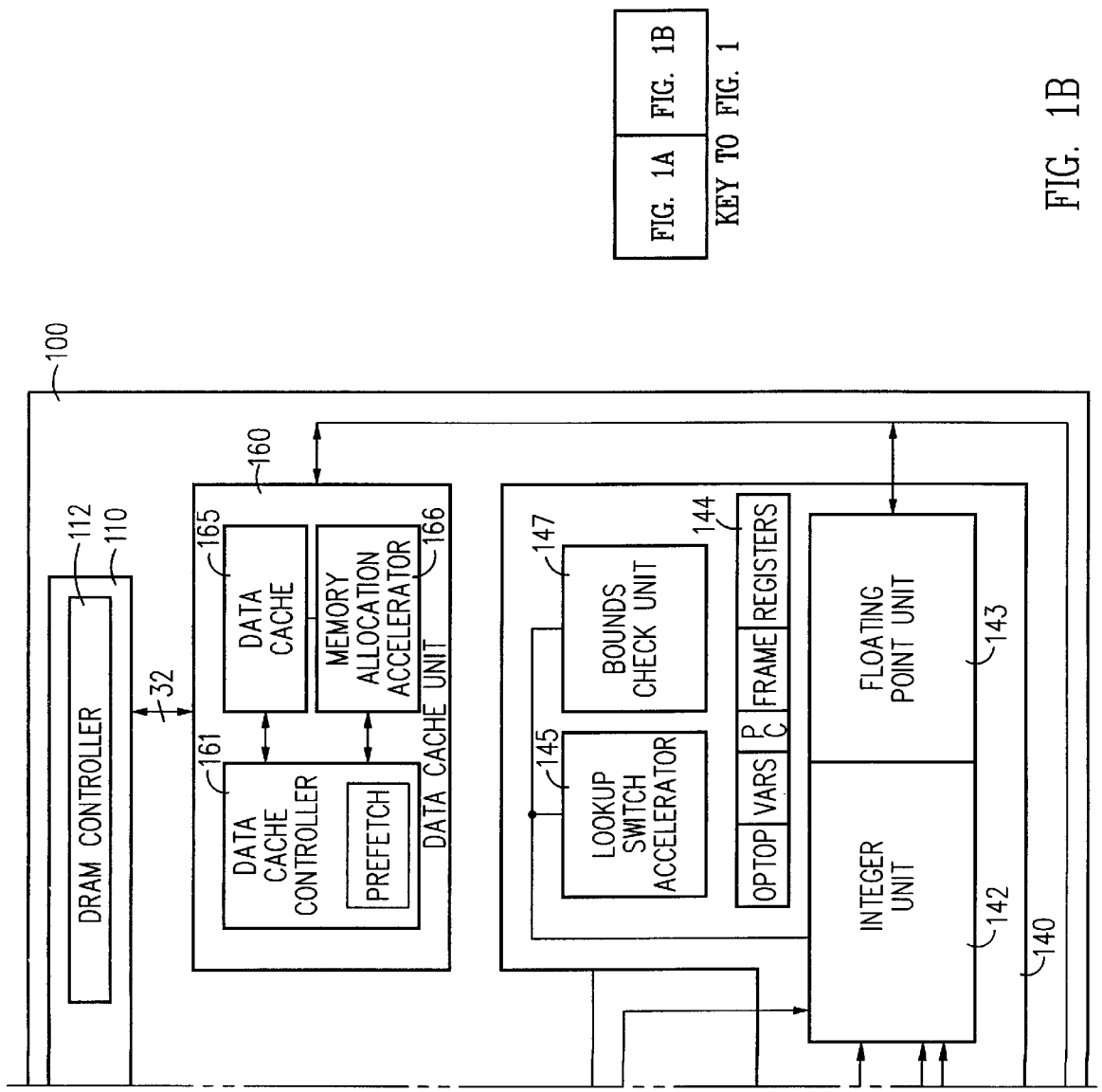

FIG. 1 illustrates one embodiment of a virtual machine instruction hardware processor 100, hereinafter hardware processor 100, that includes a stack management unit in accordance with the present invention, and that directly executes virtual machine instructions that are processor architecture independent. The performance of hardware processor 100 in executing JAVA virtual machine instructions is much better than high-end CPUs, such as the Intel PENTIUM microprocessor or the Sun Microsystems ULTRASPARC processor, (ULTRASPARC is a trademark of Sun Microsystems of Mountain View, Calif., and PENTIUM is a trademark of Intel Corp. of Sunnyvale, Calif.) interpreting the same virtual machine instructions with a software JAVA interpreter. or with a JAVA just-in-time compiler; is low cost; and exhibits low power consumption. As a result, hardware processor 100 is well suited for portable applications. Hardware processor 100 provides similar advantages for other virtual machine stack-based architectures as well as for virtual machines utilizing features such as garbage collection, thread synchronization, etc.

In view of these characteristics, a system based on hardware processor 100 presents attractive price for performance characteristics, if not the best overall performance, as compared with alternative virtual machine execution environments including software interpreters and just-in-time compilers. Nonetheless, the present invention is not limited to virtual machine hardware processor embodiments, and encompasses any suitable stack-based, or non-stack-based machine implementations, including implementations emulating the JAVA virtual machine as a software interpreter, compiling JAVA virtual machine instructions (either in batch or just-in-time) to machine instruction native to a particular hardware processor, or providing hardware implementing the JAVA virtual machine in microcode, directly in silicon, or in some combination thereof.

Regarding price for performance characteristics, hardware processor 100 has the advantage that the 250 Kilobytes to 500 Kilobytes (Kbytes) of memory storage, e.g., read-only memory or random access memory, typically required by a software interpreter, is eliminated.

A simulation of hardware processor 100 showed that hardware processor 100 executes virtual machine instructions twenty times faster than a software interpreter running on a variety of applications on a PENTIUM processor clocked at the same clock rate as hardware processor 100, and executing the same virtual machine instructions. Another simulation of hardware processor 100 showed that hardware processor 100 executes virtual machine instructions five times faster than a just-in-time compiler running on a PENTIUM processor running at the same clock rate as hardware processor 100, and executing the same virtual machine instructions.

In environments in which the expense of the memory required for a software virtual machine instruction interpreter is prohibitive, hardware processor 100 is advantageous. These applications include, for example, an Internet chip for network appliances, a cellular telephone processor, other telecommunications integrated circuits, or other low-power, low-cost applications such as embedded processors, and portable devices.

The present invention includes a stack management unit 150 that utilizes a stack cache 155 to accelerate data transfers for execution unit 140. Although, stack management unit 150 can be an integral part of hardware processor 100 as shown in FIG. 1, many embodiments of stack management unit 150 are not integrated with a hardware processor since stack management in accordance with the present invention can be adapted for use with any stack-based computing system. In one embodiment, stack management unit 150 includes a stack cache 155, a dribble manager unit 151, and a stack control unit 152. When hardware processor 100 is pushing data onto stack 400 (FIG. 4(a)) and stack cache 155 is almost full, dribble manager unit 151 transfers data from the bottom of stack cache 155 to stack 400 through data cache unit 160, so that the top portion of stack 400 remains in stack cache 155. When hardware processor 100 is popping data off of stack 400 and stack cache 155 is almost empty, dribble manager unit 151 transfers data from stack 400 to the bottom of stack cache 155 so that the top portion of stack 400 is maintained in stack cache 155.

As used herein, a virtual machine is an abstract computing machine that, like a real computing machine, has an instruction set and uses various memory areas. A virtual machine specification defines a set of processor architecture independent virtual machine instructions that are executed by a virtual machine implementation, e.g., hardware processor 100. Each virtual machine instruction defines a specific operation that is to be performed. The virtual computing machine need not understand the computer language that is used to generate virtual machine instructions or the underlying implementation of the virtual machine. Only a particular file format for virtual machine instructions needs to be understood.

In an exemplary embodiment, the virtual machine instructions are JAVA virtual machine instructions. Each JAVA virtual machine instruction includes one or more bytes that encode instruction identifying information, operands, and any other required information. Appendix I, which is incorporated herein by reference in its entirety, includes an illustrative set of the JAVA virtual machine instructions. The particular set of virtual machine instructions utilized is not an essential aspect of this invention. In view of the virtual machine instructions in Appendix I and this disclosure, those of skill in the art can modify the invention for a particular set of virtual machine instructions, or for changes to the JAVA virtual machine specification.

Figure 2:
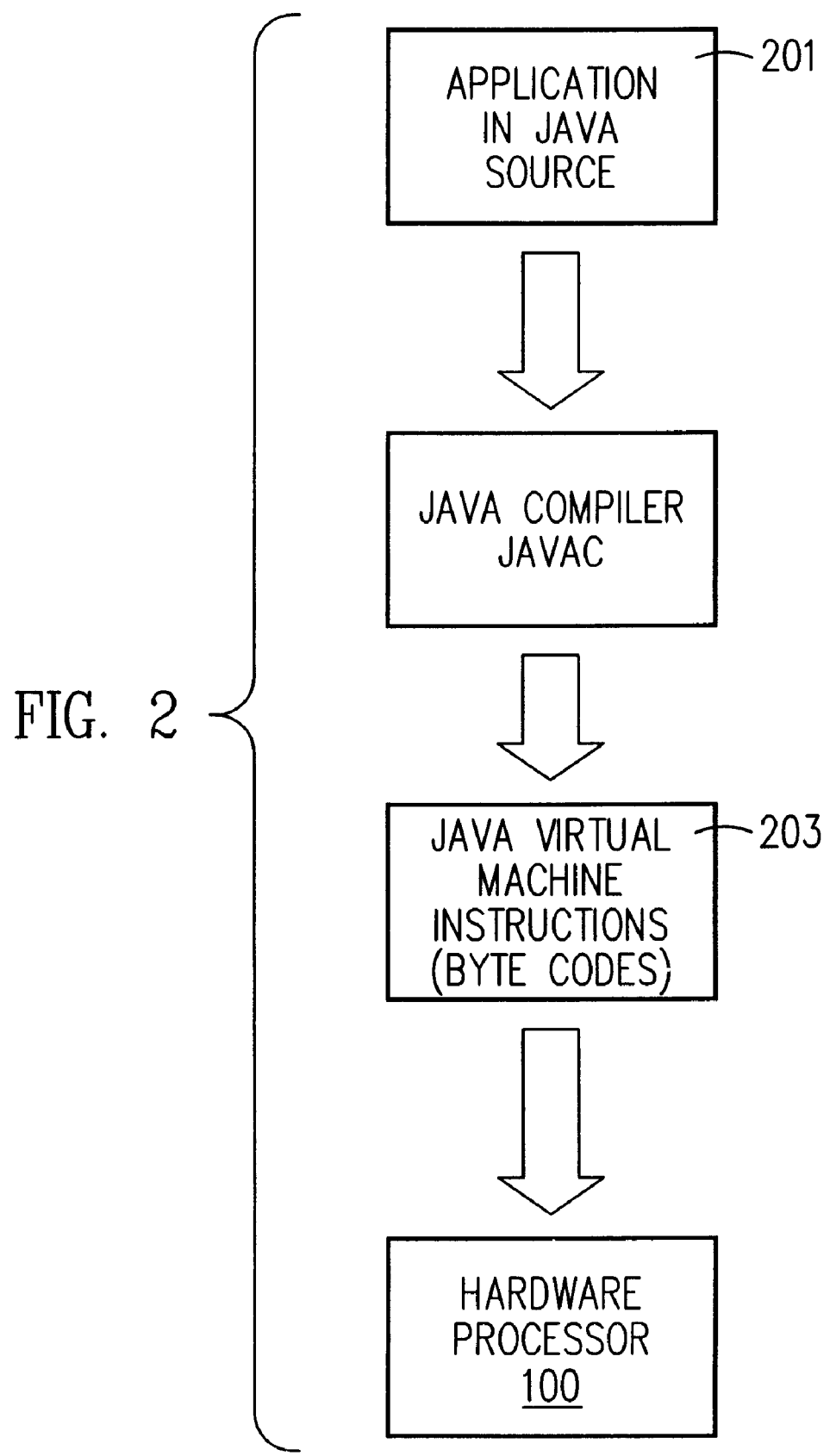
FIG. 2 is a process flow diagram for generation of virtual machine instructions that are used in one embodiment of this invention.

A JAVA compiler JAVAC, (FIG. 2) that is executing on a computer platform, converts an application 201 written in the JAVA computer language to an architecture neutral object file format encoding a compiled instruction sequence 203, according to the JAVA Virtual Machine Specification, that includes a compiled instruction set. However, for this invention, only a source of virtual machine instructions and related information is needed. The method or technique used to generate the source of virtual machine instructions and related information is not essential to this invention.

Compiled instruction sequence 203 is executable on hardware processor 100 as well as on any computer platform that implements the JAVA virtual machine using, for example, a software interpreter or just-in-time compiler. However, as described above, hardware processor 100 provides significant performance advantages over the software implementations.

In this embodiment, hardware processor 100 (FIG. 1) processes the JAVA virtual machine instructions, which include bytecodes. Hardware processor 100, as explained more completely below, executes directly most of the bytecodes. However, execution of some of the bytecodes is implemented via microcode.

One strategy for selecting virtual machine instructions that are executed directly by hardware processor 100 is described herein by way of an example. Thirty percent of the JAVA virtual machine instructions are pure hardware translations; instructions implemented in this manner include constant loading and simple stack operations. The next 50% of the virtual machine instructions are implemented mostly, but not entirely, in hardware and require some firmware assistance; these include stack based operations and array instructions. The next 10% of the JAVA virtual machine instructions are implemented in hardware, but require significant firmware support as well; these include function invocation and function return. The remaining 10% of the JAVA virtual machine instructions are not supported in hardware, but rather are supported by a firmware trap and/or microcode; these include functions such as exception handlers. Herein, firmware means microcode stored in ROM that when executed controls the operations of hardware processor 100.

In one embodiment, hardware processor 100 includes an I/O bus and memory interface unit 110, an instruction cache unit 120 including instruction cache 125, an instruction decode unit 130, a unified execution unit 140, a stack management unit 150 including stack cache 155, a data cache unit 160 including a data cache 165, and program counter and trap control logic 170. Each of these units is described more completely below.

Also, as illustrated in FIG. 1, each unit includes several elements. For clarity and to avoid distracting from the invention, the interconnections between elements within a unit are not shown in FIG. 1. However, in view of the following description, those of skill in the art will understand the interconnections and cooperation between the elements in a unit and between the various units.

Figure 3:
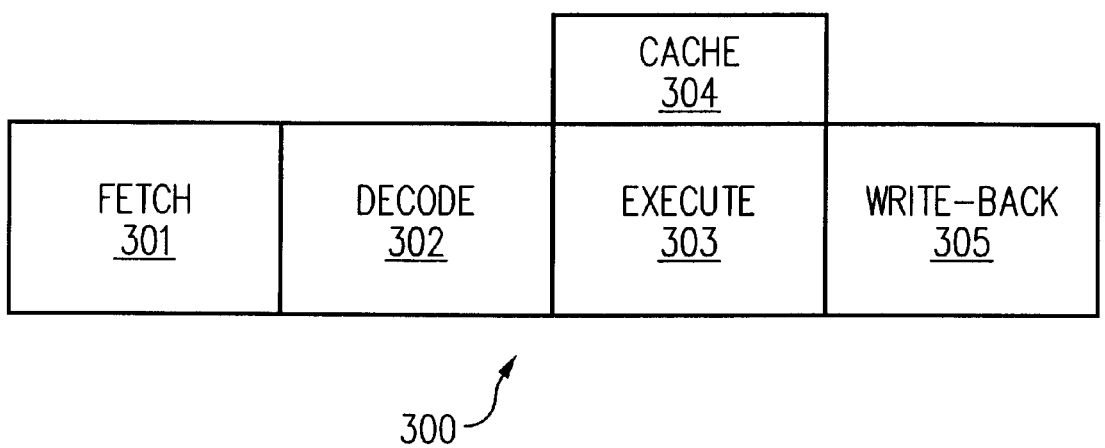
FIG. 3 illustrates an instruction pipeline implemented in the hardware processor of FIG. 1.

The pipeline stages implemented using the units illustrated in FIG. 1 include fetch, decode, execute, and write-back stages. If desired, extra stages for memory access or exception resolution are provided in hardware processor 100. FIG. 3 is an illustration of a four stage pipeline for execution of instructions in the exemplary embodiment of processor 100. In fetch stage 301, a virtual machine instruction is fetched and placed in instruction buffer 124 (FIG. 1). The virtual machine instruction is fetched from one of (i) a fixed size cache line from instruction cache 125 or (ii) external memory.

With regard to fetching, aside from instructions tableswitch and lookupswitch, (See Appendix I.) each virtual machine instruction is between one and five bytes long. Thus, to keep things simple, at least forty bits are required to guarantee that all of a given instruction is contained in the fetch.

Another alternative is to always fetch a predetermined number of bytes, for example, four bytes, starting with the opcode. This is sufficient for 95% of JAVA virtual machine instructions (See Appendix I). For an instruction requiring more than three bytes of operands, another cycle in the front end must be tolerated if four bytes are fetched. In this case, the instruction execution can be started with the first operands fetched even if the full set of operands is not yet available.

In decode stage 302 (FIG. 3), the virtual machine instruction at the front of instruction buffer 124 (FIG. 1) is decoded and instruction folding is performed if possible. Stack cache 155 is accessed only if needed by the virtual machine instruction.

Register OPTOP, that contains a pointer OPTOP to a top of a stack 400 (FIGS. 4A and 4B), is also updated in decode stage 302 (FIG. 3).

Herein, for convenience, the value in a register and the register are assigned the same reference numeral. Further, in the following discussion, use of a register to store a pointer is illustrative only of one embodiment. Depending on the specific implementation of the invention, the pointer may be implemented using a hardware register, a hardware counter, a software counter, a software pointer, or other equivalent embodiments known to those of skill in the art. The particular implementation selected is not essential to the invention, and typically is made based on a price to performance trade-off.

In execute stage 303, the virtual machine instruction is executed for one or more cycles. Typically, in execute stage 303, an ALU in integer unit 142 (FIG. 1) is used either to do an arithmetic computation or to calculate the address of a load or a store from data cache unit (DCU) 160. If necessary, traps are prioritized and taken at the end of execute stage 303 (FIG. 3). For control flow instructions, the branch address is calculated in execute stage 303, as well as the condition upon which the branch is dependent.

Cache stage 304 is a non-pipelined stage. Data cache 165 (FIG. 1) is accessed if needed during execution stage 303 (FIG. 3). The reason that stage 304 is non-pipelined is because hardware processor 100 is a stack-based machine. Thus, the instruction following a load is almost always dependent on the value returned by the load. Consequently, in this embodiment, the pipeline is held for one cycle for a data cache access. This reduces the pipeline stages, and the die area taken by the pipeline for the extra registers and bypasses.

Write-back stage 305 is the last stage in the pipeline. In stage 305, the calculated data is written back to stack cache 155.

Hardware processor 100, in this embodiment, directly implements a stack 400 (FIG. 4A) that supports the JAVA virtual machine stack-based architecture (See Appendix I). Sixty-four entries on stack 400 are contained on stack cache 155 in stack management unit 150. Some entries in stack 400 may be duplicated on stack cache 155. Operations on data are performed through stack cache 155.

Stack 400 of hardware processor 100 is primarily used as a repository of information for methods. At any point in time, hardware processor 100 is executing a single method. Each method has memory space, i.e., a method frame on stack 400, allocated for a set of local variables, an operand stack, and an execution environment structure.

A new method frame, e.g., method frame two 410, is allocated by hardware processor 100 upon a method invocation in execution stage 303 (FIG. 3) and becomes the current frame, i.e., the frame of the current method. Current frame 410 (FIG. 4A), as well as the other method frames, may contain a part of or all of the following six entities, depending on various method invoking situations:

Object reference;

Incoming arguments;

Local variables;

Invoker's method context;

Operand stack; and

Return value from method.

Figure 4A:
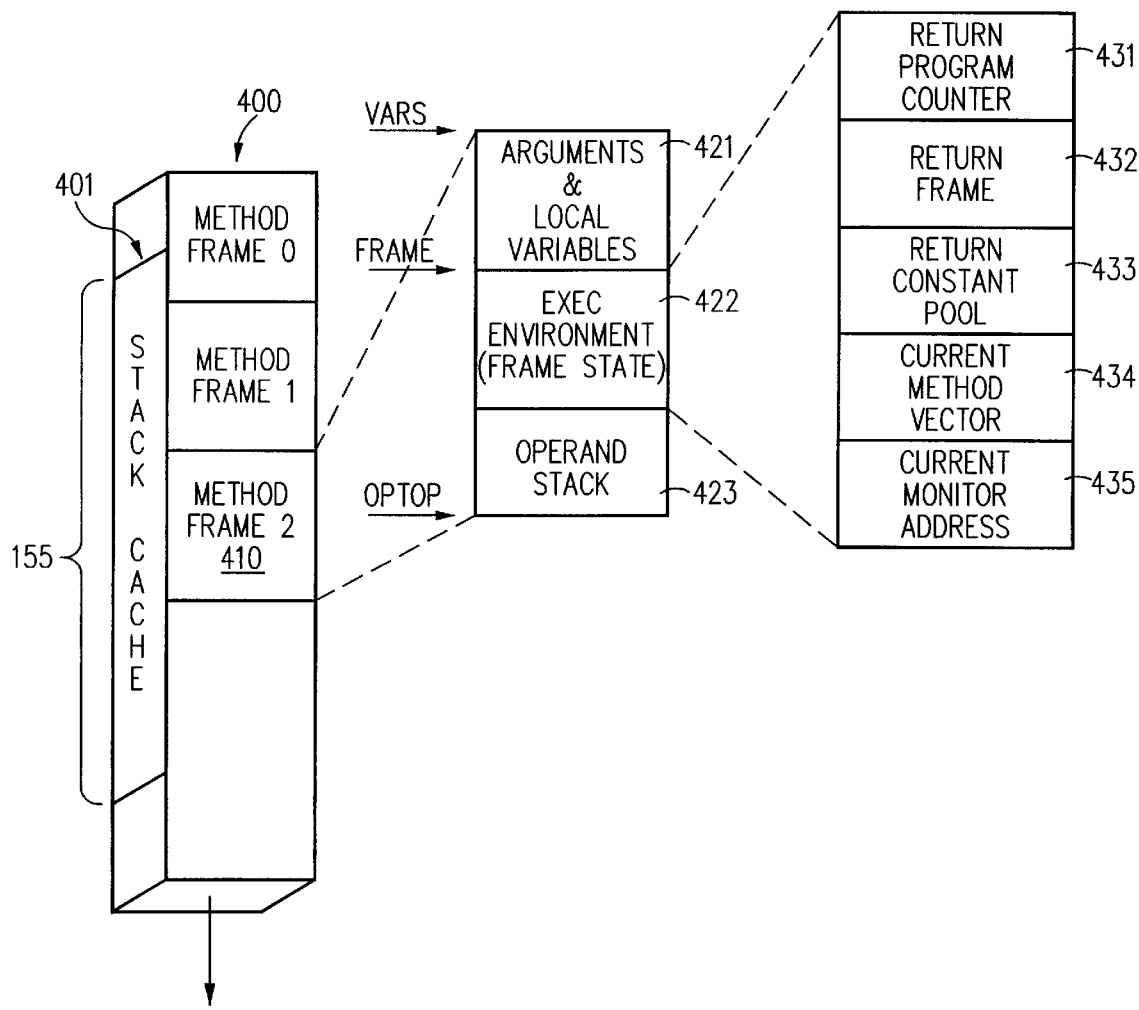
FIG. 4A is an illustration of the one embodiment of the logical organization of a stack structure where each method frame includes a local variable storage area, an environment storage area, and an operand stack utilized by the hardware processor of FIG. 1.

In FIG. 4A, object reference, incoming arguments, and local variables are included in arguments and local variables area 421. The invoker's method context is included in execution environment 422, sometimes called frame state, that in turn includes: a return program counter value 431 that is the address of the virtual machine instruction, e.g., JAVA opcode, next to the method invoke instruction; a return frame 432 that is the location of the calling method's frame; a return constant pool pointer 433 that is a pointer to the calling method's constant pool table; a current method vector 434 that is the base address of the current method's vector table; and a current monitor address 435 that is the address of the current method's monitor.

The object reference is an indirect pointer to an object-storage representing the object being targeted for the method invocation. JAVA compiler JAVAC (See FIG. 2.) generates an instruction to push this pointer onto operand stack 423 prior to generating an invoke instruction. This object reference is accessible as local variable zero during the execution of the method. This indirect pointer is not available for a static method invocation as there is no target-object defined for a static method invocation.

The list of incoming arguments transfers information from the calling method to the invoked method. Like the object reference, the incoming arguments are pushed onto stack 400 by JAVA compiler generated instructions and may be accessed as local variables. JAVA compiler JAVAC (See FIG. 2.) statically generates a list of arguments for current method 410 (FIG. 4A), and hardware processor 100 determines the number of arguments from the list. When the object reference is present in the frame for a non-static method invocation, the first argument is accessible as local variable one. For a static method invocation, the first argument becomes local variable zero.

For 64-bit arguments, as well as 64-bit entities in general, the upper 32-bits, i.e., the 32 most significant bits, of a 64-bit entity are placed on the upper location of stack 400, i.e., pushed on the stack last. For example, when a 64-bit entity is on the top of stack 400, the upper 32-bit portion of the 64-bit entity is on the top of the stack, and the lower 32-bit portion of the 64-bit entity is in the storage location immediately adjacent to the top of stack 400.

The local variable area on stack 400 (FIG. 4A) for current method 410 represents temporary variable storage space which is allocated and remains effective during invocation of method 410. JAVA compiler JAVAC (FIG. 2) statically determines the required number of local variables and hardware processor 100 allocates temporary variable storage space accordingly.

When a method is executing on hardware processor 100, the local variables typically reside in stack cache 155 and are addressed as offsets from pointer VARS (FIGS. 1 and 4A), which points to the position of the local variable zero. Instructions are provided to load the values of local variables onto operand stack 423 and store values from operand stack into local variables area 421.

The information in execution environment 422 includes the invoker's method context. When a new frame is built for the current method, hardware processor 100 pushes the invoker's method context onto newly allocated frame 410, and later utilizes the information to restore the invoker's method context before returning. Pointer FRAME (FIGS. 1 and 4A) is a pointer to the execution environment of the current method. In the exemplary embodiment, each register in register set 144 (FIG. 1) is 32-bits wide.

Operand stack 423 is allocated to support the execution of the virtual machine instructions within the current method. Program counter register PC (FIG. 1) contains the address of the next instruction, e.g., opcode, to be executed. Locations on operand stack 423 (FIG. 4A) are used to store the operands of virtual machine instructions, providing both source and target storage locations for instruction execution. The size of operand stack 423 is statically determined by JAVA compiler JAVAC (FIG. 2) and hardware processor 100 allocates space for operand stack 423 accordingly. Register OPTOP (FIGS. 1 and 4A) holds a pointer to a top of operand stack 423.

The invoked method may return its execution result onto the invoker's top of stack, so that the invoker can access the return value with operand stack references. The return value is placed on the area where an object reference or an argument is pushed before a method invocation.

Simulation results on the JAVA virtual machine indicate that method invocation consumes a significant portion of the execution time (20–40%). Given this attractive target for accelerating execution of virtual machine instructions, hardware support for method invocation is included in hardware processor 100, as described more completely below.

The beginning of the stack frame of a newly invoked method, i.e., the object reference and the arguments passed by the caller, are already stored on stack 400 since the object reference and the incoming arguments come from the top of the stack of the caller. As explained above, following these items on stack 400, the local variables are loaded and then the execution environment is loaded.

One way to speed up this process is for hardware processor 100 to load the execution environment in the background and indicate what has been loaded so far, e.g., simple one bit scoreboarding. Hardware processor 100 tries to execute the bytecodes of the called method as soon as possible, even though stack 400 is not completely loaded. If accesses are made to variables already loaded, overlapping of execution with loading of stack 400 is achieved, otherwise a hardware interlock occurs and hardware processor 100 just waits for the variable or variables in the execution environment to be loaded.

Figure 4B:
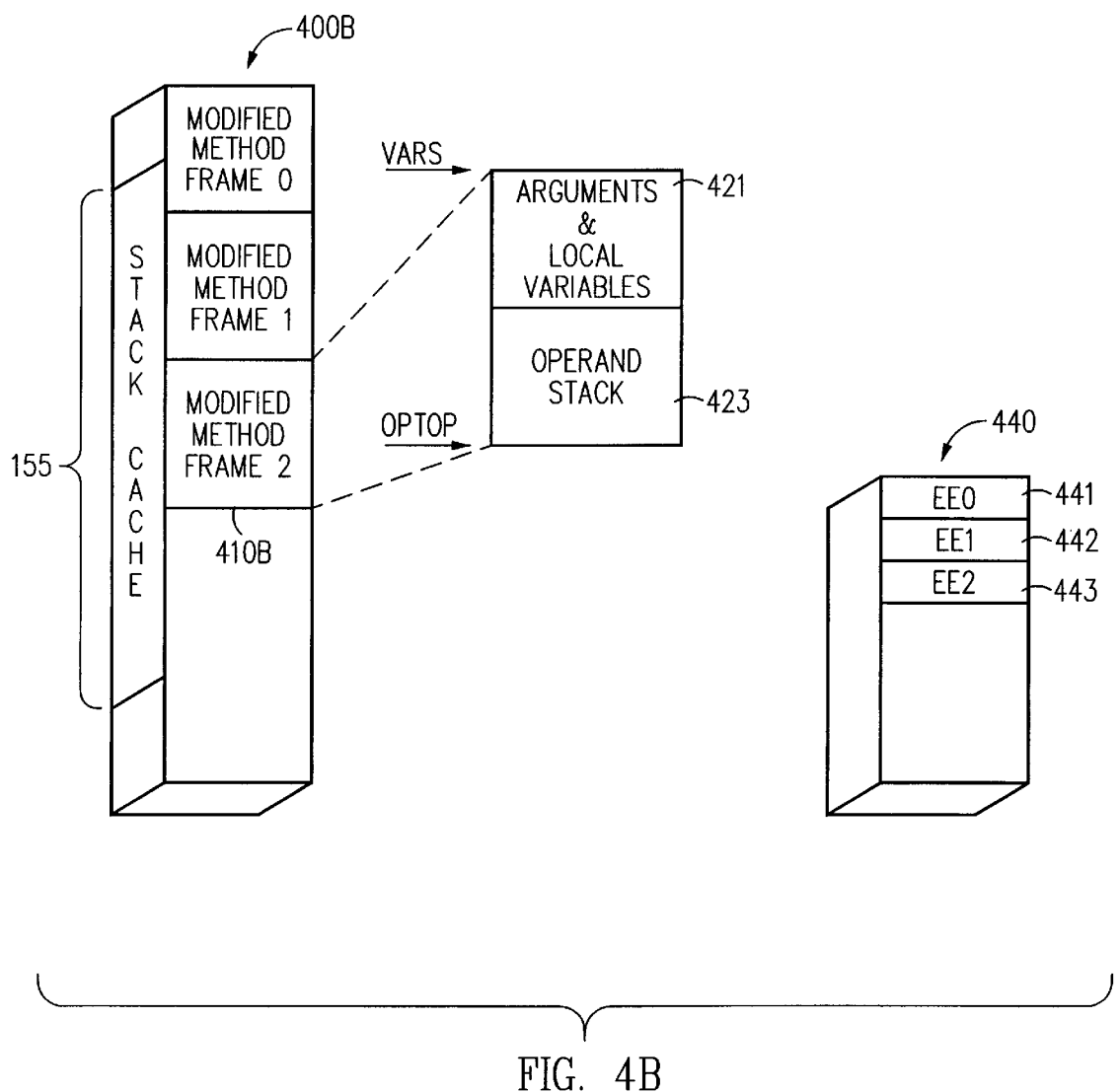
FIG. 4B is an illustration of an alternative embodiment of the logical organization of a stack structure where each method frame includes a local variable storage area and an operand stack on the stack, and an environment storage area for the method frame is included on a separate execution environment stack.

FIG. 4B illustrates another way to accelerate method invocation. Instead of storing the entire method frame in stack 400, the execution environment of each method frame is stored separately from the local variable area and the operand stack of the method frame. Thus, in this embodiment, stack 400B contains modified method frames, e.g., modified method frame 410B having only local variable area 421 and operand stack 423. Execution environment 422 of the method frame is stored in an execution environment memory 440. Storing the execution environment in execution environment memory 440 reduces the amount of data in stack cache 155. Therefore, the size of stack cache 155 can be reduced. Furthermore, execution environment memory 440 and stack cache 155 can be accessed simultaneously. Thus, method invocation can be accelerated by loading or storing the execution environment in parallel with loading or storing data onto stack 400B.

In one embodiment of stack management unit 150, the memory architecture of execution environment memory 440 is also a stack. As modified method frames are pushed onto stack 400B through stack cache 155, corresponding execution environments are pushed onto execution environment memory 440. For example, since modified method frames 0 to 2, as shown in FIG. 42, are in stack 400B, execution environments (EE) 0 to 2, respectively, are stored in execution environment memory circuit 440.

To further enhance method invocation, an execution environment cache can be added to improve the speed of saving and retrieving the execution environment during method invocation. The architecture described more completely below for stack cache 155, dribbler manager unit 151, and stack control unit 152 for caching stack 400, can also be applied to caching execution environment memory 440.

Figure 4C:
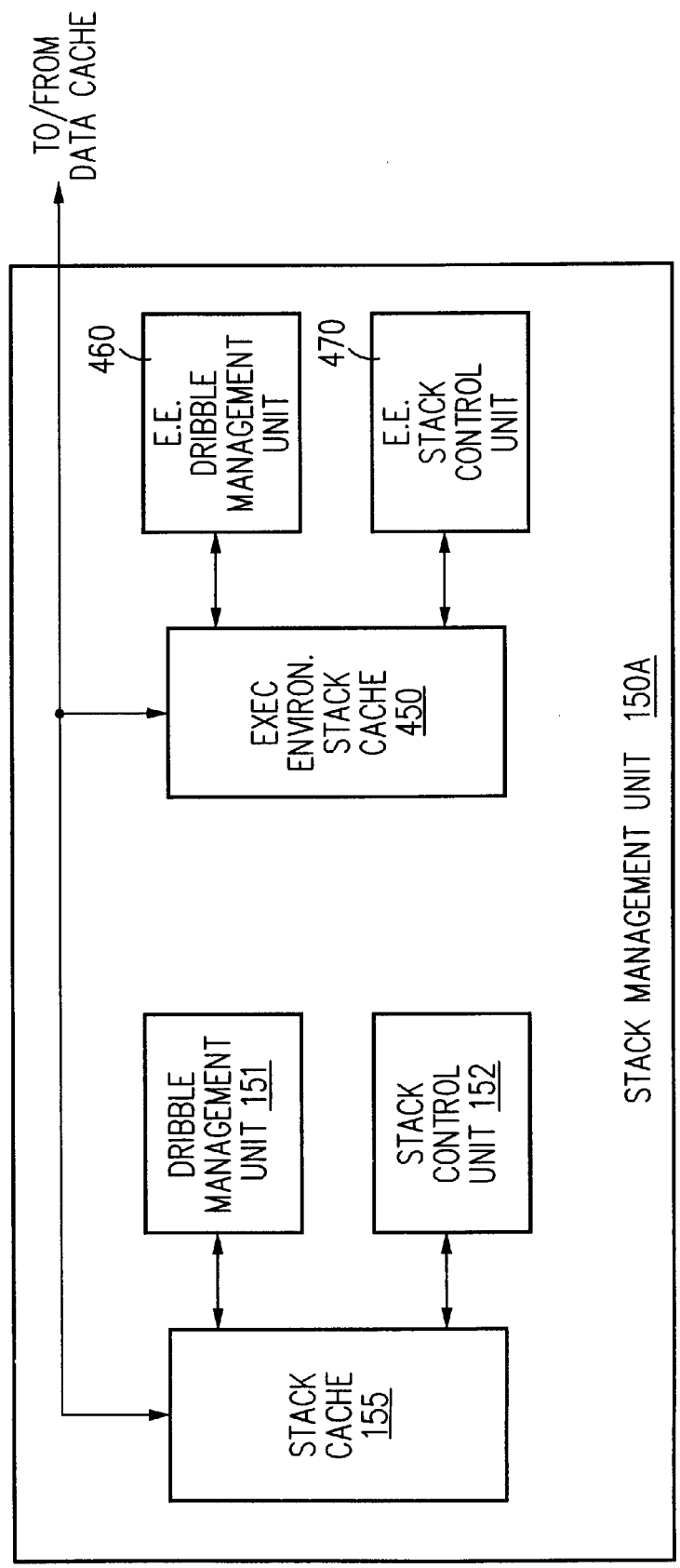
FIG. 4C is an illustration of an alternative embodiment of the stack management unit for the stack and execution environment stack of FIG. 4B.

FIG. 4C illustrates an embodiment of stack management unit 150 modified to support both stack 400B and execution environment memory 440. Specifically, the embodiment of stack management unit 150 in FIG. 4C adds an execution environment stack cache 450, an execution environment dribble manager unit 460, and an execution environment stack control unit 470. Typically, execution dribble manager unit 460 transfers an entire execution environment between execution environment cache 450 and execution environment memory 440 during a spill operation or a fill operation.

I/O Bus and Memory Interface Unit

I/O bus and memory interface unit 110 (FIG. 1), sometimes called interface unit 110, implements an interface between hardware processor 100 and a memory hierarchy which in an exemplary embodiment includes external memory and may optionally include memory storage and/or interfaces on the same die as hardware processor 100. In this embodiment, I/O controller 111 interfaces with external I/O devices and memory controller 112 interfaces with external memory. Herein, external memory means memory external to hardware processor 100. However, external memory either may be included on the same die as hardware processor 100, may be external to the die containing hardware processor 100, or may include both on- and off-die portions.

In another embodiment, requests to I/O devices go through memory controller 112 which maintains an address map of the entire system including hardware processor 100. On the memory bus of this embodiment, hardware processor 100 is the only master and does not have to arbitrate to use the memory bus.

Hence, alternatives for the input/output bus that interfaces with I/O bus and memory interface unit 110 include supporting memory-mapped schemes, providing direct support for PCI, PCMCIA, or other standard busses. Fast graphics (w/ VIS or other technology) may optionally be included on the die with hardware processor 100.

I/O bus and memory interface unit 110 generates read and write requests to external memory. Specifically, interface unit 110 provides an interface for instruction cache and data cache controllers 121 and 161 to the external memory. Interface unit 110 includes arbitration logic for internal requests from instruction cache controller 121 and data cache controller 161 to access external memory and in response to a request initiates either a read or a write request on the memory bus to the external memory. A request from data cache controller 161 is always treated as higher priority relative to a request from instruction cache controller 161.

Interface unit 110 provides an acknowledgment signal to the requesting instruction cache controller 121, or data cache controller 161 on read cycles so that the requesting controller can latch the data. On write cycles, the acknowledgment signal from interface unit 110 is used for flow control so that the requesting instruction cache controller 121 or data cache controller 161 does not generate a new request when there is one pending. Interface unit 110 also handles errors generated on the memory bus to the external memory.

Instruction Cache Unit

Instruction cache unit (ICU) 120 (FIG. 1) fetches virtual machine instructions from instruction cache 125 and provides the instructions to instruction decode unit 130. In this embodiment, upon a instruction cache hit, instruction cache controller 121, in one cycle, transfers an instruction from instruction cache 125 to instruction buffer 124 where the instruction is held until integer execution unit IEU, that is described more completely below, is ready to process the instruction. This separates the rest of pipeline 300 (FIG. 3) in hardware processor 100 from fetch stage 301. If it is undesirable to incur the complexity of supporting an instruction-buffer type of arrangement, a temporary one instruction register is sufficient for most purposes. However, instruction fetching, caching, and buffering should provide sufficient instruction bandwidth to support instruction folding as described below.

The front end of hardware processor 100 is largely separate from the rest of hardware processor 100. Ideally, one instruction per cycle is delivered to the execution pipeline.

The instructions are aligned on an arbitrary eight-bit boundary by byte aligner circuit 122 in response to a signal from instruction decode unit 130. Thus, the front end of hardware processor 100 efficiently deals with fetching from any byte position. Also, hardware processor 100 deals with the problems of instructions that span multiple cache lines of cache 125. In this case, since the opcode is the first byte, the design is able to tolerate an extra cycle of fetch latency for the operands. Thus, a very simple de-coupling between the fetching and execution of the bytecodes is possible.

In case of an instruction cache miss, instruction cache controller 121 generates an external memory request for the missed instruction to I/O bus and memory interface unit 110. If instruction buffer 124 is empty, or nearly empty, when there is an instruction cache miss, instruction decode unit 130 is stalled, i.e., pipeline 300 is stalled. Specifically, instruction cache controller 121 generates a stall signal upon a cache miss which is used along with an instruction buffer empty signal to determine whether to stall pipeline 300. Instruction cache 125 can be invalidated to accommodate self-modifying code, e.g., instruction cache controller 121 can invalidate a particular line in instruction cache 125.

Thus, instruction cache controller 121 determines the next instruction to be fetched, i.e., which instruction in instruction cache 125 needs to accessed, and generates address, data and control signals for data and tag RAMs in instruction cache 125. On a cache hit, four bytes of data are fetched from instruction cache 125 in a single cycle, and a maximum of four bytes can be written into instruction buffer 124.

Byte aligner circuit 122 aligns the data out of the instruction cache RAM and feeds the aligned data to instruction buffer 124. As explained more completely below, the first two bytes in instruction buffer 124 are decoded to determine the length of the virtual machine instruction. Instruction buffer 124 tracks the valid instructions in the queue and updates the entries, as explained more completely below.

Instruction cache controller 121 also provides the data path and control for handling instruction cache misses. On an instruction cache miss, instruction cache controller 121 generates a cache fill request to I/O bus and memory interface unit 110.

On receiving data from external memory, instruction cache controller 121 writes the data into instruction cache 125 and the data are also bypassed into instruction buffer 124. Data are bypassed to instruction buffer 124 as soon as the data are available from external memory, and before the completion of the cache fill.

Instruction cache controller 121 continues fetching sequential data until instruction buffer 124 is full or a branch or trap has taken place. In one embodiment, instruction buffer 124 is considered full if there are more than eight bytes of valid entries in buffer 124. Thus, typically, eight bytes of data are written into instruction cache 125 from external memory in response to the cache fill request sent to interface unit 110 by instruction cache unit 120. If there is a branch or trap taken while processing an instruction cache miss, only after the completion of the miss processing is the trap or branch executed.

When an error is generated during an instruction cache fill transaction, a fault indication is generated and stored into instruction buffer 124 along with the virtual machine instruction, i.e., a fault bit is set. The line is not written into instruction cache 125. Thus, the erroneous cache fill transaction acts like a non-cacheable transaction except that a fault bit is set. When the instruction is decoded, a trap is taken.

Instruction cache controller 121 also services non-cacheable instruction reads. An instruction cache enable (ICE) bit, in a processor status register in register set 144, is used to define whether a load can be cached. If the instruction cache enable bit is cleared, instruction cache unit 120 treats all loads as non-cacheable loads. Instruction cache controller 121 issues a non-cacheable request to interface unit 110 for non-cacheable instructions. When the data are available on a cache fill bus for the non-cacheable instruction, the data are bypassed into instruction buffer 124 and are not written into instruction cache 125.

In this embodiment, instruction cache 125 is a direct-mapped, eight-byte line size cache. Instruction cache 125 has a single cycle latency. The cache size is configurable to 0K, 1K, 2K, 4K, 8K and 16K byte sizes where K means kilo. The default size is 4K bytes. Each line has a cache tag entry associated with the line. Each cache tag contains a twenty bit address tag field and one valid bit for the default 4K byte size.

Instruction buffer 124, which, in an exemplary embodiment, is a twelve-byte deep first-in, first-out (FIFO) buffer, de-links fetch stage 301 (FIG. 3) from the rest of pipeline 300 for performance reasons. Each instruction in buffer 124 (FIG. 1) has an associated valid bit and an error bit. When the valid bit is set, the instruction associated with that valid bit is a valid instruction. When the error bit is set, the fetch of the instruction associated with that error bit was an erroneous transaction. Instruction buffer 124 includes an instruction buffer control circuit (not shown) that generates signals to pass data to and from instruction buffer 124 and that keeps track of the valid entries in instruction buffer 124, i.e., those with valid bits set.

In an exemplary embodiment, four bytes can be received into instruction buffer 124 in a given cycle. Up to five bytes, representing up to two virtual machine instructions, can be read out of instruction buffer 124 in a given cycle. Alternative embodiments, particularly those providing folding of multi-byte virtual machine instructions and/or those providing folding of more than two virtual machine instructions, provide higher input and output bandwidth. Persons of ordinary skill in the art will recognize a variety of suitable instruction buffer designs including, for example, alignment logic, circular buffer design, etc. When a branch or trap is taken, all the entries in instruction buffer 124 are nullified and the branch/trap data moves to the top of instruction buffer 124.

In the embodiment of FIG. 1, a unified execution unit 140 is shown. However, in another embodiment, instruction decode unit 130, integer unit 142, and stack management unit 150 are considered a single integer execution unit, and floating point execution unit 143 is a separate optional unit. In still other embodiments, the various elements in the execution unit may be implemented using the execution unit of another processor. In general the various elements included in the various units of FIG. 1 are exemplary only of one embodiment. Each unit could be implemented with all or some of the elements shown. Again, the decision is largely dependent upon a price vs. performance trade-off.

Instruction Decode Unit

As explained above, virtual machine instructions are decoded in decode stage 302 (FIG. 3) of pipeline 300. In an exemplary embodiment, two bytes, that can correspond to two virtual machine instructions, are fetched from instruction buffer 124 (FIG. 1). The two bytes are decoded in parallel to determine if the two bytes correspond to two virtual machine instructions, e.g., a first load top of stack instruction and a second add top two stack entries instruction, that can be folded into a single equivalent operation. Folding refers to supplying a single equivalent operation corresponding to two or more virtual machine instructions.

In an exemplary hardware processor 100 embodiment, a single-byte first instruction can be folded with a second instruction. However, alternative embodiments provide folding of more than two virtual machine instructions, e.g., two to four virtual machine instructions, and of multi-byte virtual machine instructions, though at the cost of instruction decoder complexity and increased instruction bandwidth. See U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith which is incorporated herein by reference in its entirety. In the exemplary processor 100 embodiment, if the first byte, which corresponds to the first virtual machine instruction, is a multi-byte instruction, the first and second instructions are not folded.

An optional current object loader folder 132 exploits instruction folding, such as that described above, and in greater detail in U.S. patent application Ser. No. 08/786,351, entitled "INSTRUCTION FOLDING FOR A STACK-BASED MACHINE" naming Marc Tremblay and James Michael O'Connor as inventors, assigned to the assignee of this application, and filed on even date herewith with, which is incorporated herein by reference in its entirety, in virtual machine instruction sequences which simulation results have shown to be particularly frequent and therefore a desirable target for optimization. In particular, a method invocation typically loads an object reference for the corresponding object onto the operand stack and fetches a field from the object. Instruction folding allow this extremely common virtual machine instruction sequence to be executed using an equivalent folded operation.

Quick variants are not part of the virtual machine instruction set (See Chapter 3 of Appendix I), and are invisible outside of a JAVA virtual machine implementation. However, inside a virtual machine implementation, quick variants have proven to be an effective optimization. (See Appendix A in Appendix I; which is an integral part of this specification.) Supporting writes for updates of various instructions to quick variants in a non-quick to quick translator cache 131 changes the normal virtual machine instruction to a quick virtual machine instruction to take advantage of the large benefits bought from the quick variants. In particular, as described in more detail in U.S. patent application Ser. No. 08/788,805, entitled "NON-QUICK INSTRUCTION ACCELERATOR AND METHOD OF IMPLEMENTING SAME" naming Marc Tremblay and James Michael O'Connor as inventors, assigned to the assignee of this application, and filed on even date herewith with, which is incorporated herein by reference in its entirety, when the information required to initiate execution of an instruction has been assembled for the first time, the information is stored in a cache along with the value of program counter PC as tag in non-quick to quick translator cache 131 and the instruction is identified as a quick-variant. In one embodiment, this is done with self-modifying code.

Upon a subsequent call of that instruction, instruction decode unit 130 detects that the instruction is identified as a quick-variant and simply retrieves the information needed to initiate execution of the instruction from non-quick to quick translator cache 131. Non-quick to quick translator cache is an optional feature of hardware processor 100.

With regard to branching, a very short pipe with quick branch resolution is sufficient for most implementations. However, an appropriate simple branch prediction mechanism can alternatively be introduced, e.g., branch predictor circuit 133. Implementations for branch predictor circuit 133 include branching based on opcode, branching based on offset, or branching based on a two-bit counter mechanism.

The JAVA virtual machine specification defines an instruction invokenonvirtual, opcode 183, which, upon execution, invokes methods. The opcode is followed by an index byte one and an index byte two. (See Appendix I.) Operand stack 423 contains a reference to an object and some number of arguments when this instruction is executed.

Index bytes one and two are used to generate an index into the constant pool of the current class. The item in the constant pool at that index points to a complete method signature and class. Signatures are defined in Appendix I and that description is incorporated herein by reference.

The method signature, a short, unique identifier for each method, is looked up in a method table of the class indicated. The result of the lookup is a method block that indicates the type of method and the number of arguments for the method. The object reference and arguments are popped off this method's stack and become initial values of the local variables of the new method. The execution then resumes with the first instruction of the new method. Upon execution, instructions invokevirtual, opcode 182, and invokestatic, opcode 184, invoke processes similar to that just described. In each case, a pointer is used to lookup a method block.

A method argument cache 134, that also is an optional feature of hardware processor 100, is used, in a first embodiment, to store the method block of a method for use after the first call to the method, along with the pointer to the method block as a tag. Instruction decode unit 130 uses index bytes one and two to generate the pointer and then uses the pointer to retrieve the method block for that pointer in cache 134. This permits building the stack frame for the newly invoked method more rapidly in the background in subsequent invocations of the method. Alternative embodiments may use a program counter or method identifier as a reference into cache 134. If there is a cache miss, the instruction is executed in the normal fashion and cache 134 is updated accordingly. The particular process used to determine which cache entry is overwritten is not an essential aspect of this invention. A least-recently used criterion could be implemented, for example.

In an alternative embodiment, method argument cache 134 is used to store the pointer to the method block, for use after the first call to the method, along with the value of program counter PC of the method as a tag. Instruction decode unit 130 uses the value of program counter PC to access cache 134. If the value of program counter PC is equal to one of the tags in cache 134, cache 134 supplies the pointer stored with that tag to instruction decode unit 130. Instruction decode unit 130 uses the supplied pointer to retrieve the method block for the method. In view of these two embodiments, other alternative embodiments will be apparent to those of skill in the art.

Wide index forwarder 136, which is an optional element of hardware processor 100, is a specific embodiment of instruction folding for instruction wide. Wide index forwarder 136 handles an opcode encoding an extension of an index operand for an immediately subsequent virtual machine instruction. In this way, wide index forwarder 136 allows instruction decode unit 130 to provide indices into local variable storage 421 when the number of local variables exceeds that addressable with a single byte index without incurring a separate execution cycle for instruction wide.

Aspects of instruction decoder 135, particularly instruction folding, non-quick to quick translator cache 131, current object loader folder 132, branch predictor 133, method argument cache 134, and wide index forwarder 136 are also useful in implementations that utilize a software interpreter or just-in-time compiler, since these elements can be used to accelerate the operation of the software interpreter or just-in-time compiler. In such an implementation, typically, the virtual machine instructions are translated to an instruction for the processor executing the interpreter or compiler, e.g., any one of a Sun processor, a DEC processor, an Intel processor, or a Motorola processor, for example, and the operation of the elements is modified to support execution on that processor. The translation from the virtual machine instruction to the other processor instruction can be done either with a translator in a ROM or a simple software translator. For additional examples of dual instruction set processors, see U.S. patent application Ser. No. 08/787,618, entitled "A PROCESSOR FOR EXECUTING INSTRUCTION SETS RECEIVED FROM A NETWORK OR FROM A LOCAL MEMORY" naming Marc Tremblay and James Michael O'Connor as inventors, assigned to the assignee of this application, and filed on even date herewith, which is incorporated herein by reference in its entirety Integer Execution Unit Integer execution unit IEU, that includes instruction decode unit 130, integer unit 142, and stack management unit 150, is responsible for the execution of all the virtual machine instructions except the floating point related instructions. The floating point related instructions are executed in floating point unit 143.

Integer execution unit IEU interacts at the front end with instructions cache unit 120 to fetch instructions, with floating point unit (FPU) 143 to execute floating point instructions, and finally with data cache unit (DCU) 160 to execute load and store related instructions. Integer execution unit IEU also contains microcode ROM 141 which contains instructions to execute certain virtual machine instructions associated with integer operations.

Integer execution unit IEU includes a cached portion of stack 400, i.e., stack cache 155. Stack cache 155 provides fast storage for operand stack and local variable entries associated with a current method, e.g., operand stack 423 and local variable storage 421 entries. Although, stack cache 155 may provide sufficient storage for all operand stack and local variable entries associated with a current method, depending on the number of operand stack and local variable entries, less than all of local variable entries or less than all of both local variable entries and operand stack entries may be represented in stack cache 155. Similarly, additional entries, e.g., operand stack and or local variable entries for a calling method, may be represented in stack cache 155 if space allows.

Stack cache 155 is a sixty-four entry thirty-two-bit wide array of registers that is physically implemented as a register file in one embodiment. Stack cache 155 has three read ports, two of which are dedicated to integer execution unit IEU and one to dribble manager unit 151. Stack cache 155 also has two write ports, one dedicated to integer execution unit IEU and one to dribble manager unit 151.

Integer unit 142 maintains the various pointers which are used to access variables, such as local variables, and operand stack values, in stack cache 155. Integer unit 142 also maintains pointers to detect whether a stack cache hit has taken place. Runtime exceptions are caught and dealt with by exception handlers that are implemented using information in microcode ROM 141 and circuit 170.

Integer unit 142 contains a 32-bit ALU to support arithmetic operations. The operations supported by the ALU include: add, subtract, shift, and, or, exclusive or, compare, greater than, less than, and bypass. The ALU is also used to determine the address of conditional branches while a separate comparator determines the outcome of the branch instruction.

The most common set of instructions which executes cleanly through the pipeline is the group of ALU instructions. The ALU instructions read the operands from the top of stack 400 in decode stage 302 and use the ALU in execution stage 303 to compute the result. The result is written back to stack 400 in write-back stage 305. There are two levels of bypass which may be needed if consecutive ALU operations are accessing stack cache 155.

Since the stack cache ports are 32-bits wide in this embodiment, double precision and long data operations take two cycles. A shifter is also present as part of the ALU. If the operands are not available for the instruction in decode stage 302, or at a maximum at the beginning of execution stage 303, an interlock holds the pipeline stages before execution stage 303.

The instruction cache unit interface of integer execution unit IEU is a valid/accept interface, where instruction cache unit 120 delivers instructions to instruction decode unit 130 in fixed fields along with valid bits. Instruction decoder 135 responds by signaling how much byte aligner circuit 122 needs to shift, or how many bytes instruction decode unit 130 could consume in decode stage 302. The instruction cache unit interface also signals to instruction cache unit 120 the branch mis-predict condition, and the branch address in execution stage 303. Traps, when taken, are also similarly indicated to instruction cache unit 120. Instruction cache unit 120 can hold integer unit 142 by not asserting any of the valid bits to instruction decode unit 130. Instruction decode unit 130 can hold instruction cache unit 120 by not asserting the shift signal to byte aligner circuit 122.

The data cache interface of integer execution unit IEU also is a valid-accept interface, where integer unit 142 signals, in execution stage 303, a load or store operation along with its attributes, e.g., non-cached, special stores etc., to data cache controller 161 in data cache unit 160. Data cache unit 160 can return the data on a load, and control integer unit 142 using a data control unit hold signal. On a data cache hit, data cache unit 160 returns the requested data, and then releases the pipeline.

On store operations, integer unit 142 also supplies the data along with the address in execution stage 303. Data cache unit 160 can hold the pipeline in cache stage 304 if data cache unit 160 is busy, e.g., doing a line fill etc.

Floating point operations are dealt with specially by integer execution unit IEU. Instruction decoder 135 fetches and decodes floating point unit 143 related instructions. Instruction decoder 135 sends the floating point operation operands for execution to floating point unit 142 in decode state 302. While floating point unit 143 is busy executing the floating point operation, integer unit 142 halts the pipeline and waits until floating point unit 143 signals to integer unit 142 that the result is available.

A floating point ready signal from floating point unit 143 indicates that execution stage 303 of the floating point operation has concluded. In response to the floating point ready signal, the result is written back into stack cache 155 by integer unit 142. Floating point load and stores are entirely handled by integer execution unit IEU, since the operands for both floating point unit 143 and integer unit 142 are found in stack cache 155.

Stack Management Unit

A stack management unit 150 stores information, and provides operands to execution unit 140. Stack management unit 150 also takes care of overflow and underflow conditions of stack cache 155.

In one embodiment, stack management unit 150 includes stack cache 155 that, as described above, is a three read port, two write port register file in one embodiment; a stack control unit 152 which provides the necessary control signals for two read ports and one write port that are used to retrieve operands for execution unit 140 and for storing data back from a write-back register or data cache 165 into stack cache 155; and a dribble manager 151 which speculatively dribbles data in and out of stack cache 155 into memory whenever there is an overflow or underflow in stack cache 155. In the exemplary embodiment of FIG. 1, memory includes data cache 165 and any memory storage interfaced by memory interface unit 110. In general, memory includes any suitable memory hierarchy including caches, addressable read/write memory storage, secondary storage, etc. Dribble manager 151 also provides the necessary control signals for a single read port and a single write port of stack cache 155 which are used exclusively for background dribbling purposes.

In one embodiment, stack cache 155 is managed as a circular buffer which ensures that the stack grows and shrinks in a predictable manner to avoid overflows or overwrites. The saving and restoring of values to and from data cache 165 is controlled by dribbler manager 151 using high- and low-water marks, in one embodiment.

Stack management unit 150 provides execution unit 140 with two 32-bit operands in a given cycle. Stack management unit 150 can store a single 32-bit result in a given cycle.

Dribble manager 151 handles spills and fills of stack cache 155 by speculatively dribbling the data in and out of stack cache 155 from and to data cache 165. Dribble manager 151 generates a pipeline stall signal to stall the pipeline when a stack overflow or underflow condition is detected. Dribble manager 151 also keeps track of requests sent to data cache unit 160. A single request to data cache unit 160 is a 32-bit consecutive load or store request.

The hardware organization of stack cache 155 is such that, except for long operands (long integers and double precision floating-point numbers), implicit operand fetches for opcodes do not add latency to the execution of the opcodes. The number of entries in operand stack 423 (FIG. 4A) and local variable storage 421 that are maintained in stack cache 155 represents a hardware/performance tradeoff. At least a few operand stack 423 and local variable storage 422 entries are required to get good performance. In the exemplary embodiment of FIG. 1, at least the top three entries of operand stack 423 and the first four local variable storage 421 entries are preferably represented in stack cache 155.

One key function provided by stack cache 155 (Fig. 1) is to emulate a register file where access to the top two registers is always possible without extra cycles. A small hardware stack is sufficient if the proper intelligence is provided to load/store values from/to memory in the background, therefore preparing stack cache 155 for incoming virtual machine instructions.

As indicated above, all items on stack 400 (regardless of size) are placed into a 32-bit word. This tends to waste space if many small data items are used, but it also keeps things relatively simple and free of lots of tagging or muxing. An entry in stack 400 thus represents a value and not a number of bytes. Long integer and double precision floating-point numbers require two entries. To keep the number of read and write ports low, two cycles to read two long integers or two double precision floating point numbers are required.

The mechanism for filling and spilling the operand stack from stack cache 155 out to memory by dribble manager 151 can assume one of several alternative forms. One register at a time can be filled or spilled, or a block of several registers filled or spilled at once. A simple scoreboarded method is appropriate for stack management. In its simplest form, a single bit indicates if the register in stack cache 155 is currently valid. In addition, some embodiments of stack cache 155 use a single bit to indicate whether the data content of the register is saved to stack 400, i.e., whether the register is dirty. In one embodiment, a high-water mark/low-water mark heuristic determines when entries are saved to and restored from stack 400, respectively (FIG. 4A). Alternatively, when the top-of-the-stack becomes close to bottom 401 of stack cache 155 by a fixed, or alternatively, a programmable number of entries, the hardware starts loading registers from stack 400 into stack cache 155. Detailed embodiments of stack management unit 150 and dribble manager unit 151 are described below and in U.S. patent application Ser. No. 08/789,617, entitled "METHOD FRAME STORAGE USING MULTIPLE MEMORY CIRCUITS" naming James Michael O'Connor and Marc Tremblay as inventors, assigned to the assignee of this application, and filed on even date herewith, which is incorporated herein by reference in its entirety.

In one embodiment, stack management unit 150 also includes an optional local variable look-aside cache 153. Cache 153 is most important in applications where both the local variables and operand stack 423 (FIG. 4A) for a method are not located on stack cache 155. In such instances when cache 153 is not included in hardware processor 100, there is a miss on stack cache 155 when a local variable is accessed, and execution unit 140 accesses data cache unit 160, which in turn slows down execution. In contrast, with cache 153, the local variable is retrieved from cache 153 and there is no delay in execution.

Figure 4D:
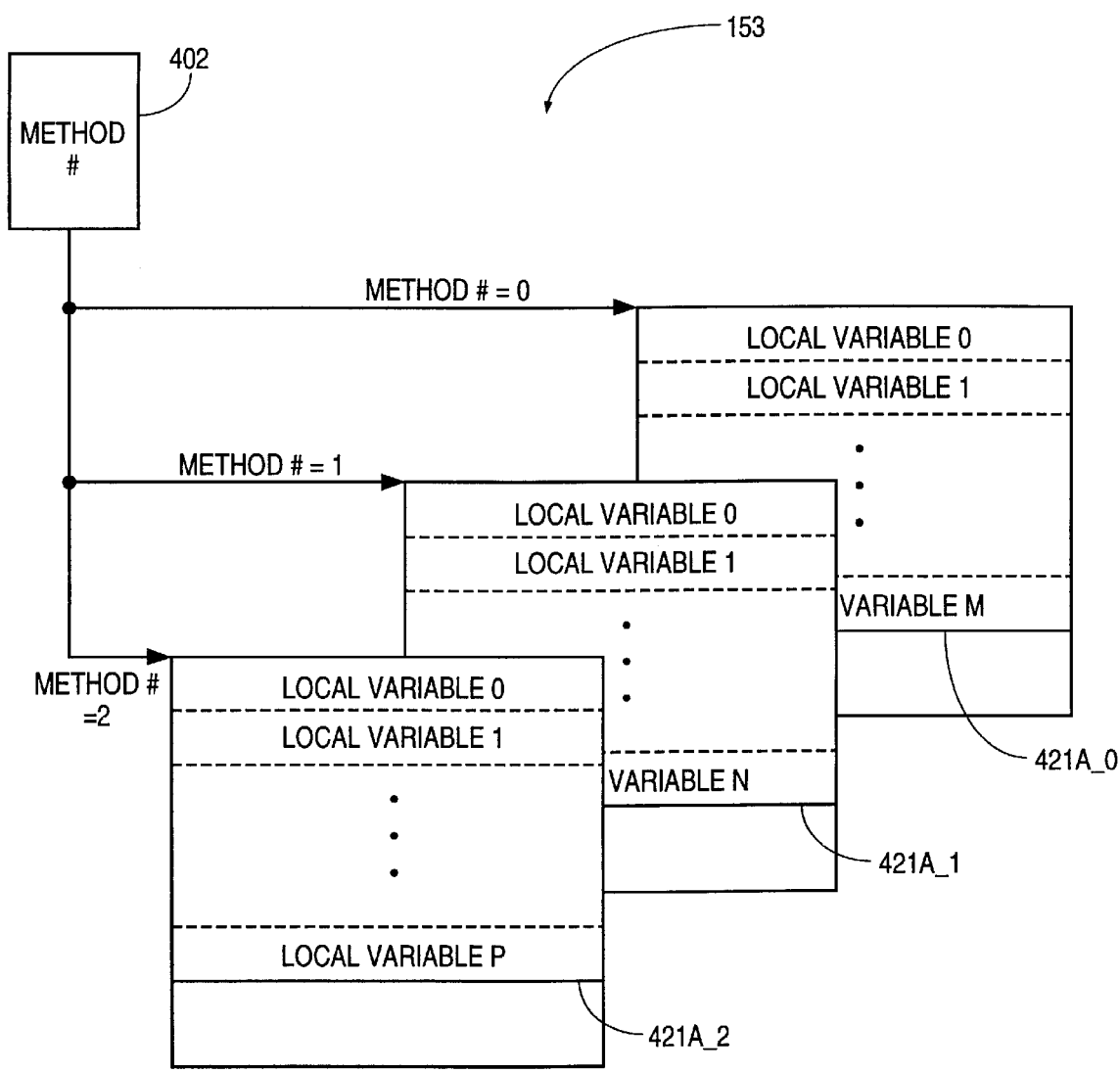
FIG. 4D is an illustration of one embodiment of the local variables look-aside cache in the stack management unit of FIG. 1.

One embodiment of local variable look-aside cache 153 is illustrated in FIG. 4D for method 0 to 2 on stack 400. Local variables zero to M, where M is an integer, for method 0 are stored in plane 421A_0 of cache 153 and plane 421A_0 is accessed when method number 402 is zero. Local variables zero to N, where N is an integer, for method 1 are stored in plane 421A_1 of cache 153 and plane 421A_1 is accessed when method number 402 is one. Local variables zero to P, where P is an integer, for method 1 are stored in plane 421A_2 of cache 153 and plane 421A_2 is accessed when method number 402 is two. Notice that the various planes of cache 153 may be different sizes, but typically each plane of the cache has a fixed size that is empirically determined.

When a new method is invoked, e.g, method 2, a new plane 421A_2 in cache 153 is loaded with the local variables for that method, and method number register 402, which in one embodiment is a counter, is changed, e.g., incremented, to point to the plane of cache 153 containing the local variables for the new method. Notice that the local variables are ordered within a plane of cache 153 so that cache 153 is effectively a direct-mapped cache. Thus, when a local variable is needed for the current method, the variable is accessed directly from the most recent plane in cache 153, i.e., the plane identified by method number 402. When the current method returns, e.g., method 2, method number register 402 is changed, e.g., decremented, to point at previous plane 421A-1 of cache 153. Cache 153 can be made as wide and as deep as necessary.

Data Cache Unit

Data cache unit 160 (DCU) manages all requests for data in data cache 165. Data cache requests can come from dribbling manager 151 or execution unit 140. Data cache controller 161 arbitrates between these requests giving priority to the execution unit requests. In response to a request, data cache controller 161 generates address, data and control signals for the data and tags RAMs in data cache 165. For a data cache hit, data cache controller 161 reorders the data RAM output to provide the right data.

Data cache controller 161 also generates requests to I/O bus and memory interface unit 110 in case of data cache misses, and in case of non-cacheable loads and stores. Data cache controller 161 provides the data path and control logic for processing non-cacheable requests, and the data path and data path control functions for handling cache misses.

For data cache hits, data cache unit 160 returns data to execution unit 140 in one cycle for loads. Data cache unit 160 also takes one cycle for write hits. In case of a cache miss, data cache unit 160 stalls the pipeline until the requested data is available from the external memory. For both non-cacheable loads and stores, data cache 165 is bypassed and requests are sent to I/O bus and memory interface unit 110. Non-aligned loads and stores to data cache 165 trap in software.

Data cache 165 is a two-way set associative, write back, write allocate, 16-byte line cache. The cache size is configurable to 0, 1, 2, 4, 8, 16 Kbyte sizes. The default size is 8 Kbytes. Each line has a cache tag store entry associated with the line. On a cache miss, 16 bytes of data are written into cache 165 from external memory.

Each data cache tag contains a 20-bit address tag field, one valid bit, and one dirty bit. Each cache tag is also associated with a least recently used bit that is used for replacement policy. To support multiple cache sizes, the width of the tag fields also can be varied. If a cache enable bit in processor service register is not set, loads and stores are treated like non-cacheable instructions by data cache controller 161.

A single sixteen-byte write back buffer is provided for writing back dirty cache lines which need to be replaced. Data cache unit 160 can provide a maximum of four bytes on a read and a maximum of four bytes of data can be written into cache 165 in a single cycle. Diagnostic reads and writes can be done on the caches.

Memory Allocation Accelerator

In one embodiment, data cache unit 160 includes a memory allocation accelerator 166. Typically, when a new object is created, fields for the object are fetched from external memory, stored in data cache 165 and then the field is cleared to zero. This is a time consuming process that is eliminated by memory allocation accelerator 166. When a new object is created, no fields are retrieved from external memory. Rather, memory allocation accelerator 166 simply stores a line of zeros in data cache 165 and marks that line of data cache 165 as dirty. Memory allocation accelerator 166 is particularly advantageous with a write-back cache. Since memory allocation accelerator 166 eliminates the external memory access each time a new object is created, the performance of hardware processor 100 is enhanced.

Floating Point Unit

Floating point unit (FPU) 143 includes a microcode sequencer, input/output section with input/output registers, a floating point adder, i.e., an ALU, and a floating point multiply/divide unit. The microcode sequencer controls the microcode flow and microcode branches. The input/output section provides the control for input/output data transactions, and provides the input data loading and output data unloading registers. These registers also provide intermediate result storage.

The floating point adder-ALU includes the combinatorial logic used to perform the floating point adds, floating point subtracts, and conversion operations. The floating point multiply/divide unit contains the hardware for performing multiply/divide and remainder.

Floating point unit 143 is organized as a microcoded engine with a 32-bit data path. This data path is often reused many times during the computation of the result. Double precision operations require approximately two to four times the number of cycles as single precision operations. The floating point ready signal is asserted one-cycle prior to the completion of a given floating point operation. This allows integer unit 142 to read the floating point unit output registers without any wasted interface cycles. Thus, output data is available for reading one cycle after the floating point ready signal is asserted.

Execution Unit Accelerators

Since the JAVA Virtual Machine Specification of Appendix I is hardware independent, the virtual machine instructions are not optimized for a particular general type of processor, e.g., a complex instruction set computer (CISC) processor, or a reduced instruction set computer (RISC) processor. In fact, some virtual machine instructions have a CISC nature and others a RISC nature. This dual nature complicates the operation and optimization of hardware processor 100.

For example, the JAVA virtual machine specification defines opcode 171 for an instruction lookupswitch, which is a traditional switch statement. The datastream to instruction cache unit 120 includes an opcode 171, identifying the N-way switch statement, that is followed zero to three bytes of padding. The number of bytes of padding is selected so that first operand byte begins at an address that is a multiple of four. Herein, datastream is used generically to indicate information that is provided to a particular element, block, component, or unit.

Following the padding bytes in the datastream are a series of pairs of signed four-byte quantities. The first pair is special. A first operand in the first pair is the default offset for the switch statement that is used when the argument, referred to as an integer key, or alternatively, a current match value, of the switch statement is not equal to any of the values of the matches in the switch statement. The second operand in the first pair defines the number of pairs that follow in the datastream.

Each subsequent operand pair in the datastream has a first operand that is a match value, and a second operand that is an offset. If the integer key is equal to one of the match values, the offset in the pair is added to the address of the switch statement to define the address to which execution branches. Conversely, if the integer key is unequal to any of the match values, the default offset in the first pair is added to the address of the switch statement to define the address to which execution branches. Direct execution of this virtual machine instruction requires many cycles.

To enhance the performance of hardware processor 100, a look-up switch accelerator 145 is included in hardware processor 100. Look-up switch accelerator 145 includes an associative memory which stores information associated with one or more lookup switch statements. For each lookup switch statement, i.e., each instruction lookupswitch, this information includes a lookup switch identifier value, i.e., the program counter value associated with the lookup switch statement, a plurality of match values and a corresponding plurality of jump offset values.

Lookup switch accelerator 145 determines whether a current instruction received by hardware processor 100 corresponds to a lookup switch statement stored in the associative memory. Lookup switch accelerator 145 further determines whether a current match value associated with the current instruction corresponds with one of the match values stored in the associative memory. Lookup switch accelerator 145 accesses a jump offset value from the associative memory when the current instruction corresponds to a lookup switch statement stored in the memory and the current match value corresponds with one of the match values stored in the memory wherein the accessed jump offset value corresponds with the current match value.

Lookup switch accelerator 145 further includes circuitry for retrieving match and jump offset values associated with a current lookup switch statement when the associative memory does not already contain the match and jump offset values associated with the current lookup switch statement. Lookup switch accelerator 145 is described in more detail in U.S. patent application Ser. No. 08/788,811, entitled "LOOK-UP SWITCH ACCELERATOR AND METHOD OF OPERATING SAME" naming Marc Tremblay and James Michael O'Connor as inventors, assigned to the assignee of this application, and filed on even date herewith, which is incorporated herein by reference in its entirety.

In the process of initiating execution of a method of an object, execution unit 140 accesses a method vector to retrieve one of the method pointers in the method vector, i.e., one level of indirection. Execution unit 140 then uses the accessed method pointer to access a corresponding method, i.e., a second level of indirection.

To reduce the levels of indirection within execution unit 140, each object is provided with a dedicated copy of each of the methods to be accessed by the object. Execution unit 140 then accesses the methods using a single level of indirection. That is, each method is directly accessed by a pointer which is derived from the object. This eliminates a level of indirection which was previously introduced by the method pointers. By reducing the levels of indirection, the operation of execution unit 140 can be accelerated. The acceleration of execution unit 140 by reducing the levels of indirection experienced by execution unit 140 is described in more detail in U.S. patent application Ser. No. 08/787,846, entitled "REPLICATING CODE TO ELIMINATE A LEVEL OF INDIRECTION DURING EXECUTION OF AN OBJECT ORIENTED COMPUTER PROGRAM" naming Marc Tremblay and James Michael O'Connor as inventors, assigned to the assignee of this application, and filed on even date herewith, which is incorporated herein by reference in its entirety.

Getfield-putfield Accelerator

Other specific functional units and various translation lookaside buffer (TLB) types of structures may optionally be included in hardware processor 100 to accelerate accesses to the constant pool. For example, the JAVA virtual machine specification defines an instruction putfield, opcode 181, that upon execution sets a field in an object and an instruction getfield, opcode 180, that upon execution fetches a field from an object. In both of these instructions, the opcode is followed by an index byte one and an index byte two. Operand stack 423 contains a reference to an object followed by a value for instruction putfield, but only a reference to an object for instruction getfield.

Index bytes one and two are used to generate an index into the constant pool of the current class. The item in the constant pool at that index is a field reference to a class name and a field name. The item is resolved to a field block pointer which has both the field width, in bytes, and the field offset, in bytes.

An optional getfield-putfield accelerator 146 in execution unit 140 stores the field block pointer for instruction getfield or instruction putfield in a cache, for use after the first invocation of the instruction, along with the index used to identify the item in the constant pool that was resolved into the field block pointer as a tag. Subsequently, execution unit 140 uses index bytes one and two to generate the index and supplies the index to getfield-putfield accelerator 146. If the index matches one of the indexes stored as a tag, i.e., there is a hit, the field block pointer associated with that tag is retrieved and used by execution unit 140. Conversely, if a match is not found, execution unit 140 performs the operations described above. Getfield-putfield accelerator 146 is implemented without using selfmodifying code that was used in one embodiment of the quick instruction translation described above.

In one embodiment, getfield-putfield accelerator 146 includes an associative memory that has a first section that holds the indices that function as tags, and a second section that holds the field block pointers. When an index is applied through an input section to the first section of the associative memory, and there is a match with one of the stored indices, the field block pointer associated with the stored index that matched in input index is output from the second section of the associative memory.

Bounds Check Unit

Bounds check unit 147 (FIG. 1) in execution unit 140 is an optional hardware circuit that checks each access to an element of an array to determine whether the access is to a location within the array. When the access is to a location outside the array, bounds check unit 147 issues an active array bound exception signal to execution unit 140. In response to the active array bound exception signal, execution unit 140 initiates execution of an exception handler stored in microcode ROM 141 that in handles the out of bounds array access.

In one embodiment, bounds check unit 147 includes an associative memory element in which is stored a array identifier for an array, e.g., a program counter value, and a maximum value and a minimum value for the array. When an array is accessed, i.e., the array identifier for that array is applied to the associative memory element, and assuming the array is represented in the associative memory element, the stored minimum value is a first input signal to a first comparator element, sometimes called a comparison element, and the stored maximum value is a first input signal to a second comparator element, sometimes also called a comparison element. A second input signal to the first and second comparator elements is the value associated with the access of the array's element.

If the value associated with the access of the array's element is less than or equal to the stored maximum value and greater than or equal to the stored minimum value, neither comparator element generates an output signal. However, if either of these conditions is false, the appropriate comparator element generates the active array bound exception signal. A more detailed description of one embodiment of bounds check unit 147 is provided in U.S. patent application Ser. No. 08/786,352, entitled "PROCESSOR WITH ACCELERATED ARRAY ACCESS BOUNDS CHECKING" naming Marc Tremblay, James Michael O'Connor, and William N. Joy as inventors, assigned to the assignee of this application, and filed on even date herewith which is incorporated herein by reference in its entirety.

The JAVA Virtual Machine Specification defines that certain instructions can cause certain exceptions. The checks for these exception conditions are implemented, and a hardware/software mechanism for dealing with them is provided in hardware processor 100 by information in microcode ROM 141 and program counter and trap control logic 170. The alternatives include having a trap vector style or a single trap target and pushing the trap type on the stack so that the dedicated trap handler routine determines the appropriate action.

No external cache is required for the architecture of hardware processor 100. No translation lookaside buffers need be supported.

Figure 5:
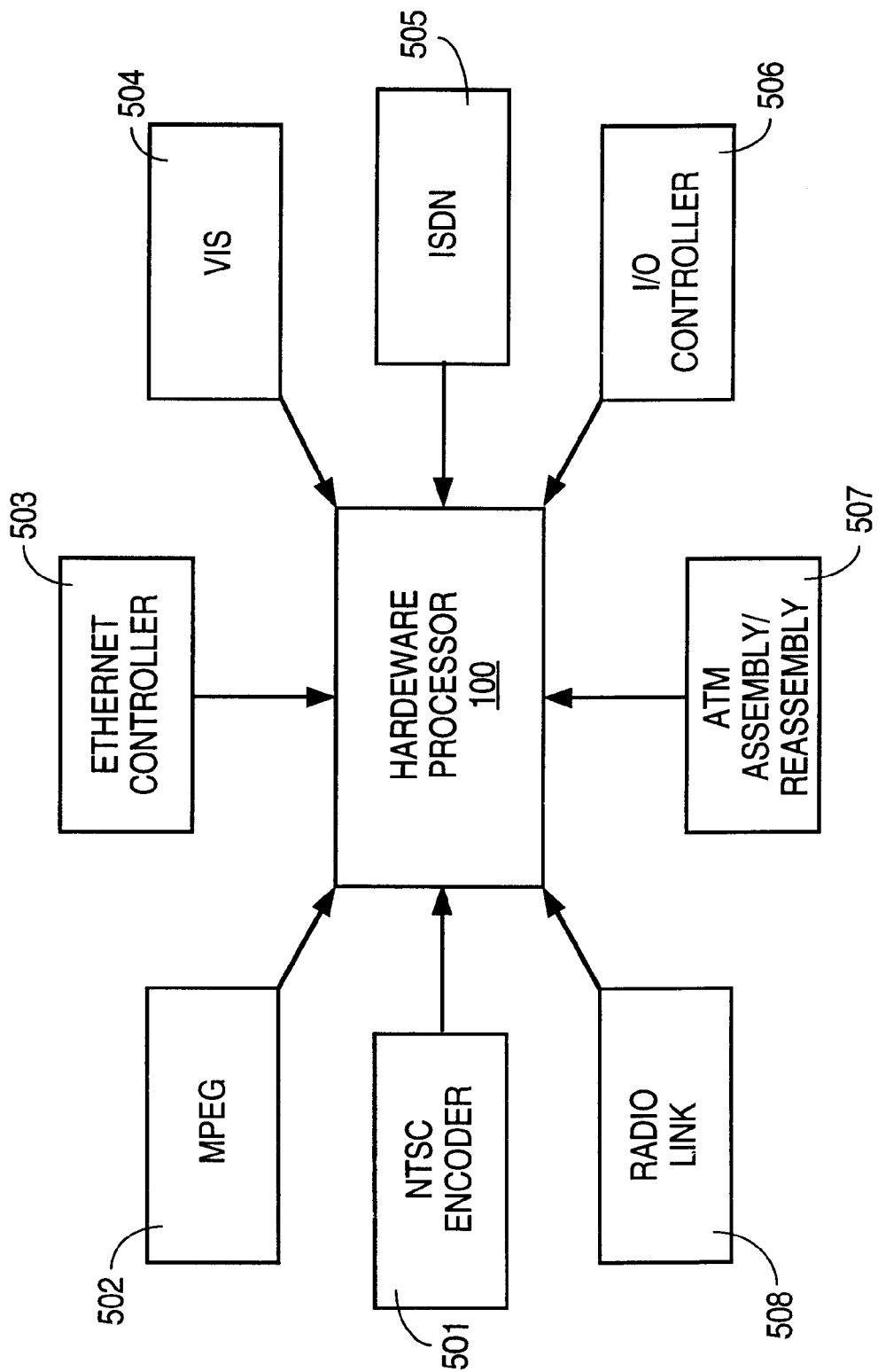
FIG. 5 illustrates several possible add-ons to the hardware processor of FIG. 1.

FIG. 5 illustrates several possible add-ons to hardware processor 100 to create a unique system. Circuits supporting any of the eight functions shown, i.e., NTSC encoder 501, MPEG 502, Ethernet controller 503, VIS 504, ISDN 505, I/O controller 506, ATM assembly/reassembly 507, and radio link 508 can be integrated into the same chip as hardware processor 100 of this invention.

Figure 6:
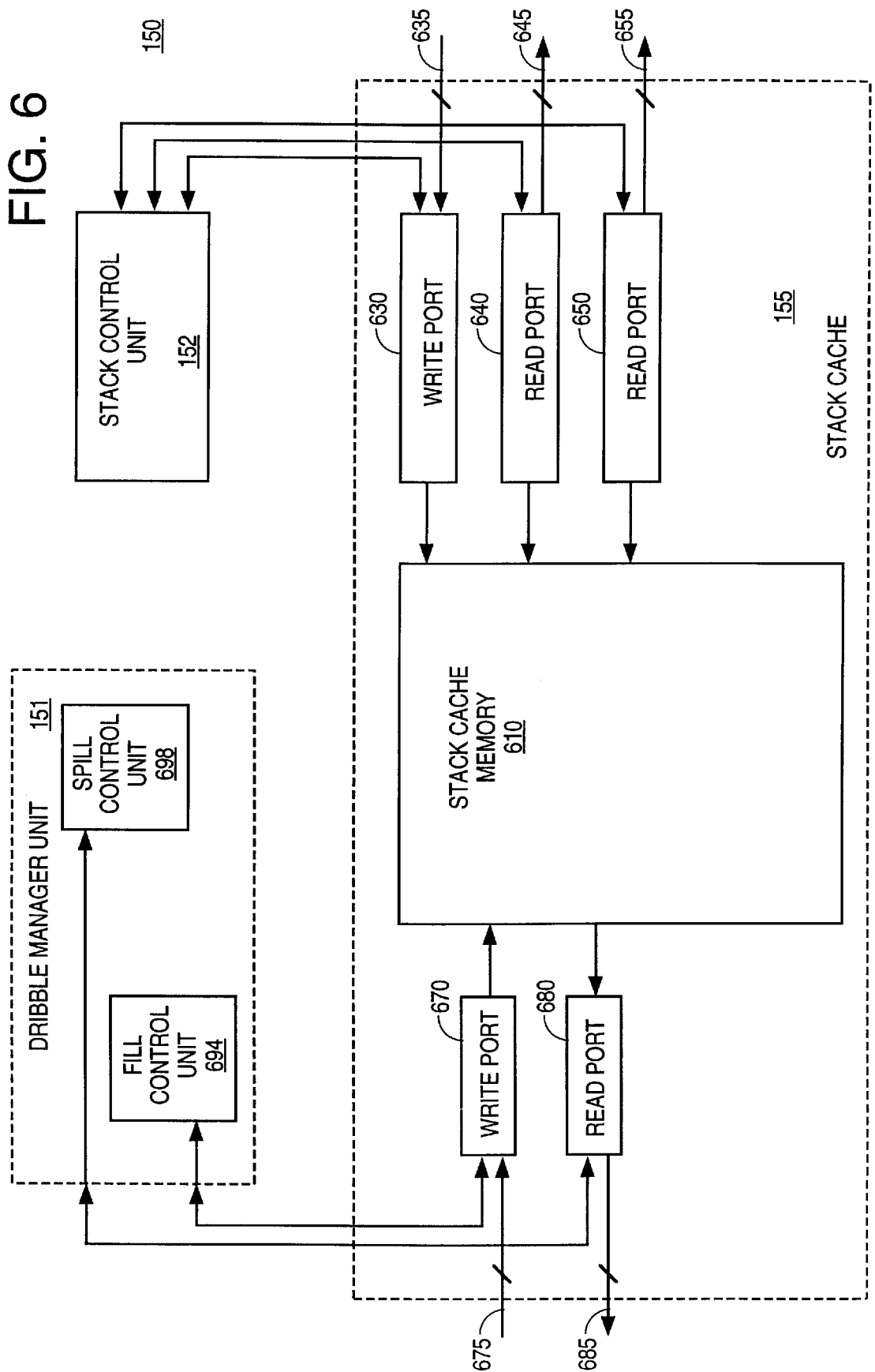
FIG. 6 illustrates a block diagram of one embodiment of a stack cache management unit in accordance with this invention.

FIG. 6 is a block diagram of one embodiment of a stack management unit 150. Stack management unit 150 serves as a high speed buffer between stack 400 and hardware processor 100. Hardware processor 100 accesses stack management unit 150 as if stack management unit 150 were stack 400. Stack management unit 150 automatically transfers data between stack management unit 150 and stack 400 as necessary to provide improve the throughput of data between stack 400 and hardware processor 100. In the embodiment of FIG. 1, if hardware processor 100 requires a data word which is not cached in stack management unit 150, data cache unit 160 retrieves the requested data word and places the requested data word at the top of stack cache 155.

Stack management unit 150 contains a stack cache memory circuit 610. Stack cache memory circuit 610 is typically fast memory devices such as a register file or SRAM; however, slower memory devices such as DRAM can also be used. In the embodiment of FIG. 6, access to stack cache memory circuit 610 is controlled by stack control unit 152. A write port 630 allows hardware processor 100 to write data on data lines 635 to stack cache memory circuit 610. Read port 640 and read port 650 allow hardware processor 100 to read data from stack cache memory circuit 610 on data lines 645 and 655, respectively. Two read ports are provided to increase throughput since many operations of stack-based computing systems require two operands from stack 400. Other embodiments of stack cache 155 may provide more or less read and write ports.

As explained above, dribble manager unit 151 controls the transfer of data between stack 400 (FIG. 4(a)) and stack cache memory circuit 610. In the embodiment shown in FIG. 1, the transfer of data between stack 400 and stack cache memory circuit 610 goes through data cache unit 160. Dribble manager unit 151 includes a fill control unit 694 and a spill control unit 698. In some embodiments of dribble manager unit 151, fill control unit 694 and spill control unit 698 function independently. Fill control unit 694 determines if a fill condition exists. If the fill condition exists, fill control unit 694 transfers data words from stack 400 to stack cache memory circuit 610 on data lines 675 through a write port 670. Spill control unit 698 determines if a spill condition exists. If the spill condition exists, spill control unit 698 transfers data words from stack cache memory circuit 610 to stack 400 through read port 680 on data lines 685. Write port 670 and read port 680 allows transfers between stack 400 and stack cache memory circuit 610 to occur simultaneously with reads and writes controlled by stack control unit 152. If contention for read and write ports of stack cache memory circuit 610 is not important, dribble manager unit 151 can share read and write ports with stack control unit 152.

Although stack management unit 150 is described in the context of buffering stack 400 for hardware processor 100, stack management unit 150 can perform caching for any stack-based computing system. The details of hardware processor 100 are provided only as an example of one possible stack-based computing system for use with the present invention. Thus, one skilled in the art can use the principles described herein to design a stack management unit in accordance to the present invention for any stack-based computing system.

Figure 7:
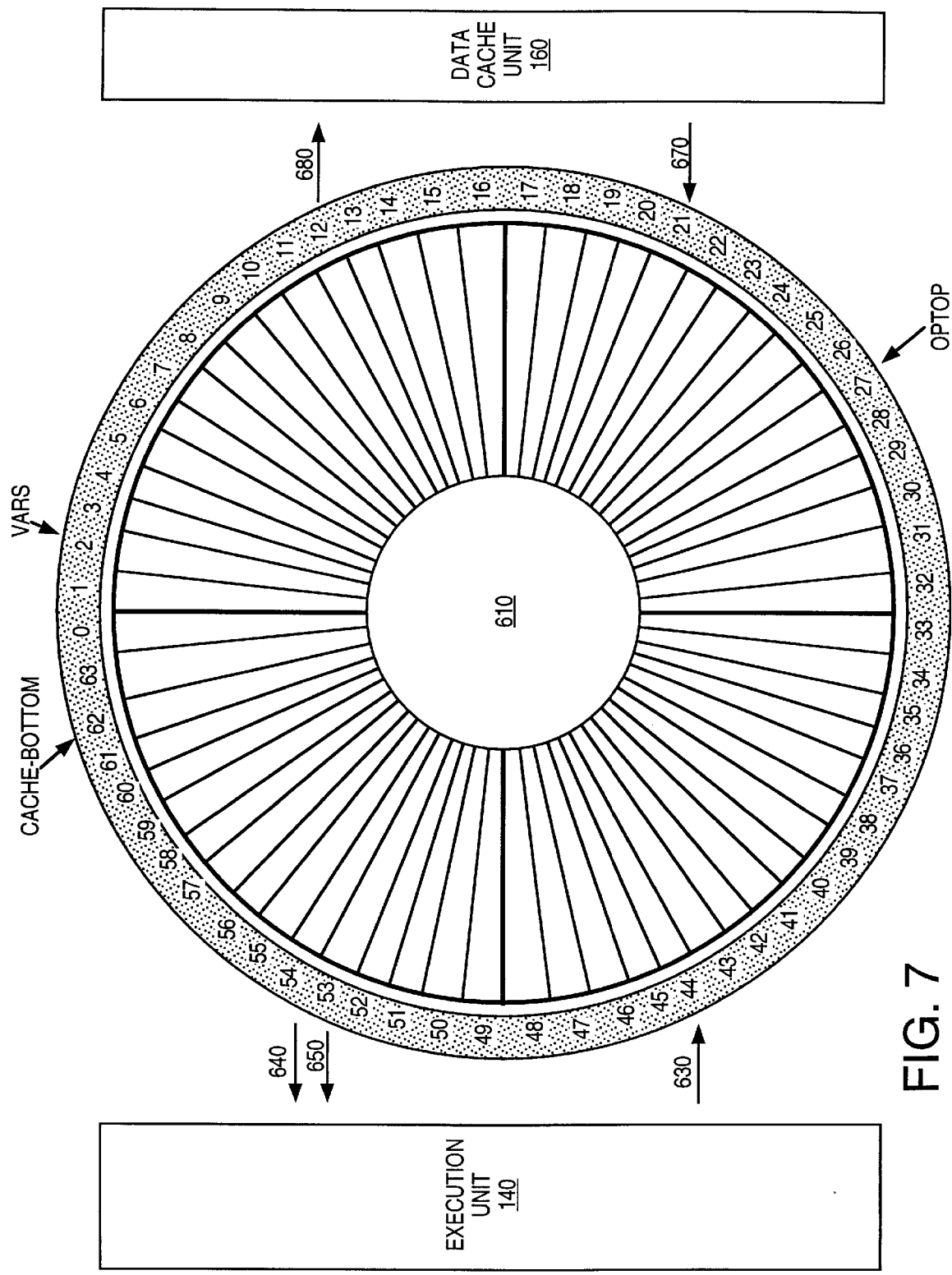
FIG. 7 illustrates the memory architecture of one embodiment of a stack cache in accordance with this invention.

FIG. 7 shows a conceptual model of the memory architecture of stack cache memory circuit 610 for one embodiment of stack cache 155. Specifically, in the embodiment of FIG. 7, stack cache memory circuit 610 is a register file organized in a circular buffer memory architecture capable of holding 64 data words. Other embodiments may contain a different number of data words. The circular memory architecture causes data words in excess of the capacity of stack cache memory circuit 610 to be written to previously used registers. If stack cache memory unit 610 uses a different memory device, such as an SRAM, different registers would correspond to different memory locations. One technique to address registers in a circular buffer is to use pointers containing modulo stack cache size (modulo-SCS) addresses to the various registers of stack cache memory circuit 610. As used herein, modulo-N operations have the results of the standard operation mapped to a number between 0 and SCS-1 using a standard MOD N function. Some common modulo operations are defined as follows Modulo-N addition of X and Y=(X+Y) MOD N,
Modulo-N subtraction of x and Y=(X-Y) MOD N,
Modulo-N increment of X by Y=(X+Y) MOD N,
Modulo-N decrement of X by Y=(X-Y) MOD N.

One embodiment of the pointer addresses of the registers of stack cache memory circuit 610 are shown in FIG. 7 as numbered 0–63 along the outer edge of stack cache memory circuit 610. Thus for the embodiment of FIG. 7, if 70 data words (numbered 1 to 70) are written to stack cache memory circuit 610 when stack cache memory circuit 610 is empty, data words 1 to 64 are written to registers 0 to 63, respectively and data words 65 to 70 are written subsequently to registers 0 to 5. Prior to writing data words 65 to 70, dribble manager unit 151, as described below, transfers data words 1 to 6 which were in registers 0 to 5 to stack 400. Similarly, as data words 70 to 65 are read out of stack cache memory circuit 610, data words 1 to 6 can be retrieved from stack 400 and placed in memory locations 0 to 5.

Since most reads and writes on a stack are from the top of the stack, a pointer OPTOP contains the location of the top of stack 400, i.e. the top memory location. In some embodiments of stack management unit 150, pointer OPTOP is a programmable register in execution unit 140. However other embodiments of stack management unit 150 maintain pointer OPTOP in stack control unit 152. Since pointer OPTOP is often increased by one, decreased by one, or changed by a specific amount, pointer OPTOP, in one embodiment is a programmable up/down counter.

Since stack management unit 150 contains the top portion of stack 400, pointer OPTOP indicates the register of stack cache memory circuit 610 containing the most recently written data word in stack cache memory circuit 610, i.e. pointer OPTOP points to the register containing the most recently written data word also called the top register. Some embodiments of stack management unit 150 also contains a pointer OPTOP1 (not shown) which points to the register preceding the register pointed to by pointer OPTOP. Pointer OPTOP1 can improve the performance of stack management unit 150 since many operations in hardware processor 100 require two data words from stack management unit 150.

Pointer OPTOP and pointer OPTOP1 are incremented whenever a new data word is written to stack cache 155. Pointer OPTOP and pointer OPTOP1 are decremented whenever a stacked data word, i.e. a data word already in stack 400, is popped off of stack cache 155. Since some embodiments of hardware processor 100 may add or remove multiple data words simultaneously, pointer OPTOP and OPTOP1 are implemented, in one embodiment as programmable registers so that new values can be written into the registers rather than requiring multiple increment or decrement cycles.

If stack cache 155 is organized using sequential addressing, pointer OPTOP1 may also be implemented using a modulo SCS subtractor which modulo-SCS subtracts one from pointer OPTOP. Some embodiments of stack cache 155 may also include pointers OPTOP2 or pointer OPTOP3.

Since data words are stored in stack cache memory circuit 610 circularly, the bottom of stack cache memory circuit 610 can fluctuate. Therefore, most embodiments of stack cache memory circuit 610 include a pointer CACHE_BOTTOM to indicate the bottom memory location of stack cache memory circuit 610. Pointer CACHE_BOTTOM is typically maintained by dribble manager unit 151. The process to increment or decrement pointer CACHE_BOTTOM varies with the specific embodiment of stack management unit 150. Pointer CACHE_BOTTOM is typically implemented as a programmable up/down counter.

Some embodiments of stack management unit 150 also includes other pointers, such as pointer VARS, which points to a memory location of a data word that is often accessed. For example, if hardware processor 100 is implementing the JAVA Virtual Machine, entire method frames may be placed in stack management unit 150. The method frames often contain local variables that are accessed frequently. Therefore, having pointer VARS pointed to the first local variable of the active method decreases the access time necessary to read the local variable. Other pointers such as a pointer VARS1 (not shown) and a pointer VARS2 (not shown) may point to other often used memory locations such as the next two local variables of the active method in a JAVA Virtual Machine. In some embodiments of stack management unit 150, these pointers are maintained in stack control unit 152. In embodiments adapted for use with hardware processor 100, pointer VARS is stored in a programmable register in execution unit 140. If stack cache 155 is organized using sequential addressing, pointer VARS1 may also be implemented using a modulo-SCS adder which modulo-SCS adds one to pointer VARS.

Figure 8:
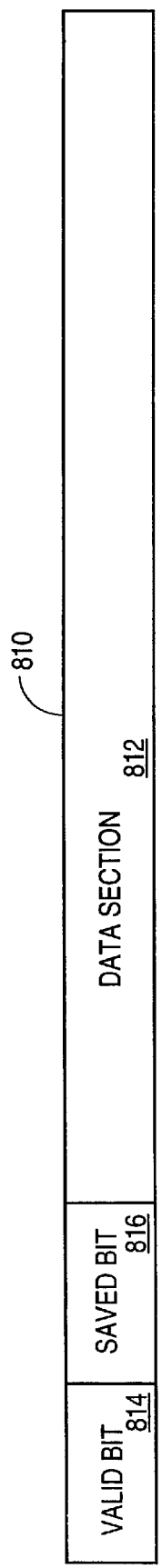
FIG. 8 illustrates the contents of a register or memory location of one embodiment of a stack cache in accordance with this invention.

To determine which data words to transfer between stack cache memory circuit 610 and stack 400, stack management unit 150, typically tags, i.e. tracks, the valid data words and the data words which are stored in both stack cache memory circuit 610 and stack 400. FIG. 8 illustrates one tagging scheme used in some embodiments of stack management unit 150. Specifically, FIG. 8 shows a register 810 from stack cache memory circuit 610. The actual data word is stored in data section 812. A valid bit 814 and a saved bit 816 are used to track the status of register 810. If valid bit 814 is at a valid logic state, typically logic high, data section 812 contains a valid data word. If valid bit 814 is at an invalid logic state, typically logic low, data section 812 does not contain a valid data word. If saved bit 816 is at a saved logic state, typically logic high, the data word contained in data section 812 is also stored in stack 400. However, if saved bit 816 is at an unsaved logic state, typically logic low, the data word contained in data section 812 is not stored in stack 400. Typically, when stack management unit 150 is powered up or reset, valid bit 814 of each register is set to the invalid logic state and saved bit 816 of each register is set to the unsaved logic state.

For the embodiment illustrated in FIG. 6 using the tagging method of FIG. 8, when stack control unit 152 writes a data word to a register in stack cache memory circuit 610 through write port 630 the valid bit of that register is set to the valid logic state and the saved bit of that register is set to the unsaved logic state. When dribble manager unit 151 transfer a data word to a register of stack cache memory circuit 610 through write port 670, the valid bit of that register is set to the valid logic state and the saved bit of that register is set to the saved logic state since the data word is currently saved in stack 400.

When hardware processor 100 reads a stacked data word using a stack popping operation from a register of stack cache memory circuit 610 through either read port 640 or read port 650 the valid bit of that register is set to the invalid logic state and the saved bit of that location is set to the unsaved logic state. Typically, stack popping operations use the register indicated by pointer OPTOP or pointer OPTOP1.

When hardware processor 100 reads a data word with a non-stack popping operation from a register of stack cache memory circuit 610 through either read port 640 or read port 650 the valid bit and saved bit of the register are not changed. For example, if hardware processor 100 is implementing the JAVA Virtual Machine, a local variable stored in stack cache memory circuit 610 in the register indicated by pointer VARS may be used repeatedly and should not be removed from stack cache 155. When dribble manager unit 151 copies a data word from a register of stack cache memory circuit 610 to stack 400 through read port 680, the valid bit of that register remains in the valid logic state since the saved data word is still contained in that register and the saved bit of that register is set to the saved logic state.

Since stack cache 155 is generally much smaller than the memory address space of hardware processor 100, the pointers used to access stack cache memory circuit 610 are generally much smaller than general memory addresses. The specific technique used to map stack cache 155 into the memory space of hardware processor 100 can vary. In one embodiment of hardware processor 100 the pointers used to access stack cache memory circuit 610 are only the lower bits of general memory pointers, i.e. the least significant bits. For example, if stack cache memory circuit 610 comprises 64 registers, pointers OPTOP, VARS, and CACHE_BOTTOM need only be six bits long. If hardware processor 100 has a 12 bit address space, pointers OPTOP, VARS, and CACHE_BOTTOM could be the lower six bits of a general memory pointer. Thus stack cache memory circuit 610 is mapped to a specific segment of the address space having a unique upper six bit combination.

Some embodiments of stack cache management unit 150 may be used with purely stacked based computing system so that there is not a memory address space for the system. In this situation, the pointers for accessing stack cache 155 are only internal to stack cache management unit 150.

As explained above, hardware processor 100 primarily accesses data near the top of the stack. Therefore, stack management unit 150 can improve data accesses of hardware processor 100 while only caching the top portion of stack 400. When hardware processor 100 pushes more data words to stack management unit 150 than stack cache memory circuit 610 is able to store, the data words near the bottom of stack cache memory circuit 610 are transferred to stack 400. When hardware processor 100 pops data words out of stack cache 155, data words from stack 400 are copied under the bottom of stack cache memory circuit 610, and pointer CACHE_BOTTOM is decremented to point to the new bottom of stack cache memory circuit 610.

Determination of when to transfer data words between stack 400 and stack cache memory circuit 610 as well as how many data words to transfer can vary. In general, dribble manager unit 151 should transfer data from stack cache memory circuit 610 to stack 400, i.e. a spill operation, as hardware processor fills stack cache memory circuit 610. Conversely, dribble manager unit 151 should copy data from stack 400 to stack cache memory circuit 610, i.e. a fill operation, as hardware processor empties stack cache memory circuit 610.

Figure 9:
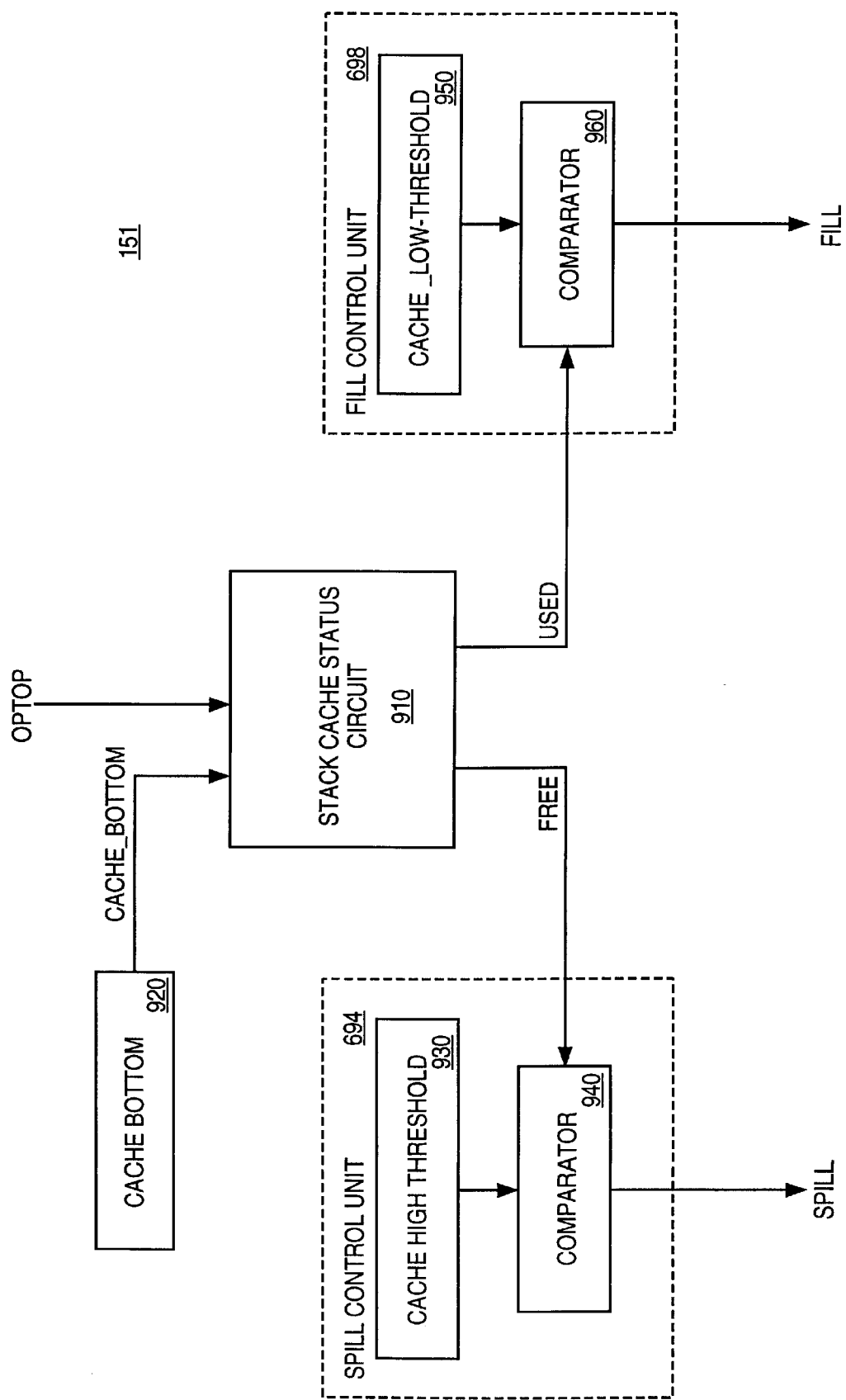
FIG. 9 illustrates a block diagram of one embodiment of a dribble manager unit in accordance with this invention.

FIG. 9 shows one embodiment of dribble manager unit 151 in which decisions on transferring data from stack cache memory circuit 610 to stack 400, i.e. spilling data, are based on the number of free registers in stack cache memory circuit 610. Free registers includes registers without valid data as well as registers containing data already stored in stack 400, i.e. registers with saved bit 816 set to the saved logic state. Decisions on transferring data from stack 400 to stack cache memory circuit 610, i.e. filling data, are based on the number of used registers. A used registers contains a valid but unsaved data word in stack cache memory circuit 610.

Specifically in the embodiment of FIG. 9, dribble manager unit 151 further includes a stack cache status circuit 910 and a cache bottom register 920, which can be a programmable up/down counter. Stack cache status circuit 910, receives pointer CACHE_BOTTOM from cache bottom register 920 and pointer OPTOP to determine the number of free registers FREE and the number of used registers USED.

For a circular buffer using sequential modulo-SCS addressing, as in FIG. 7, the number of free registers FREE is defined as FREE=SCS−(OPTOP−CACHE_BOTTOM+1) MOD SCS, where SCS is the size of stack cache 155. Thus, for the specific pointer values shown in FIG. 7, the number of free registers FREE is 34, as calculated by:

FREE=64−((27−62+1) MOD 64)=34.

Similarly, for a circular buffer using sequential modulo addressing, the number of used registers USED defined as USED=(OPTOP−CACHE_BOTTOM+1) MOD SCS.
 Thus, for the specific pointer values shown in FIG. 7, the number of used registers USED is 30, as calculated by:

USED=(27−62+1) MOD 64.

Thus, stack cache status circuit 910 can be implemented with a modulo SCS adder/subtractor. The number of used registers USED and the number of free registers FREE can also be generated using a programmable up/down counters. For example, a used register can be incremented whenever a data word is added to stack cache 155 and decremented whenever a data word is removed from stack cache 155. Specifically, if pointer OPTOP is modulo-SCS incremented by some amount, the used register is incremented by the same amount. If pointer OPTOP is modulo-SCS decremented by some amount, the used register is decremented by the same amount. However, if pointer CACHE_BOTTOM is modulo-SCS incremented by some amount, the used register is decremented by the same amount. If pointer CACHE_BOTTOM is modulo-SCS decremented by some amount, the used register is incremented the same amount. The number of free registers FREE can be generated by subtracting the number of used registers USED from the total number of registers.

Spill control unit 694 (FIGS. 6 and 9) includes a cache high threshold register 930 and a comparator 940. Comparator 940 compares the value in cache high threshold register 930 to the number of free registers FREE. If the number of free registers FREE is less than the value in cache high threshold register 930, comparator 940 drives a spill signal SPILL to a spill logic level, typically logic high, to indicate that the spill condition exists and one or more data words should be transferred from stack cache memory circuit 610 to stack 400, i.e. a spill operation should be performed. The spill operation is described in more detail below. Typically, cache high threshold register 930 is programmable by hardware processor 100.

Fill control unit 698 (FIGS. 6 and 9) includes a cache low threshold register 950 and a comparator 960. Comparator 960 compares the value in cache low threshold register 950 to the number of used registers USED. If the number of used registers is less than the value in cache low threshold register 950, comparator 960 drives a fill signal FILL to a fill logic level, typically logic high, to indicate that the fill condition exists and one or more data words should be transferred from stack 400 to stack cache memory circuit 610, i.e. a fill operation should be performed. The fill operation is described in more detail below. Typically, cache low threshold register 950 is programmable by hardware processor 100.

If the value in cache high threshold 930 and cache low threshold 940 is always the same, a single cache threshold register can be used. Fill control unit 698 can be modified to use the number of free registers FREE to drive signal FILL to the fill logic level if then number of free registers is greater than the value in cache low threshold 950, with a proper modification of the value in cache low threshold 950. Alternatively, spill control unit 694 can be modified to use the number of used registers.

Figure 10A:
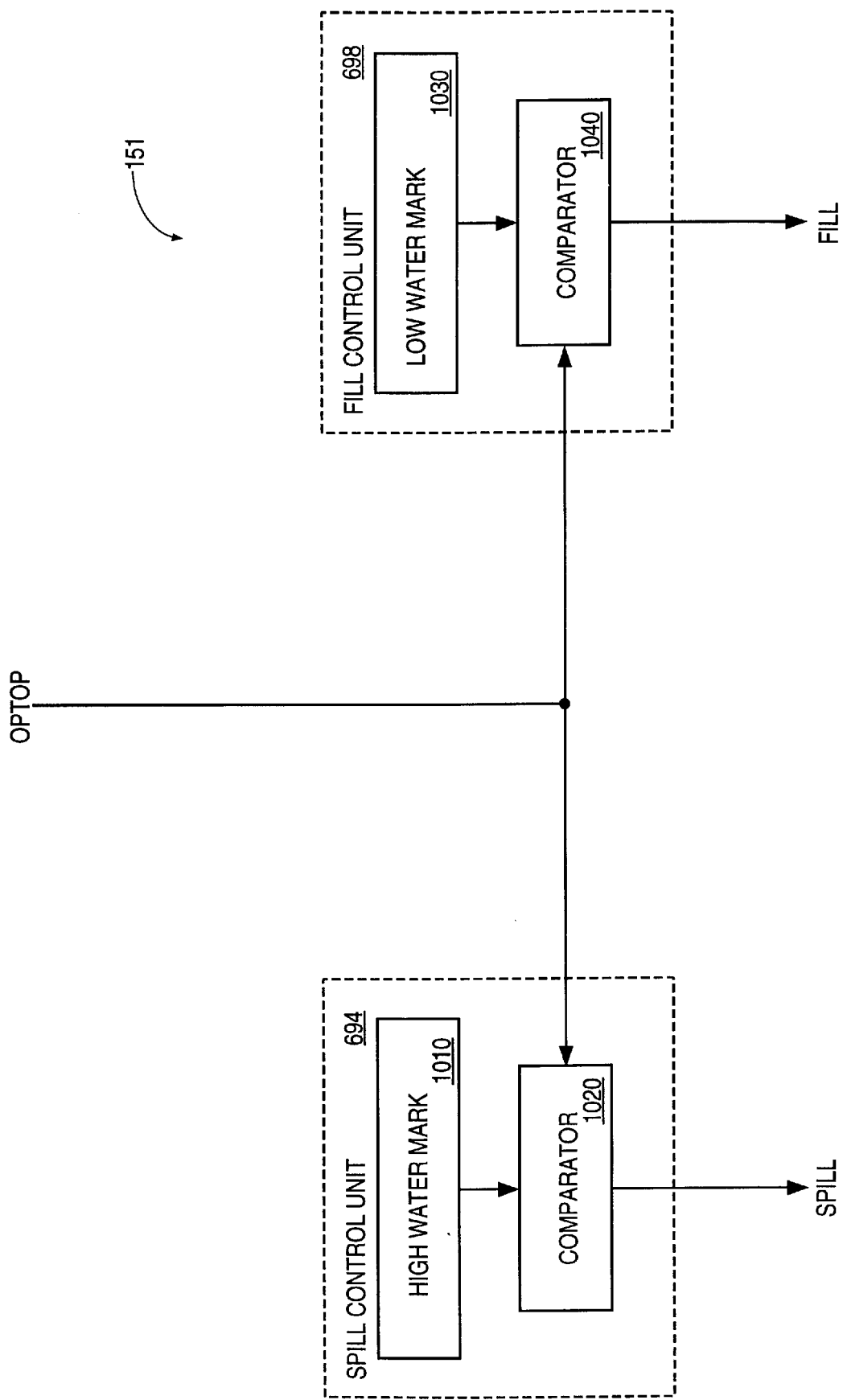
FIG. 10A illustrates a block diagram of another embodiment of a dribble manager unit in accordance with this invention.

FIG. 10A shows another embodiment of dribble manager unit 151, which uses a high-water mark/low-water mark heuristic to determine when a spill condition or a fill condition exists. Spill control unit 694 includes a high water mark register 1010 implemented as a programmable up/down counter. A comparator 1020 in spill control unit 694 compares the value in high water mark register 1010, i.e. the high water mark, with pointer OPTOP. If pointer OPTOP is greater than the high water mark, comparator 1020 drives spill signal SPILL to the spill logic level to indicate a spill operation should be performed. Since, the high water mark is relative to pointer CACHE_BOTTOM, the high water mark is modulo-SCS incremented and modulo-SCS decremented whenever pointer CACHE_BOTTOM is modulo-SCS incremented or modulo-SCS decremented, respectively.

Fill control unit 698 includes a low water mark register 1010 implemented as a programmable up/down counter. A comparator 1030 in fill control unit 698 compares the value in low water mark register 1030, i.e. the low water mark, with pointer OPTOP. If pointer OPTOP is less than the low water mark, comparator 1040 drives fill signal FILL to the fill logic level to indicate a fill operation should be performed. Since the low water mark is relative to pointer CACHE_BOTTOM, the low water mark register is modulo-SCS incremented and modulo-SCS decremented whenever pointer CACHE_BOTTOM is modulo-SCS incremented or modulo-SCS decremented, respectively.

Figure 10B:
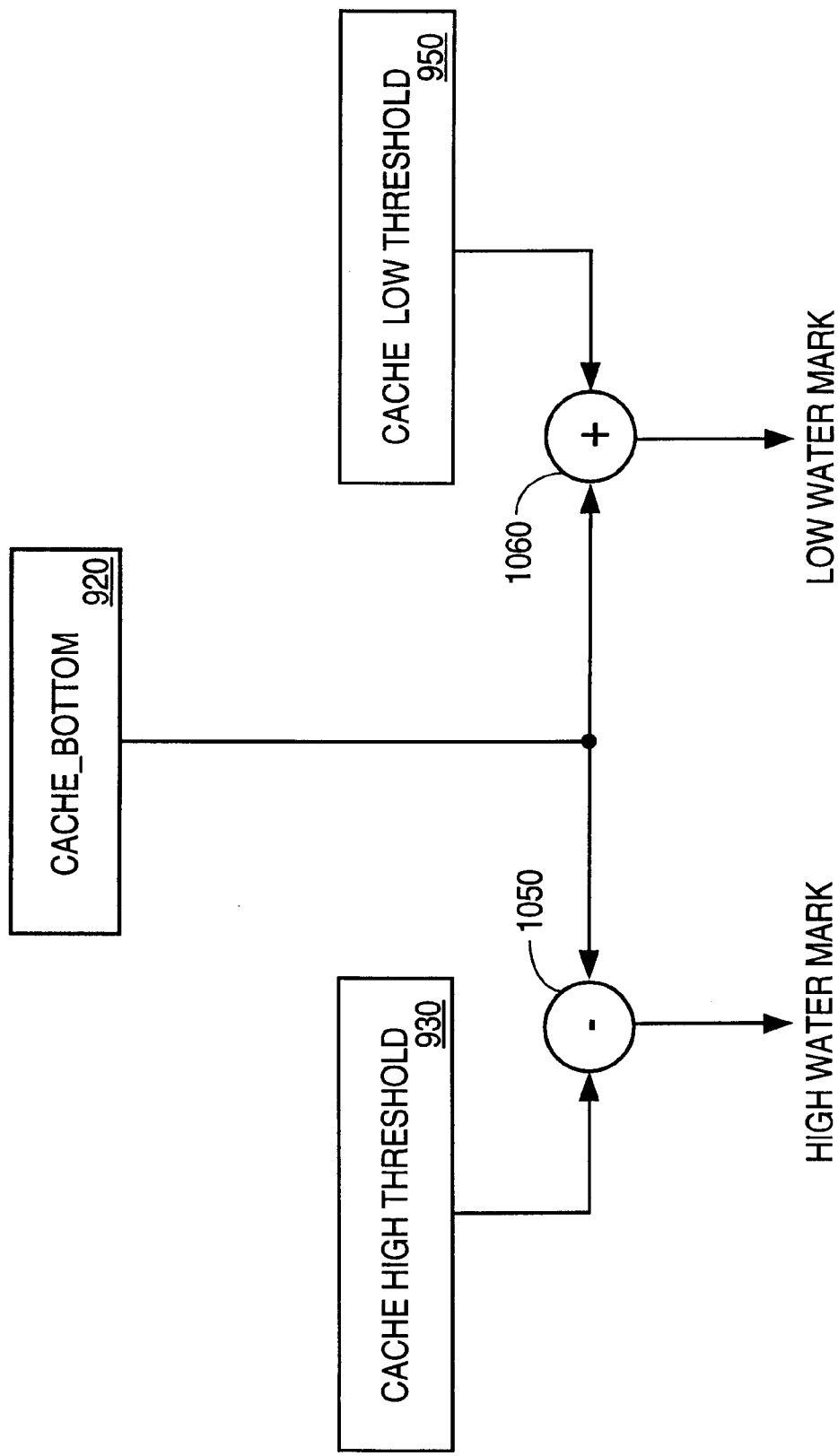
FIG. 10B illustrates a block diagram of another embodiment of a dribble manager unit in accordance with this invention.

FIG. 10B shows an alternative circuit to generate the high water mark and low water mark. Cache high threshold register 930, typically implemented as a programmable register, contains the number of free registers which should be maintained in stack cache memory circuit 610. The high water mark is then calculated by modulo-SCS subtractor 1050 by modulo-SCS subtracting the value in cache high threshold register 930 from pointer CACHE_BOTTOM stored in cache bottom register 920.

The low water mark is calculated by doing a modulo-SCS addition. Specifically, cache low threshold register 950 is programmed to contain the minimum number of used data registers desired to be maintained in stack cache memory circuit 610. The low water mark is then calculated by modulo-SCS adder 1060 by modulo-SCS adding the value in cache low threshold register 950 with pointer CACHE_BOTTOM stored in cache bottom register 920.

As described above, a spill operation is the transfer of one or more data words from stack cache memory circuit 610 to stack 400. In the embodiment of FIG. 1, the transfers occurs though data cache unit 160. The specific interface between stack management unit 150 and data cache unit 160 can vary. Typically, stack management unit 150, and more specifically dribble manager unit 151, sends the data word located at the bottom of stack cache 155, as indicated by pointer CACHE_BOTTOM from read port 680 to data cache unit 160. The value of pointer CACHE_BOTTOM is also provided to data cache unit 160 so that data cache unit 160 can address the data word appropriately. The saved bit of the register indicated by pointer CACHE_BOTTOM is set to the saved logic level. In addition, pointer CACHE_BOTTOM is modulo-SCS incremented by one. Other registers as described above may also be modulo-SCS incremented by one. For example, high water mark register 1010 (FIG. 10A)and low water mark 1030 would be modulo-SCS incremented by one. Some embodiments of dribble manager unit 151 transfer multiple words for each spill operation. For these embodiments, pointer CACHE_BOTTOM is modulo-SCS incremented by the number words transferred to stack 400.

In embodiments using a saved bit and valid bit, as shown in FIG. 8, some optimization is possible. Specifically, if the saved bit of the data register pointed to by pointer CACHE_BOTTOM is at the saved logic level, the data word in that data register is already stored in stack 400. Therefore, the data word in that data register does not need to be copied to stack 400. However, pointer CACHE_BOTTOM is still modulo-SCS incremented by one.

A fill operation transfers data words from stack 400 to stack cache memory circuit 610. In the embodiment of FIG. 1, the transfers occurs though data cache unit 160. The specific interface between stack management unit 150 and data cache unit 160 can vary. Typically, stack management unit 150, and more specifically dribble manager unit 151, determines whether the data register preceding the data register pointed by CACHE_BOTTOM is free, i.e. either the saved bit is in the saved logic state or the valid bit is in the invalid logic state. If the data register preceding the data register pointed to by pointer CACHE_BOTTOM is free, dribble manager unit 151 requests a data word from stack 400 by sending a request with the value of pointer CACHE_BOTTOM modulo-SCS minus one. When the data word is received from data cache unit 160, pointer CACHE_ BOTTOM is modulo-SCS decremented by one and the received data word is written to the data register pointed to by pointer CACHE_BOTTOM through write port 670. Other registers as described above may also be modulo-SCS decremented. The saved bit and valid bit of the register pointed to by pointer CACHE_BOTTOM are set to the saved logic state and valid logic state, respectively. Some embodiments of dribble manager unit 151 transfer multiple words for each spill operation. For these embodiments, pointer CACHE_BOTTOM is modulo-SCS decremented by the number words transferred to stack 400.

In embodiments using a saved bit and valid bit, as shown in FIG. 8, some optimization is possible. Specifically, if the saved bit and valid bit of the data register preceding the data register pointed to by pointer CACHE_BOTTOM is at the saved logic level and the valid logic level, respectively, then the data word in that data register was never overwritten. Therefore, the data word in that data register does not need to be copied from stack 400. However, pointer CACHE_ BOTTOM is still modulo-SCS decremented by one.

Figure 11:
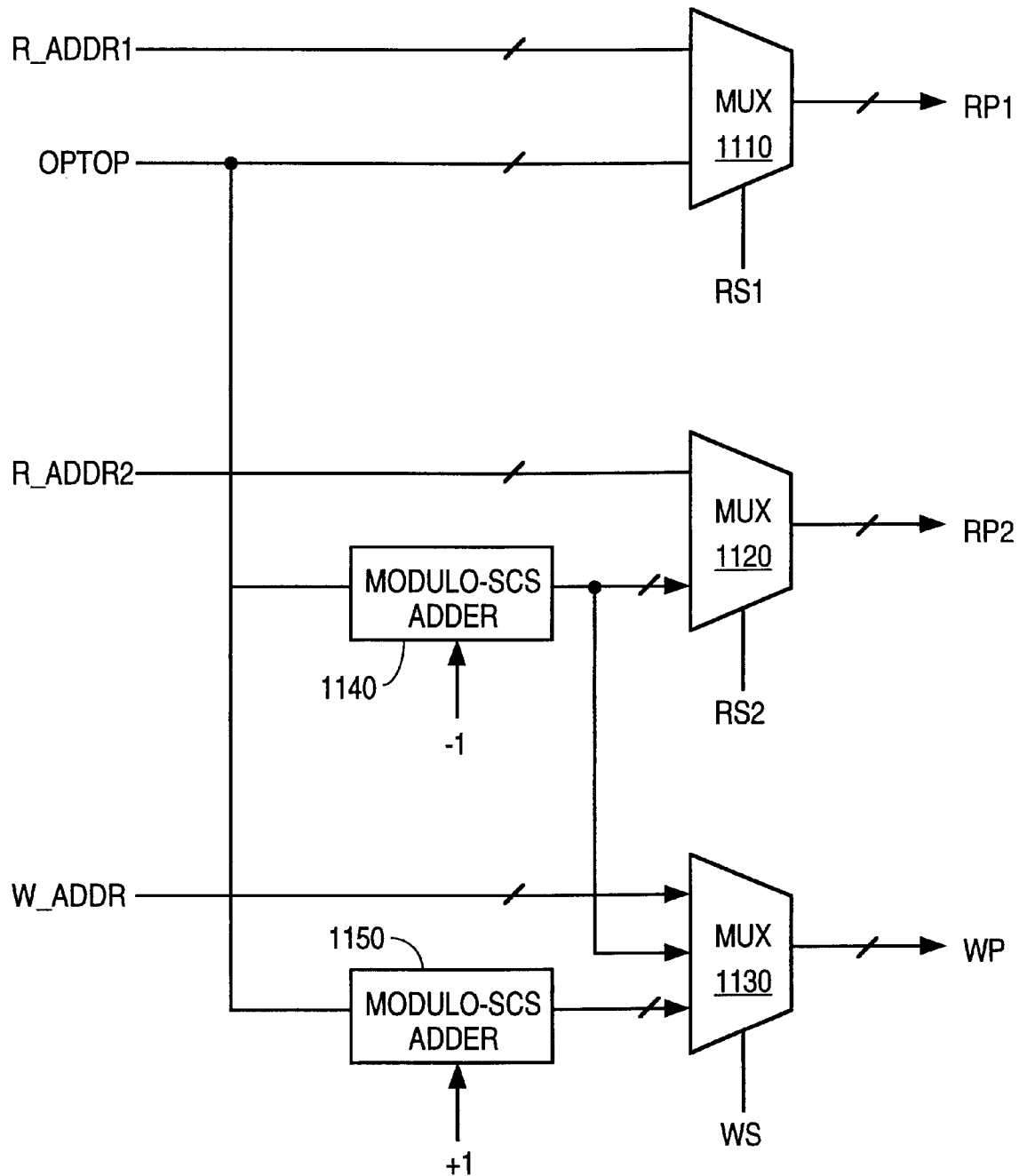
FIG. 11 illustrates a block diagram of a portion of an embodiment of a dribble manager unit in accordance with this invention.

As stated above, in one embodiment of stack cache 155, hardware processor 100 accesses stack cache memory circuit 610 (FIG. 6) through write port 630, read port 640 and read port 650. Stack control unit 152 generates pointers for write port 630, read port 640, and read port 650 based on the requests of hardware processor 100. FIG. 11 shows a circuit to generate pointers for a typical operation which reads two data words from stack cache 155 and writes one data word to stack cache 155. The most common stack manipulation for a stack-based computing system is to pop the top two data words off of the stack and to push a data word onto the top of the stack. Therefore, the circuit of FIG. 11 is configured to be able to provide read pointers to the value of pointer OPTOP and the value of pointer OPTOP modulo-SCS minus one, and a write pointer to the current value of OPTOP modulo-SCS minus one.

Multiplexer (MUX) 1110 drives a read pointer RP1 for read port 640. A select line RS1 controlled by hardware processor 100 determines whether multiplexer 1110 drives the same value as pointer OPTOP or a read address R_ADDR1 as provided by hardware processor 100.

Multiplexer 1120 provides a read pointer RP2 for read port 650. Modulo adder 1140 modulo-SCS adds negative one to the value of pointer OPTOP and drives the resulting sum to multiplexer 1120. A select line RS2 controlled by hardware processor 100 determines whether multiplexer 1120 drives the value from modulo adder 1140 or a read address R_ADDR2 as provided by hardware processor 100.

Multiplexer 1130 provides a write pointer WP for write port 630. A modulo adder 1150 modulo-SCS adds one to the value of pointer OPTOP and drives the resulting sum to multiplexer 1130. Select lines WS controlled by hardware processor 100 determines whether multiplexer 1130 drives the value from modulo-SCS adder 1140, the value from modulo-SCS adder 1150, or a write address W_ADDR as provided by hardware processor 100.

Figure 12:
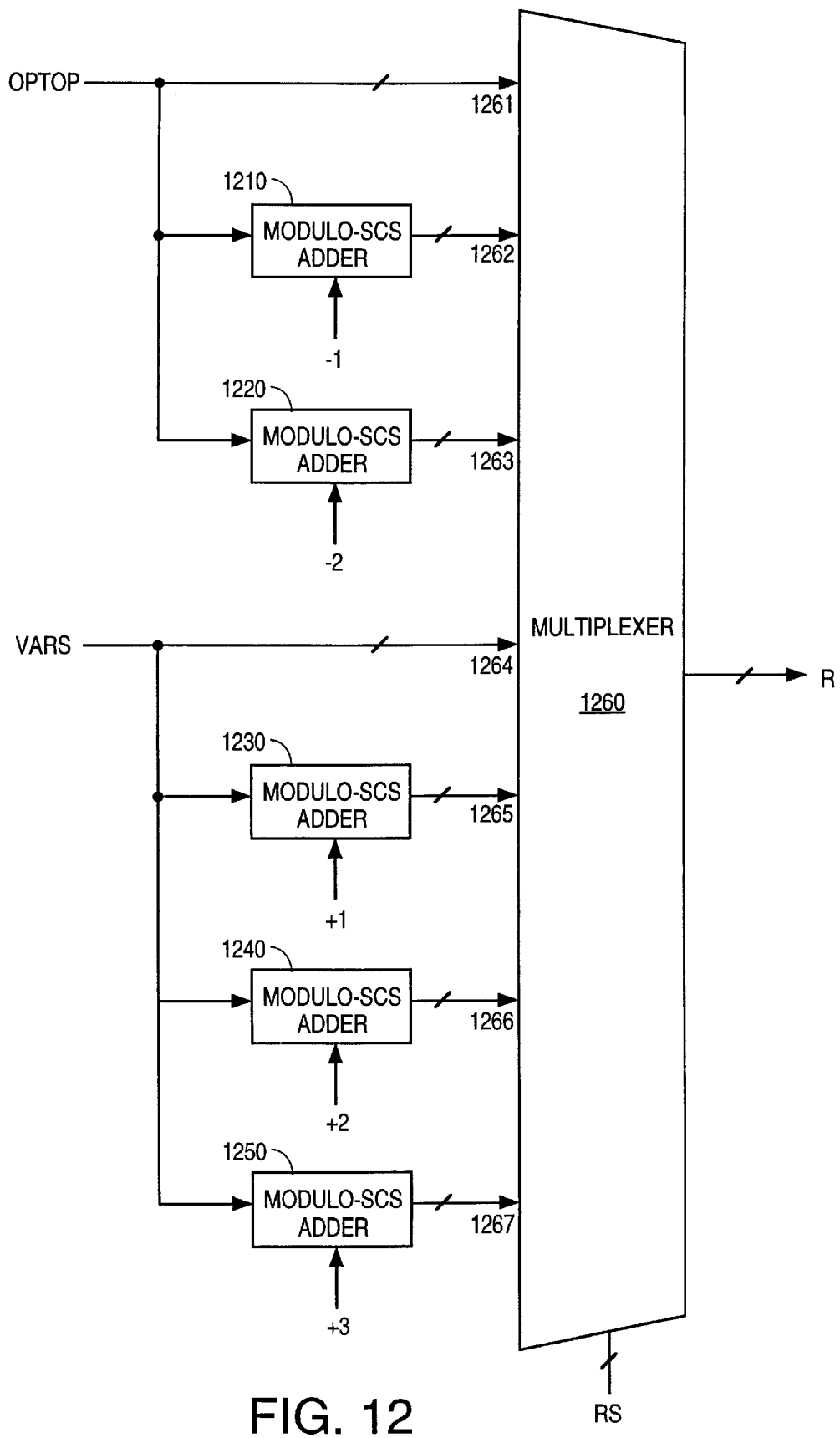
FIG. 12 illustrates a pointer generation circuit for one embodiment of a stack cache in accordance with this invention.

FIG. 12 shows a circuit that generates a read pointer R for read port 640 or read port 650 in embodiments allowing accessing stack cache memory circuit using pointer VARS. Multiplexer 1260 drives read pointer R to one of several input values received on input ports 1261–1267 as determined by selection signals RS. Selection signals RS are controlled by hardware processor 100. The value of pointer OPTOP is driven to input port 1261. Modulo-SCS adder 1210 drives the modulo-SCS sum of the value of pointer OPTOP with negative one to input port 1262. Modulo-SCS adder 1210 drives the modulo-SCS sum of the value of pointer OPTOP with negative two to input port 1263. The value of pointer VARS is driven to input port 1264. Modulo-SCS adder 1230 drives the modulo-SCS sum of the value of pointer VARS with one to input port 1265. Modulo-SCS adder 1240 drives the modulo-SCS sum of the value of pointer VARS with two to input port 1266. Modulo adder-SCS 1250 drives the modulo-SCS sum of the value of pointer VARS with three to input port 1263. Other embodiments may provide other values to the input ports of multiplexer 1260.

Thus by using the stack cache according to the principles of the invention, a dribbling management unit can efficiently control transfers between the stack cache and the stack. Specifically, the dribbling management unit is able to transfer data out of the stack cache to make room for additional data as necessary and transfer data into the stack cache as room becomes available transparently to the stack-based computing system using the stack management unit.

The various embodiments of the structure and method of this invention that are described above are illustrative only of the principles of this invention and are not intended to limit the scope of the invention to the particular embodiments described. In view of this disclosure, those skilled-in-the-art can define other memory circuits, registers, counters, stack-based computing systems, dribble management units, fill control units, spill control units, read ports, write ports, and use these alternative features to create a method or system of stack caching according to the principles of this invention.

APPENDIX I

The JAVA Virtual Machine Specification

©1993, 1994, 1995 Sun Microsystems, Inc.

2550 Garcia Avenue, Mountain View, California 94043-1100 U.S.A.

All rights reserved. This BETA quality release
and related documentation are protected by copyright
and distributed under licenses restricting its use,
copying, distribution, and decompilation. No part of
this release or related documentation may be reproduced
in any form by any means without prior written
authorization of Sun and its licensors, if any.

Portions of this product may be derived from the
UNIX® and Berkeley 4.3 BSD systems, licensed from UNIX
System Laboratories, Inc. and the University of
California, respectively. Third-party font software in
this release is protected by copyright and licensed
from Sun's Font Suppliers.

RESTRICTED RIGHTS LEGEND: Use, duplication, or
disclosure by the United States Government is subject
to the restrictions set forth in DFARS 252.227-7013
(c)(1)(ii) and FAR 52.227-19.

The release described in this manual may be
protected by one or more U.S. patents, foreign patents,
or pending applications.

TRADEMARKS

Sun, Sun Microsystems, Sun Microsystems Computer
Corporation, the Sun logo, the Sun Microsystems
Computer Corporation logo, WebRunner, JAVA, FirstPerson and the FirstPerson logo and agent are trademarks or registered trademarks of Sun Microsystems, Inc. The "Duke" character is a trademark of Sun Microsystems, Inc. and Copyright (c) 1992-1995 Sun Microsystems, Inc.
All Rights Reserved. UNIX® is a registered trademark in the United States and other countries, exclusively licensed through X/Open Company, Ltd. OPEN LOOK is a registered trademark of Novell, Inc. All other product names mentioned herein are the trademarks of their respective owners.

All SPARC trademarks, including the SCD Compliant Logo, are trademarks or registered trademarks of SPARC International, Inc. SPARCstation, SPARCserver, SPARCengine, SPARCworks, and SPARCompiler are licensed exclusively to Sun Microsystems, Inc. Products bearing SPARC trademarks are based upon an architecture developed by Sun Microsystems, Inc.

The OPEN LOOK® and Sun™ Graphical User Interfaces were developed by Sun Microsystems, Inc. for its users and licensees. Sun acknowledges the pioneering efforts of Xerox in researching and developing the concept of visual or graphical user interfaces for the computer industry. Sun holds a non-exclusive license from Xerox to the Xerox Graphical User Interface, which license also covers Sun's licensees who implement OPEN LOOK GUIs and otherwise comply with Sun's written license agreements.

X Window System is a trademark and product of the Massachusetts Institute of Technology.

THIS PUBLICATION IS PROVIDED "AS IS" WITHOUT WARRANTY OF ANY KIND, EITHER EXPRESS OR IMPLIED,
INCLUDING, BUT NOT LIMITED TO, THE IMPLIED WARRANTIES OF MERCHANTABILITY, FITNESS FOR A PARTICULAR PURPOSE, OR NON-INFRINGEMENT.

THIS PUBLICATION COULD INCLUDE TECHNICAL INACCURACIES
OR TYPOGRAPHICAL ERRORS. CHANGES ARE PERIODICALLY ADDED TO THE INFORMATION HEREIN; THESE CHANGES WILL BE INCORPORATED IN NEW EDITIONS OF THE PUBLICATION. SUN MICROSYSTEMS, INC. MAY MAKE IMPROVEMENTS AND/OR CHANGES IN THE PRODUCT(S) AND/OR THE PROGRAM(S) DESCRIBED IN
THIS PUBLICATION AT ANY TIME.

Preface

This document describes version 1.0 of the JAVA Virtual Machine and its instruction set. We have written this document to act as a specification for both compiler writers, who wish to target the machine, and as a specification for others who may wish to implement a compliant JAVA Virtual Machine.

The JAVA Virtual Machine is an imaginary machine that is implemented by emulating it in software on a real machine. Code for the JAVA Virtual Machine is stored in .class files, each of which contains the code for at most one public class.

Simple and efficient emulations of the JAVA Virtual Machine are possible because the machine's format is compact and efficient bytecodes. Implementations whose native code speed approximates that of compiled C are also possible, by translating the bytecodes to machine code, although Sun has not released such implementations at this time.
   The rest of this document is structured as follows:
    Chapter 1 describes the architecture of the JAVA Virtual Machine;
    Chapter 2 describes the .class file format;
       Chapter 3 describes the bytecodes; and
    Appendix A contains some instructions generatedinternally by Sun's implementation of the JAVA Virtual Machine. While not strictly part of the specification we
       describe these here so that this specification can serve as a reference for our implementation. As more implementations of the JAVA Virtual Machine become available, we may remove Appendix A from future
releases.

Sun will license the JAVA Virtual Machine trademark and logo for use with compliant
implementations of this specification. If you are
considering constructing your own implementation of the
JAVA Virtual Machine please contact us, at the email
address below, so that we can work together to insure
100% compatibility of your implementation.

Send comments on this specification or questions
about implementing the JAVA Virtual Machine to our
electronic mail address:JAVA@JAVA.sun.com.

1. JAVA Virtual Machine Architecture
1.1 Supported Data Types

The virtual machine data types include the basic
data types of the JAVA language:

```
byte    // 1-byte signed 2's complement integer
short   // 2-byte signed 2's complement integer
int     // 4-byte signed 2's complement integer
long    // 8-byte signed 2's complement integer
float   // 4-byte IEEE 754 single-precision float
double  // 8-byte IEEE 754 double-precision float
char    // 2-byte unsigned Unicode character
```

Nearly all JAVA type checking is done at compile
time. Data of the primitive types shown above need not
be tagged by the hardware to allow execution of JAVA.
Instead, the bytecodes that operate on primitive values
indicate the types of the operands so that, for
example, the iadd, ladd, fadd, and dadd instructions
each add two numbers, whose types are int, long, float,
and double, respectively The virtual machine doesn't have separate
instructions for boolean types. Instead, integer
instructions, including integer returns, are used to
operate on boolean values; byte arrays are used for
arrays of boolean.

The virtual machine specifies that floating point
be done in IEEE 754 format, with support for gradual underflow. Older computer architectures that do not have support for IEEE format may run JAVA numeric programs very slowly.

Other virtual machine data types include:
       object          // 4-byte reference to a JAVA
                        object
       returnAddress   // 4 bytes, used with
                        jsr/ret/jsr_w/ret_w instructions
Note: JAVA arrays are treated as objects.

This specification does not require any particular internal structure for objects. In our implementation an object reference is to a handle, which is a pair of pointers: one to a method table for the object, and the other to the data allocated for the object. Other
implementations may use inline caching, rather than method table dispatch; such methods are likely to be faster on hardware that is emerging between now and the year 2000.

Programs represented by JAVA Virtual Machine
bytecodes are expected to maintain proper type discipline and an implementation may refuse to execute a bytecode program that appears to violate such type discipline.

While the JAVA Virtual Machines would appear to be
limited by the bytecode deðnition to running on a 32-bit address space machine, it is possible to build a version of the JAVA Virtual Machine that automatically translates the bytecodes into a 64-bit form. A description of this transformation is beyond the scope
of the JAVA Virtual Machine Specification.

1.2 Registers

At any point the virtual machine is executing the code of a single method, and the pc register contains
the address of the next bytecode to be executed.

Each method has memory space allocated for it to

-77- hold:
a set of local variables, referenced by a vars
register;
an operand stack, referenced by an optop register;
and
a execution environment structure, referenced by a
frame register.
All of this space can be allocated at once, since
the size of the local variables and operand stack are
known at compile time, and the size of the execution
environment structure is well-known to the interpreter.
All of these registers are 32 bits wide.

1.3 Local Variables

Each JAVA method uses a fixed-sized set of local
variables. They are addressed as word offsets from the
vars register. Local variables are all 32 bits wide.

Long integers and double precision floats are
considered to take up two local variables but are
addressed by the index of the first local variable.
(For example, a local variable with index containing a
double precision float actually occupies storage at
indices n and n+1.) The virtual machine specifcation
does not require 64-bit values in local variables to be
64-bit aligned. Implementors are free to decide the
appropriate way to divide long integers and double
precision floats into two words.

Instructions are provided to load the values of
local variables onto the operand stack and store values
from the operand stack into local variables.

1.4 The Operand Stack

The machine instructions all take operands from an
operand stack, operate on them, and return results to
the stack. We chose a stack organization so that it
would be easy to emulate the machine efficiently on

-78- machines with few or irregular registers such as the
Intel 486 microprocessor.

The operand stack is 32 bits wide. It is used to
pass parameters to methods and receive method results,
as well as to supply parameters for operations and save
operation results.

For example, execution of instruction iadd adds
two integers together. It expects that the two
integers are the top two words on the operand stack,
and were pushed there by previous instructions. Both
integers are popped from the stack, added, and their
sum pushed back onto the operand stack.
Subcomputations may be nested on the operand stack, and
result in a single operand that can be used by the
nesting computation.

Each primitive data type has specialized
instructions that know how to operate on operands of
that type. Each operand requires a single location on
the stack, except for long and double operands, which
require two locations.

Operands must be operated on by operators
appropriate to their type. It is illegal, for example,
to push two integers and then treat them as a long.
This restriction is enforced, in the Sun
implementation, by the bytecode verifier. However, a
small number of operations (the dup opcodes and swap)
operate on runtime data areas as raw values of a given
width without regard to type.

In our description of the virtual machine
instructions below, the effect of an instruction's
execution on the operand stack is represented
textually, with the stack growing from left to right,
and each 32-bit word separately represented. Thus:

Stack: ..., value1, value2 ⇒ ..., value3 shows an operation that begins by having value2 on top
of the stack with value1 just beneath it. As a result

-79- of the execution of the instruction, value1 and value2 are popped from the stack and replaced by value3, which has been calculated by the instruction. The remainder of the stack, represented by an ellipsis, is unaffected by the instruction's execution.

The types long and double take two 32-bit words on the operand stack:

Stack:  ... ⇒ ..., value-word1,value-word2

This specification does not say how the two words are selected from the 64-bit long or double value; it is only necessary that a particular implementation be internally consistent.

1.5  Execution Environment

The information contained in the execution environment is used to do dynamic linking, normal method returns, and exception propagation.

1.5.1  Dynamic Linking

The execution environment contains references to the interpreter symbol table for the current method and current class, in support of dynamic linking of the method code. The class file code for a method refers to methods to be called and variables to be accessed symbolically. Dynamic linking translates these symbolic method calls into actual method calls, loading classes as necessary to resolve as-yet-undefined symbols, and translates variable accesses into appropriate offsets in storage structures associated with the runtime location of these variables.

This late binding of the methods and variables makes changes in other classes that a method uses less likely to break this code.

1.5.2  Normal Method Returns

If execution of the current method completes normally, then a value is returned to the calling
method. This occurs when the calling method executes a
return instruction appropriate to the return type.
      The execution environment is used in this case to
      restore the registers of the caller, with the program
counter of the caller appropriately incremented to skip
the method call instruction. Execution then continues
in the calling method's execution environment.

      1.5.3     Exception and Error Propagation
      An exceptional condition, known in JAVA as an
Error or Exception, which are subclasses of Throwable,
may arise in a program because of:
            a dynamic linkage failure, such as a failure to
                  find a needed class file;
            a run-time error, such as a reference through a
                  null pointer;
            an asynchronous event, such as is thrown by
                  Thread.stop, from another thread; and
            the program using a throw statement.
      When an exception occurs:
            A list of catch clauses associated with the
            current method is examined. Each catch clause
            describes the instruction range for which it is
            active, describes the type of exception that it is
            to handle, and has the address of the code to
            handle it.
            An exception matches a catch clause if the
            instruction that caused the exception is in the
            appropriate instruction range, and the exception
            type is a subtype of the type of exception that
            the catch clause handles. If a matching catch
            clause is found, the system branches to the
            specified handler. If no handler is found, the
            process is repeated until all the nested catch
            clauses of the current method have been exhausted.

-81-

The order of the catch clauses in the list is important. The virtual machine execution continues at the first matching catch clause. Because JAVA code is structured, it is always possible to sort all the exception handlers for one method into a single list that, for any possible program counter value, can be searched in linear order to find the proper (innermost containing applicable) exception handler for an exception occurring at that program counter value.

If there is no matching catch clause then the current method is said to have as its outcome the uncaught exception. The execution state of the method that called this method is restored from the execution environment, and the propagation of the exception continues, as though the exception had just occurred in this caller.

1.5.4 Additional Information

The execution environment may be extended with additional implementation-specified information, such as debugging information.

1.6 Garbage Collected Heap

The JAVA heap is the runtime data area from which class instances (objects) are allocated. The JAVA language is designed to be garbage collected - it does not give the programmer the ability to deallocate objects explicitly. The JAVA language does not presuppose any particular kind of garbage collection; various algorithms may be used depending on system requirements.

1.7 Method Area

The method area is analogous to the store for compiled code in conventional languages or the text segment in a UNIX process. It stores method code
(compiled JAVA code) and symbol tables. In the current
JAVA implementation, method code is not part of the
garbage-collected heap, although this is planned for a
future release.

1.8 The JAVA Instruction Set

An instruction in the JAVA instruction set
consists of a one-byte opcode specifying the operation
to be performed, and zero or more operands supplying
parameters or data that will be used by the operation.
Many instructions have no operands and consist only of
an opcode.

The inner loop of the virtual machine execution is
effectively:

```
do {
    fetch an opcode byte
    execute an action depending on the value of
    the opcode
} while (there is more to do);
```

The number and size of the additional operands is
determined by the opcode. If an additional operand is
more than one byte in size, then it is stored in
big-endian order - high order byte first. For example,
a 16-bit parameter is stored as two bytes whose value
is:

first_byte * 256 + second_byte

The bytecode instruction stream is only
byte-aligned, with the exception being the tableswitch
and lookupswitch instructions, which force alignment to
a 4-byte boundary within their instructions.

These decisions keep the virtual machine code for
a compiled JAVA program compact and reflect a conscious
bias in favor of compactness at some possible cost in
performance.

-83-

1.9 Limitations

The per-class constant pool has a maximum of 65535 entries. This acts as an internal limit on the total complexity of a single class.

The amount of code per method is limited to 65535 bytes by the sizes of the indices in the code in the exception table, the line number table, and the local variable table.

Besides this limit, the only other limitation of note is that the number of words of arguments in a method call is limited to 255.

2. Class File Format

This chapter documents the JAVA class (.class) file format.

Each class file contains the compiled version of either a JAVA class or a JAVA interface. Compliant JAVA interpreters must be capable of dealing with all class files that conform to the following specification.

A JAVA class file consists of a stream of 8-bit bytes. All 16-bit and 32-bit quantities are constructed by reading in two or four 8-bit bytes, respectively. The bytes are joined together in network (big-endian) order, where the high bytes come first. This format is supported by the JAVA JAVA.io.DataInput and JAVA.io.DataOutput interfaces, and classes such as JAVA.io.DataInputStream and JAVA.io.DataOutputStream.

The class file format is described here using a structure notation. Successive fields in the structure appear in the external representation without padding or alignment. Variable size arrays, often of variable sized elements, are called tables and are commonplace in these structures.

The types u1, u2, and u4 mean an unsigned one-, two-, or four-byte quantity, respectively, which are read by method such as readUnsignedByte,
readUnsignedShort and readInt of the JAVA.io.DataInput
interface.
2.1 Format
The following pseudo-structure gives a top-level
description of the format of a class file:

```
ClassFile {
    u4 magic;
    u2 minor_version;
    u2 major_version;
    u2 constant_pool_count;
    cp_info constant_pool[constant_pool_count - 1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attribute_count];
}
``` magic

This field must have the value 0xCAFEBABE.

minor_version, major_version

These fields contain the version number of the JAVA compiler that produced this class file. An implementation of the virtual machine will normally support some range of minor version numbers 0-n of a particular major version number. If the minor version number is incremented the new code won't run on the old virtual machines, but it is possible to make a new virtual machine which can run versions up to n+1.

-85-

A change of the major version number indicates a major incompatible change, one that requires a different virtual machine that may not support the old major version in any way.

The current major version number is 45; the current minor version number is 3.

constant_pool_count

This field indicates the number of entries in the constant pool in the class file.

constant_pool

The constant pool is a table of values. These values are the various string constants, class names, field names, and others that are referred to by the class structure or by the code.

constant_pool[0] is always unused by the compiler, and may be used by an implementation for any purpose.

Each of the constant_pool entries 1 through constant_pool_count-1 is a variable-length entry, whose format is given by the first "tag" byte, as described in section 2.3.

access_flags

This field contains a mask of up to sixteen modifiers used with class, method, and field declarations. The same encoding is used on similar fields in field_info and method_info as described below. Here is the encoding:

| Flag Name | Value | Meaning | Used By |
| --- | --- | --- | --- |
| ACC_PUBLIC | 0x0001 | Visible to everyone | Class, Method, Variable |
| ACC_PRIVATE | 0x0002 | Visible only to the defining class | Method, Variable |
| ACC_PROTECTED | 0x0004 | Visible to subclasses | Method, Variable |
| ACC_STATIC | 0x0008 | Variable or method is static | Method, Variable |
| ACC_FINAL | 0x0010 | No further subclassing, overriding, or assignment after initialization | Class, Method, Variable |

-86-

| ACC_SYNCHRONIZED | 0x0020 | Wrap use in monitor lock | Method |
| --- | --- | --- | --- |
| ACC_VOLATILE | 0x0040 | Can't cache | Variable |
| ACC_TRANSIENT | 0x0080 | Not to be written or read by a persistent object manager | Variable |
| ACC_NATIVE | 0x0100 | Implemented in a language other than JAVA | Method |
| ACC_INTERFACE | 0x0200 | Is an interface | Class |
| ACC_ABSTRACT | 0x0400 | No body provided | Class, Method | this_class

This field is an index into the constant pool; constant_pool [this_class] must be a CONSTANT_class.

super_class

This field is an index into the constant pool. If the value of super_class is nonzero, then constant_pool [super_class] must be a class, and gives the index of this class's superclass in the constant pool.

If the value of super_class is zero, then the class being defined must be JAVA.lang.Object, and it has no superclass.

interfaces_count

This field gives the number of interfaces that this class implements.

interfaces

Each value in this table is an index into the constant pool. If a table value is nonzero (interfaces[i] != 0, where 0 <= i <interfaces_count), then constant_pool [interfaces[i]] must be an interface that this class implements.

fields_count

This field gives the number of instance variables, both static and dynamic, defined by this class. The fields table includes only those variables that are defined explicitly by this class. It does not include those instance variables that are accessible from this class but are inherited from superclasses.

fields

Each value in this table is a more complete description of a field in the class. See section 2.4 for more information on the field_info structure.

methods_count

This field indicates the number of methods, both static and dynamic, defined by this class. This table only includes those methods that are explicitly defined by this class. It does not include inherited methods.

methods

Each value in this table is a more complete description of a method in the class. See section 2.5 for more information on the method_info structure.

attributes_count

This field indicates the number of additional attributes about this class.

attributes

A class can have any number of optional attributes associated with it. Currently, the only class attribute recognized is the "SourceFile" attribute, which indicates the name of the source file from which this class file was compiled. See section 2.6 for more information on the attribute_info structure.

2.2 Signatures

A signature is a string representing a type of a method, field or array.

The field signature represents the value of an argument to a function or the value of a variable. It
is a series of bytes generated by the following grammar:

```
<field_signature> ::= <field_type>
<field_type>      ::=<base_type>|<object_type>|
                     <array_type>
    <base_type>   ::= B|C|D|F|I|J|S|Z
<object_type>     ::= L<fullclassname>;
<array_type>      ::=[<optional_size><field_type>
<optional_size>   ::= [0-9]
```

The meaning of the base types is as follows:

| | | | |
|---|---|---|---|
| | B | byte | signed byte |
| | C | char | character |
| | D | double | double precision IEEE float |
| | F | float | single precision IEEE float |

-89-

| | | | |
|---|---|---|---|
| I | | int | integer |
| J | | long | long integer |
| L<fullclassname>; | | ... | an object of the given class |
| S | | short | signed short |
| Z | | boolean | true or false |
| [<field sig> | | ... | array |

A return-type signature represents the return value from a method. It is a series of bytes in the following grammar:

<return_signature>  ::= <field_type> | V

The character V indicates that the method returns no value. Otherwise, the signature indicates the type of the return value.

An argument signature represents an argument passed to a method:

<argument_signature>  ::= <field_type>

A method signature represents the arguments that the method expects, and the value that it returns.

<method_signature>  ::= (<arguments_signature>) <return_signature>

<arguments_signature>  ::= <argument_signature>*

2.3 Constant Pool

Each item in the constant pool begins with a 1-byte tag:. The table below lists the valid tags and their values.

| Constant Type | Value |
|---|---|
| CONSTANT_Class | 7 |
| CONSTANT_Fieldref | 9 |
| CONSTANT_Methodref | 10 |
| CONSTANT_InterfaceMethodref | 11 |
| CONSTANT_String | 8 |
| CONSTANT_Integer | 3 |
| CONSTANT_Float | 4 |
| CONSTANT_Long | 5 |
| CONSTANT_Double | 6 |
| CONSTANT_NameAndType | 12 |
| CONSTANT_Utf8 | 1 |
| CONSTANT_Unicode | 2 |

Each tag byte is then followed by one or more bytes giving more information about the specific constant.

2.3.1 CONSTANT_Class

CONSTANT_Class is used to represent a class or an interface.

```
CONSTANT_Class_info {
    u1 tag;
    u2 name_index;
}
``` tag

The tag will have the value CONSTANT_Class name_index constant_pool[name_index] is a CONSTANT_Utf8 giving the string name of the class.

Because arrays are objects, the opcodes anewarray and multianewarray can reference array "classes" via CONSTANT_Class items in the constant pool. In this case, the name of the class is its signature. For example, the class name for int[][]

is

[[I

The class name for
   Thread[]
is
   "[LJAVA.lang.Thread;"

2.3.2 CONSTANT_{Fieldref,Methodref, InterfaceMethodref}

Fields, methods, and interface methods are represented by similar structures.

```
CONSTANT_Fieldref_info {
    u1 tag;
    u2 class_index;
    u2 name_and_type_index;
}
CONSTANT_Methodref_info {
    u1 tag;
    u2 class_index;
    u2 name_and_type_index;
}
CONSTANT_InterfaceMethodref_info {
    u1 tag;
    u2 class_index;
    u2 name_and_type_index;
}
``` tag

The tag will have the value CONSTANT_Fieldref, CONSTANT_Methodref, or CONSTANT_InterfaceMethodref.

class_index constant_pool[class_index] will be an entry of type CONSTANT_Class giving the name of the class or interface containing the field or method.

For CONSTANT_Fieldref and CONSTANT_Methodref, the CONSTANT_Class item must be an actual class. For CONSTANT_InterfaceMethodref, the item must be an interface which purports to implement the given method.

name_and_type_index constant_pool [name_and_type_index] will be an entry of type CONSTANT_NameAndType. This constant pool
entry indicates the name and signature of the field or
method.

2.3.3  CONSTANT_String

CONSTANT_String is used to represent constant
objects of the built-in type String.
```
CONSTANT_String_info {
    u1 tag;
    u2 string_index;
}
```
tag

The tag will have the value CONSTANT_String string_index constant_pool [string_index] is a CONSTANT_Utf8
string giving the value to which the String object
is initialized.

2.3.4  CONSTANT_Integer and CONSTANT_Float

CONSTANT_Integer andCONSTANT_Float represent
four-byte constants.
```
CONSTANT_Integer_info {
    u1 tag;
    u4 bytes;
}
CONSTANT_Float_info {
    u1 tag;
    u4 bytes;
}
```
tag

The tag will have the value CONSTANT_Integer or
CONSTANT_Float bytes

For integers, the four bytes are the integer
value. For floats, they are the IEEE 754 standard
representation of the floating point value. These

-93- bytes are in network (high byte first) order.

2.3.5 CONSTANT_Long and CONSTANT_Double

CONSTANT_Long andCONSTANT_Double represent eight-byte constants.

```
CONSTANT_Long_info {
    u1 tag;
    u4 high_bytes;
    u4 low_bytes;
}
CONSTANT_Double_info {
    u1 tag;
    u4 high_bytes;
    u4 low_bytes;
}
```

All eight-byte constants take up two spots in the constant pool. If this is the $n^{th}$ item in the constant pool, then the next item will be numbered n+2.

tag

The tag will have the value CONSTANT_Long or CONSTANT_Double.

high_bytes, low_bytes

For CONSTANT_Long, the 64-bit value is (high_bytes << 32) +low_bytes.

For CONSTANT_Double, the 64-bit value,high_bytes and low_bytes together represent the standard IEEE 754 representation of the double-precision floating point number.

2.3.6 CONSTANT_NameAndType

CONSTANT_NameAndType is used to represent a field or method, without indicating which class it belongs to.

```
CONSTANT_NameAndType_info {
    u1 tag;
    u2 name_index;
``` u2 signature_index;
} tag

The tag will have the valueCONSTANT_NameAndType.

name_index constant_pool [name_index] is a CONSTANT_Utf8 string giving the name of the field or method.

signature_index constant_pool [signature_index] is a CONSTANT_Utf8 string giving the signature of the field or method.

2.3.7 CONSTANT_Utf8 and CONSTANT_Unicode

CONSTANT_Utf8 andCONSTANT_Unicode are used to represent constant string values.

CONSTANT_Utf8 strings are "encoded" so that strings containing only non-null ASCII characters, can be represented using only one byte per character, but characters of up to 16 bits can be represented:

All characters in the range 0x0001 to 0x007F are represented by a single byte:

```
+-+-+-+-+-+-+-+-+
|0|7bits of data|
+-+-+-+-+-+-+-+-+
```

The null character (0x0000) and characters in the range 0x0080 to 0x07FF are represented by a pair of two bytes:

```
+-+-+-+-+-+-+-+-+ +-+-+-+-+-+-+-+-+
|1|1|0| 5 bits | |1|0| 6 bits     |
+-+-+-+-+-+-+-+-+ +-+-+-+-+-+-+-+-+
```

Characters in the range 0x0800 to 0xFFFF are represented by three bytes:

```
+-+-+-+-+-+-+-+-+ +-+-+-+-+-+-+-+-+ +-+-+-+-+-+-+-+-+
|1|1|1|0|4 bits | |1|0| 6 bits     | |1|0| 6 bits    |
+-+-+-+-+-+-+-+-+ +-+-+-+-+-+-+-+-+ +-+-+-+-+-+-+-+-+
```

There are two differences between this format and the "standard" UTF-8 format. First, the null byte (0x00) is encoded in two-byte format rather than one-byte, so that our strings never have embedded nulls. Second, only the one-byte, two-byte, and three-byte formats are used. We do not recognize the longer formats.

```
        CONSTANT_Utf8_info {
            u1 tag;
            u2 length;
            u1 bytes[length];
        }
        CONSTANT_Unicode_info {
            u1 tag;
            u2 length;
            u2 bytes [length];
        }
``` tag

The tag will have the value CONSTANT_Utf8 or CONSTANT_Unicode.

length

The number of bytes in the string. These strings are not null terminated.

bytes

The actual bytes of the string.

2.4 Fields

The information for each field immediately follows the field_count field in the class file. Each field is described by a variable length field_info structure. The format of this structure is as follows:

```
        field_info {
            u2 access_flags;
            u2 name_index;
            u2 signature_index;
            u2 attributes_count;
            attribute_info attributes[attribute_count];
        }
```

-96- access_flags

This is a set of sixteen flags used by classes, methods, and fields to describe various properties and how they many be accessed by methods in other classes. See the table "Access Flags" which indicates the meaning of the bits in this field.

The possible fields that can be set for a field are ACC_PUBLIC, ACC_PRIVATE, ACC_PROTECTED, ACC_STATIC, ACC_FINAL, ACC_VOLATILE, and ACC_TRANSIENT.

At most one of ACC_PUBLIC, ACC_PROTECTED, and ACC_PRIVATE can be set for any method.

name_index constant_pool [name_index] is a CONSTANT_Utf8 string which is the name of the field.

signature_index constant_pool [signature_index] is a CONSTANT_Utf8 string which is the signature of the field. See the section "Signatures" for more information on signatures.

attributes_count

This value indicates the number of additional attributes about this field.

attributes

A field can have any number of optional attributes associated with it. Currently, the only field attribute recognized is the "ConstantValue" attribute, which indicates that this field is a static numeric constant, and indicates the constant value of that field.

Any other attributes are skipped.

2.5 Methods

The information for each method immediately follows the method_count field in the class file. Each method is described by a variable length method_info structure. The structure has the following format:

```
method_info {
    u2 access_flags;
    u2 name_index;
    u2 signature_index;
    u2 attributes_count;
    attribute_info attributes [attribute_count];
}
``` access_flags

This is a set of sixteen flags used by classes, methods, and fields to describe various properties and how they many be accessed by methods in other classes. See the table "Access Flags" which gives the various bits in this field.

The possible fields that can be set for a method are ACC_PUBLIC, ACC_PRIVATE, ACC_PROTECTED, ACC_STATIC, ACC_FINAL, ACC_SYNCHRONIZED, ACC_NATIVE, and ACC_ABSTRACT.

At most one of ACC_PUBLIC, ACC_PROTECTED, and ACC_PRIVATE can be set for any method.

name_index constant_pool[name_index] is a CONSTANT_Utf8 string giving the name of the method.

signature_index constant_pool [signature_index] is a CONSTANT_Utf8 string giving the signature of the field. See the section "Signatures" for more information on signatures.

attributes_count

This value indicates the number of additional attributes about this field.

attributes

A field can have any number of optional attributes associated with it. Each attribute has a name, and other additional information. Currently, the only field attributes recognized are the "Code" and "Exceptions" attributes, which describe the bytecodes that are executed to perform this method, and the JAVA
Exceptions which are declared to result from the
execution of the method, respectively.

Any other attributes are skipped.

2.6 Attributes

Attributes are used at several different places in
the class format. All attributes have the following
format:

```
GenericAttribute_info {
    u2 attribute_name;
    u4 attribute_length;
    u1 info[attribute_length];
}
```

The attribute_name is a 16-bit index into the
class's constant pool; the value of constant_pool
[attribute_name] is a CONSTANT_Utf8 string giving the
name of the attribute. The field attribute_length
indicates the length of the subsequent information in
bytes. This length does not include the six bytes of
the attribute_name and attribute_length.

In the following text, whenever we allow
attributes, we give the name of the attributes that are
currently understood. In the future, more attributes
will be added. Class file readers are expected to skip
over and ignore the information in any attribute they
do not understand.

2.6.1 SourceFile

The "SourceFile" attribute has the following
format:

```
SourceFile_attribute {
    u2 attribute_name_index;
    u4 attribute_length;
    u2 sourcefile_index;
}
```

-99- attribute_name_index
    constant_pool [attribute_name_index] is the
CONSTANT_Utf8 string "SourceFile".
attribute_length
    The length of a SourceFile_attribute must be 2.
sourcefile_index
    constant_pool [sourcefile_index] is a
CONSTANT_Utf8 string giving the source file from which
this class file was compiled.

2.6.2    ConstantValue
The "ConstantValue" attribute has the following
format:
    ConstantValue_attribute {
        u2 attribute_name_index;
        u4 attribute_length;
        u2 constantvalue_index;
    }
attribute_name_index
    constant_pool [attribute_name_index] is the
CONSTANT_Utf8 string "ConstantValue".
attribute_length
    The length of a ConstantValue_attribute must be 2.
constantvalue_index
    constant_pool [constantvalue_index] gives the
constant value for this field.
    The constant pool entry must be of a type
appropriate to the field, as shown by the following
table:

| long | CONSTANT_Long |
| float | CONSTANT_Float |
| double | CONSTANT_Double |
| int, short, char, byte, boolean | CONSTANT_Integer |

-100-

2.6.3 Code

The "Code" attribute has the following format:

```
Code_attribute {
        u2 attribute_name_index;
        u4 attribute_length;
        u2 max_stack;
        u2 max_locals;
        u4 code_length;
        u1 code[code_length];
        u2 exception_table_length;
        {   u2    start_pc;
            u2    end_pc;
            u2    handler_pc;
            u2    catch_type;
        } exception_table[exception_table_length];
        u2 attributes_count;
        attribute_info attributes [attribute_count];
}
``` attribute_name_index constant_pool [attribute_name_index] is the CONSTANT_Utf8 string "Code".

attribute_length

This field indicates the total length of the "Code" attribute, excluding the initial six bytes.

max_stack

Maximum number of entries on the operand stack that will be used during execution of this method. See the other chapters in this spec for more information on the operand stack.

max_locals

Number of local variable slots used by this method. See the other chapters in this spec for more information on the local variables.

code_length

The number of bytes in the virtual machine code for this method.

-101- code
    These are the actual bytes of the virtual machine
code that implement the method. When read into memory,
if the first byte of code is aligned onto a
multiple-of-four boundary the the tableswitch and
tablelookup opcode entries will be aligned; see their
description for more information on alignment
requirements.
exception_table_length
The number of entries in the following exception
table.
exception_table
    Each entry in the exception table describes one
exception handler in the code.
    start_pc, end_pc
    The two fieldsstart_pc and end_pc indicate the
ranges in the code at which the exception handler is
active. The values of both fields are offsets from the
start of the code.start_pc is inclusive.end_pc is
exclusive.
handler_pc
    This field indicates the starting address of the
exception handler. The value of the field is an offset
from the start of the code.
    catch_type
    If catch_type is nonzero, then constant_pool
[catch_type] will be the class of exceptions that this
exception handler is designated to catch. This
exception handler should only be called if the thrown
    exception is an instance of the given class.
    If catch_type is zero, this exception handler
should be called for all exceptions.
attributes_count
    This field indicates the number of additional
    attributes about code. The "Code" attribute can itself
have attributes.

attributes

A "Code" attribute can have any number of optional attributes associated with it. Each attribute has a name, and other additional information. Currently, the only code attributes
defined are the "LineNumberTable" and "LocalVariableTable," both of which contain debugging information.

2.6.4 Exceptions Table

This table is used by compilers which indicate which Exceptions a method is declared to throw:

```
Exceptions_attribute {
    u2 attribute_name_index;
    u4 attribute_length;
    u2 number_of_exceptions;
    u2 exception_index_table [number_of_exceptions];
}
``` attribute_name_index constant_pool [attribute_name_index] will be the CONSTANT_Utf8 string "Exceptions".

attribute_length

This field indicates the total length of the Exceptions_attribute, excluding the initial six bytes.

number_of_exceptions

This field indicates the number of entries in the following exception index table.

exception_index_table

Each value in this table is an index into the constant pool. For each table element (exception_index_table [i] != 0, where 0 <= i <number_of_exceptions), then constant_pool [exception_index+table [i]] is a Exception that this class is declared to throw.

2.6.5 LineNumberTable

This attribute is used by debuggers and the exception handler to determine which part of the virtual machine code corresponds to a given location in the source. The LineNumberTable_attribute has the following format:

```
LineNumberTable_attribute {
    u2      attribute_name_index;
    u4      attribute_length;
    u2      line_number_table_length;
    { u2    start_pc;
      u2        line_number;
    }       line_number_table[line_
            number_table_length];
}
``` attribute_name_index constant_pool [attribute_name_index] will be the CONSTANT_Utf8 string "LineNumberTable".

attribute_length

This field indicates the total length of the LineNumberTable_attribute, excluding the initial six bytes.

line_number_table_length

This field indicates the number of entries in the following line number table.

line_number_table

Each entry in the line number table indicates that the line number in the source file changes at a given point in the code.

start_pc

This field indicates the place in the code at which the code for a new line in the source begins. source_pc <<SHOULD THAT BEstart_pc?>> is an offset from the beginning of the code.

line_number

The line number that begins at the given location

-104- in the file.

2.6.6 LocalVariableTable

This attribute is used by debuggers to determine the value of a given local variable during the dynamic execution of a method. The format of the LocalVariableTable_attribute is as follows:

```
LocalVariableTable_attribute {
    u2 attribute_name_index;
    u4 attribute_length;
    u2 local_variable_table_length;
    { u2 start_pc;
        u2   length;
        u2   name_index;
        u2   signature_index;
        u2   slot;
    }   local_variable_table[local_
        variable_table_length];
}
``` attribute_name_index constant_pool [attribute_name_index] will be the CONSTANT_Utf8 string "LocalVariableTable".

attribute_length

This field indicates the total length of the LineNumberTable_attribute, excluding the initial six bytes.

local_variable_table_length

This field indicates the number of entries in the following local variable table.

local_variable_table

Each entry in the local variable table indicates a code range during which a local variable has a value. It also indicates where on the stack the value of that variable can be found.

start_pc, length

The given local variable will have a value at the code between start_pc andstart_pc + length. The two
values are both offsets from the beginning of the code.
name_index, signature_index
   constant_pool[name_index] and constant_pool
   [signature_index] are CONSTANT_Utf8 strings giving the
   name and signature of the local variable.
slot
   The given variable will be the slot$^{th}$ local
   variable in the method's frame.

3.   The Virtual Machine Instruction Set
3.1  Format for the Instructions
   JAVA Virtual Machine instructions are represented
   in this document by an entry of the following form.
   instruction name
   Short description of the instruction
   Syntax:

| opcode=number |
| operand1 |
| operand2 |
| ... |

Stack: ...., value1, value2 ⇒ ..., value3
   A longer description that explains the functions
   of the instruction and indicates any exceptions
   that might be thrown during execution.
   Each line in the syntax table represents a single
   8-bit byte.
   Operations of the JAVA Virtual Machine most often
   take their operands from the stack and put their
   results back on the stack. As a convention, the
   descriptions do not usually mention when the stack is
   the source or destination of an operation, but will
   always mention when it is not. For instance,
   instruction iload has the short description "Load
   integer from local variable." Implicitly, the integer

-106- is loaded onto the stack. Instruction iadd is described as "Integer add"; both its source and destination are the stack.

Instructions that do not affect the control flow of a computation may be assumed to always advance the virtual machine program counter to the opcode of the following instruction. Only instructions that do affect control flow will explicitly mention the effect they have on the program counter.

3.2 Pushing Constants onto the Stack bipush

Push one-byte signed integer
Syntax:

| bipush=16 |
|-----------|
| byte1     |

Stack: ...=> ..., value byte1 is interpreted as a signed 8-bitvalue. This value is expanded to an integer and pushed onto the operand stack.

sipush

Push two-byte signed integer
Syntax:

| sipush=17 |
|-----------|
| byte1     |
| byte2     |

Stack: ...=> ..., item byte1 and byte2 are assembled into a signed 16-bit value. This value is expanded to an integer and pushed onto the operand stack.

ldc1

Push item from constant pool

Syntax:

| ldc1=18 |
|---|
| indexbyte1 |

Stack: ...=> ..., item indexbyte1 is used as an unsigned 8-bit index into the constant pool of the current class. The item at that index is resolved and pushed onto the stack. If a String is being pushed and there isn't enough memory to allocate space for it then an OutOfMemoryError is thrown.

Note: A String push results in a reference to an object.

ldc2

Push item from constant pool

Syntax:

| ldc2=19 |
|---|
| indexbyte1 |
| indexbyte2 |

Stack: ...=> ..., item indexbyte1 and indexbyte2 are used to construct an unsigned 16-bit index into the constant pool of the current class. The item at that index is resolved and pushed onto the stack. If a String is being pushed and there isn't enough memory to allocate space for it then an OutOfMemoryError is thrown.

Note: A String push results in a reference to an object.

ldc2w

Push long or double from constant pool

Syntax:

| ldc2w=20 |
|---|

| indexbyte1 |
| indexbyte2 |

Stack:   ...=> ..., constant-word1, constant-word2 indexbyte1 and indexbyte2 are used to construct an unsigned 16-bit index into the constant pool of the current class. The two-word constant that index is resolved and pushed onto the stack.

aconst_null
    Push null object reference
    Syntax:
    | aconst_null=1 |

Stack:   ...=> ...,null
    Push the null object reference onto the stack.

iconst_m1
    Push integer constant -1
    Syntax:
    | iconst_m1=2 |

Stack:   ...=> ..., 1
    Push the integer -1 onto the stack.

iconst_<n>
    Push integer constant
    Syntax:
    | iconst_,<n> |

Stack:   ...=> ..., <n>
    Forms: iconst_0 = 3, iconst_1 = 4, iconst_2 = 5, iconst_3 = 6, iconst_4 = 7, iconst_5 = 8
    Push the integer <n> onto the stack.

lconst_<l>

Push long integer constant
Syntax:

| lconst_<l> |

      Stack:    ...=> ..., <l>-word1, <l>-word2
      Forms: lconst_0 = 9, lconst_1 = 10
      Push the long integer <l> onto the stack.

fconst_<f>
      Push single float
      Syntax:

| fconst_<f> |

Stack:    ...=> ..., <f>
      Forms: fconst_0 = 11, fconst_1 = 12, fconst_2 = 13
      Push the single-precision floating point number
<f> onto the stack.

dconst_<d>
      Push double float
      Syntax:

| dconst_<d> |

Stack:    ...=> ..., <d>-word1, <d>-word2
      Forms: dconst_0 = 14, dconst_1 = 15
      Push the double-precision floating point number
<d> onto the stack.

3.3   Loading Local Variables Onto the Stack
lload
      Load integer from local variable
      Syntax:

| iload=21 |
| vindex |

Stack:    ...=> ..., value

-110-

The value of the local variable at vindex in the current JAVA frame is pushed onto the operand stack.

iload_<n>
       Load integer from local variable
       Syntax:

| iload_<n> |

Stack:  ...=> ..., value
       Forms:  iload_0 = 26, iload_1 = 27, iload_2 = 28, iload_3 = 29
       The value of the local variable at <n> in the current JAVA frame is pushed onto the operand stack.
       This instruction is the same as iload with a
       vindex of <n>, except that the operand <n> is implicit.

iload
       Load long integer from local variable
       Syntax:
       | iload = 22 |
       | vindex |

Stack:  ... => ..., value-word1, value-work2
       The value of the local variables at vindex and
       vindex+1 in the current JAVA frame is pushed onto the operand stack.

lload_<n>
       Load long integer from local variable
       Syntax:

| iload_<n> |

Stack:  ...=> ..., value-word1, value-word2
       Forms: lload_0 = 30, lload_1 = 31, lload_2 = 32,
       lload_3 = 33
       The value of the local variables at <n> and <n>+1 in the current JAVA frame is pushed onto the operand

-111- stack.

This instruction is the same as lload with a vindex of <n>, except that the operand <n> is implicit.

fload
Load single float from local variable
Syntax:

| fload = 23 |
|---|
| vindex |

Stack: ...=> ..., value

The value of the local variable at vindex in the current JAVA frame is pushed onto the opera and stack.

fload_<n>
Load single float from local variable
Syntax:

| fload_<n> |
|---|

Stack: ...=> ...,value

Forms: fload_0 = 34, fload_1 = 35, fload_2 = 36, fload_3 = 37

The value of the local variable at <n> in the current JAVA frame is pushed onto the operand stack.

This instruction is the same as fload with a vindex of <n>, except that the operand <n> is implicit.

dload
Load double float from local variable
Syntax:

| dload = 24 |
|---|
| vindex |

Stack: ...=> ..., value-word1, value-word2

The value of the local variables at vindex and vindex+1 in the current JAVA frame is pushed onto the operand stack.

-112- dload_<n>
    Load double float from local variable
    Syntax:
        | dload_<n> |

Stack:   ...=> ..., value-word1, value-word2
    Forms:   dload_0 = 38, dload_1 = 39, dload_2 = 40, dload_3 = 41
    The value of the local variables at <n> and <n>+1 in the current JAVA frame is pushed onto the operand stack.
    This instruction is the same as dload with a vindex of <n>, except that the operand <n> is implicit.

aload
    Load object reference from local variable
    Syntax:
        | aload = 25 |
        | vindex    |

Stack:   ...=> ..., value
    The value of the local variable at vindex in the current JAVA frame is pushed onto the operand stack.

aload_<n>
    Load object reference from local variable
    Syntax:
        | aload_<n> |

Stack:   ...=> ..., value
    Forms:   aload_0 = 42, aload_1 = 43, aload_2 = 44, aload_3 = 45
    The value of the local variable at <n> in the current JAVA frame is pushed onto the operand stack.
    This instruction is the same as aload with a vindex of <n>, except that the operand <n> is implicit.

-113-

3.4 Storing Stack Values into Local Variables istore
Store integer into local variable
Syntax:

| istore = 54 |
|---|
| vindex |

Stack: ..., value => ...
value must be an integer. Local variable vindex in the current JAVA frame is set to value.

istore_<n>
Store integer into local variable
Syntax:

| istore_<n> |
|---|

Stack: ..., value => ...
Forms: istore_0 = 59, istore_1 = 60, istore_2 = 61, istore_3 = 62
value must be an integer. Local variable <n> in the current JAVA frame is set to value.
This instruction is the same as istore with a vindex of <n>, except that the operand <n> is implicit.

lstore
Store long integer into local variable
Syntax:

| lstore = 55 |
|---|
| vindex |

Stack: ..., value-word1, value-word2 => ...
value must be a long integer. Local variables vindex+1 in the current JAVA frame are set to value.

lstore_<n>
Store long integer into local variable

-114-

Syntax:

> lstore_<n>

Stack: ..., value-word1, value-word2 =>

Forms: lstore_0 = 63, lstore_1 = 64, lstore_2 = 65, lstore_3 = 66 value must be a long integer. Local variables <n> and <n>+1 in the current JAVA frame are set to value.

This instruction is the same as lstore with a
vindex of <n>, except that the operand <n> is implicit.

fstore
    Store single float into local variable
    Syntax:

> fstore =56
> vindex

Stack: ..., value => ...

value must be a single-precision floating point
number. Local variable vindex in the current JAVA frame is set to value.

fstore_<n>
    Store single float into local variable
       Syntax:

> fstore_<n>

Stack: ..., value => ...

Forms: fstore_0 = 67, fstore_1 = 68, fstore_2 =
69, fstore_3 = 70 value must be a single-precision floating point number. Local variable <n> in the current JAVA frame is set to value.

This instruction is the same as fstore with a
vindex of <n>, except that the operand <n> is implicit.

dstore
> Store double float into local variable
> Syntax:

| dstore = 57 |
|---|
| vindex |

> Stack: ..., value-word1, value-word2 => ...
> value must be a double-precision floating point number. Local variables vindex and vindex+1 in the current JAVA frame are set to value.

dstore_<n>
> Store double float into local variable
> Syntax:

| dstore_<n> |
|---|

> Stack: ..., value-word1, value-word2 => ...
> Forms: dstore_0 = 71, dstore_1 = 72, dstore_2 = 73, dstore_3 = 74
> value must be a double-precision floating point number. Local variables <n> and <n>+1 in the current JAVA frame are set to value.
> This instruction is the same as dstore with a vindex of <n>, except that the operand <n> is implicit.

astore
> Store object reference into local variable
> Syntax:

| astore = 58 |
|---|
| vindex |

> Stack: ..., value => ...
> value must be a return address or a reference to an object. Local variable vindex in the current JAVA frame is set to value.

astore_<n>
> Store object reference into local variable

Syntax:

| astore_<n> |
|---|

Stack: ..., value => ...

Forms: astore_0 = 75, astore_1 = 76, astore_2 = 77, astore_3 = 78 value must be a return address or a reference to an object. Local variable <n> in the current JAVA frame is set to value.

This instruction is the same as astore with a vindex of <n>, except that the operand <n> is implicit.

iinc
   Increment local variable by constant

   Syntax:

| iinc = 132 |
|---|
| vindex |
| const |

Stack: no change

Local variable vindex in the current JAVA frame must contain an integer. Its value is incremented by the value const, where const is treated as a signed
8-bit quantity.

3.5 Wider index for Loading, Storing and Incrementing wide
       Wider index for accessing local variables in load, store and increment.
   Syntax:

| wide = 196 |
|---|
| vindex2 |

   Stack: no change

This bytecode must precede one of the following bytecodes: iload, lload, fload, dload, aload, istore, lstore, fstore, dstore, astore, iinc. The vindex of the following bytecode and vindex2 from this bytecode are assembled into an unsigned 16-bit index to a local variable in the current JAVA frame. The following bytecode operates as normal except for the use of this wider index.

3.6 Managing Arrays newarray

Allocate new array

Syntax:

| newarray = 188 |
|---|
| atype |

Stack: ..., size => result size must be an integer. It represents the number of elements in the new array.

atype is an internal code that indicates the type of array to allocate. Possible values for atype are as follows:

| | |
|---|---|
| T_BOOLEAN | 4 |
| T_CHAR | 5 |
| T_FLOAT | 6 |
| T_DOUBLE | 7 |
| T_BYTE | 8 |
| T_SHORT | 9 |
| T_INT | 10 |
| T_LONG | 11 |

A new array of atype, capable of holding size elements, is allocated, and result is a reference to this new object. Allocation of an array large enough to contain size items of atype is attempted. All elements of the array are initialized to zero.

If size is less than zero, a
NegativeArraySizeException is thrown. If there is not
enough memory to allocate the array, anOutOfMemoryError
is thrown.

anewarray

Allocate new array of references to objects
Syntax:

| anewarray = 189 |
| indexbyte1 |
| indexbyte2 |

Stack: ..., size => result size must be an integer. It represents the number
of elements in the new array.

indexbyte1 and indexbyte2 are used to construct an
index into the constant pool of the current class. The
item at that index is resolved. The resulting entry
must be a class.

A new array of the indicated class type and
capable of holding size elements is allocated, and
result is a reference to this new object. Allocation
of an array large enough to contain size items of the
given class type is attempted. All elements of the
array are initialized to null.

If size is less than zero, a
NegativeArraySizeException is thrown. If there is not
enough memory to allocate the array, an
OutOfMemoryError is thrown.

anewarray is used to create a single dimension of
an array of object references. For example, to create
    new Thread[7]
the following code is used:
    bipush 7
    anewarray <Class "JAVA.lang.Thread">
anewarray can also be used to create the first

-119- dimension of a multi-dimensional array. For example,
the following array declaration:
    new int[6][]
is created with the following code:
    bipush 6
    anewarray <Class "[I">
See CONSTANT_Class in the "Class File Format"
chapter for information on array class names.

multianewarray
    Allocate new multi-dimensional array
    Syntax:

| multianewarray = 197 |
| --- |
| indexbyte1 |
| indexbyte2 |
| dimensions |

Stack: ..., size1 size2...sizen => result
    Each size must be an integer. Each represents the
number of elements in a dimension of the array.
    indexbyte1 and indexbyte2 are used to construct an
index into the constant pool of the current class. The
item at that index is resolved. The resulting entry
must be an array class of one or more dimensions.
    dimensions has the following aspects:
        It must be an integer ≥ 1.
        It represents the number of dimensions
        being created. It must be ≤ the number of
        dimensions of the array class.
        It represents the number of elements
        that are popped off the stack. All must be
        integers greater than or equal to zero.
        These are used as the sizes of the dimension.
        For example, to create
            new int[6][3][]
            the following code is used:

-120-

```
                bipush 6
                bipush 3
                multianewarray <Class "[[[I"> 2
```
     If any of the size arguments on the stack is less
     than zero, a NegativeArraySizeException is thrown. If
     there is not enough memory to allocate the array, an
     OutOfMemoryError is thrown.
         The result is a reference to the new array object.
         Note: It is more efficient to use newarray or
     anewarray when creating a single dimension.
         See CONSTANT_Class in the "Class File Format"
     chapter for information on array class names.

arraylength
         Get length of array
         Syntax:

| arraylength = 190 |

Stack:   ..., objectref => ..., length
         objectref must be a reference to an array object.
     The length of the array is determined and replaces
     objectref on the top of the stack.
         If the objectref is null, a NullPointerException
     is thrown.
25 iload
         Load integer from array
         Syntax:

| iaload = 46 |

Stack:   ..., arrayref, index => ..., value
         arrayref must be a reference to an array of
     integers.index must be an integer. The integer value
     at position number index in the array is retrieved and
     pushed onto the top of the stack.
         If arrayref is null a NullPointerException is
     thrown. If index is not within the bounds of the array an ArrayIndexOutOfBoundsException is thrown.

laload
Load long integer from array
Syntax:

| laload = 47 |

Stack: ..., arrayref, index => ..., value-word1, value-word2

arrayref must be a reference to an array of long integers. index must be an integer. The long integer value at position number index in the array is retrieved and pushed onto the top of the stack.

If arrayref is null a NullPointerException is
thrown. If index is not within the bounds of the array an ArrayIndexOutOfBoundsException is thrown.

faload
Load single float from array
Syntax:

| faload = 48 |

Stack: ..., arrayref, index => ..., value arrayref must be a reference to an array of
single-precision floating point numbers. index must be an integer. The single-precision floating point number value at position number index in the array is retrieved and pushed onto the top of the stack.

If arrayref is null a NullPointerException is
thrown. If index is not within the bounds of the array an ArrayIndexOutOfBoundsException is thrown.

daload
Load double float from array
Syntax:

| daload = 49 |

-122-

Stack: ..., arrayref, index => ..., value-word1, value-word2 arrayref must be a reference to an array of double-precision floating point numbers. index must be an integer. The double-precision floating point number value at position number index in the array is retrieved and pushed onto the top of the stack.

If arrayref is null a NullPointerException is thrown. If index is not within the bounds of the array an ArrayIndexOutOfBoundsException is thrown.

aaload

Load object reference from array

Syntax:

| aaload = 50 |

Stack: ..., arrayref, index => ..., value arrayref must be a reference to an array of references to objects. index must be an integer. The object reference at position number index in the array is retrieved and pushed onto the top of the stack.

If arrayref is null a NullPointerException is thrown. If index is not within the bounds of the array an ArrayIndexOutOfBoundsException is thrown.

baload

Load signed byte from array.

Syntax:

| baload = 51 |

Stack: ..., arrayref, index => ..., value arrayref must be a reference to an array of signed bytes. index must be an integer. The signed byte value at position number index in the array is retrieved, expanded to an integer, and pushed onto the top of the stack.

If arrayref is null a NullPointerException is thrown. If index is not within the bounds of the array
an ArrayIndexOutOfBoundsException is thrown.

caload
Load character from array
Syntax:

> caload = 52

Stack: ..., arrayref, index => ...,value
arrayref must be a reference to an array of
characters. index must be an integer. The character
value at position number index in the array is
retrieved, zero-extended to an integer, and pushed onto
the top of the stack.
If arrayref is null a NullPointerException is
thrown. If index is not within the bounds of the array
an ArrayIndexOutOfBoundsException is thrown.

saload
Load short from array
Syntax:

> saload = 53

Stack: ..., arrayref, index => ..., value
arrayref must be a reference to an array of short
integers. index must be an integer. The ;signed short
integer value at position number index in the array is
retrieved, expanded to an integer, and pushed
onto the top of the stack.
If arrayref is null, a NullPointerException is
thrown. If index is not within the bounds of the array
an ArrayIndexOutOfBoundsException is thrown.

iastore
Store into integer array
Syntax:

> iastore = 79

Stack: ..., arrayref, index, value => ...

arrayref must be a reference to an array of integers, index must be an integer, and value an integer. The integer value is stored at position index in the array.

If arrayref is null, a NullPointerException is thrown. If index is not within the bounds of the array an ArrayIndexOutOfBoundsException is thrown.

lastore

Store into long integer array

Syntax:

| lastore = 80 |

Stack: ..., arrayref, index, value-word1, value-word2 => ...

arrayref must be a reference to an array of long integers, index must be an integer, and value a long integer. The long integer value is stored at position index in the array.

If arrayref is null, a NullPointerException is thrown. If index is not within the bounds of the array, an ArrayIndexOutOfBoundsException is thrown.

fastore

Store into single float array

Syntax:

| fastore = 81 |

Stack: ..., arrayref, index, value => ...

arrayref must be an array of single-precision floating point numbers, index must be an integer, and value a single-precision floating point number. The single float value is stored at position index in the array.

If arrayref is null, a NullPointerException is thrown. If index is not within the bounds of the array

-125- an ArrayIndexOutOfBoundsException is thrown.

dastore
Store into double float array
Syntax:

> dastore = 82

Stack: ..., arrayref, index, value-word1, value-word2=> ...

arrayref must be a reference to an array of double-precision floating point numbers, index must be an integer, and value a double-precision floating point number. The double float value is stored at position index in the array.

If arrayref is null, a NullPointerException is thrown. If index is not within the bounds of the array an ArrayIndexOutOfBoundsException is thrown.

aastore
Store into object reference array
Syntax:

> aastore = 83

Stack: ..., arrayref, index, value => ...

arrayref must be a reference to an array of references to objects, index must be an integer, and value a reference to an object. The object reference value is stored at position index in the array.

If arrayref is null, a NullPointerException is thrown. If index is not within the bounds of the array, an ArrayIndexOutOfBoundsException is thrown.

The actual type of value must be conformable with the actual type of the elements of the array. For example, it is legal to store an instance of class Thread in an array of class Object, but not vice versa. An ArrayStoreException is thrown if an attempt is made to store an incompatible object reference.

bastore
   Store into signed byte array
   Syntax:

| bastore = 84 |

Stack: ..., arrayref, index, value => ...

arrayref must be a reference to an array of signed bytes, index must be an integer, and value an integer. The integer value is stored at position index in the array. If value is too large to be a signed byte, it is truncated.

If arrayref is null, a NullPointerException is thrown. If index is not within the bounds of the array an ArrayIndexOutOfBoundsException is thrown.

castore
   Store into character array
   Syntax:

| castore = 85 |

Stack: ..., arrayref, index, value => ...

arrayref must be an array of characters, index must be an integer, and value an integer. The integer value is stored at position index in the array. If value is too large to be a character, it is truncated.

If arrayref is null, a NullPointerException is thrown. If index is not within the bounds of [the array an ArrayIndexOutOfBoundsException is thrown.

sastore
   Store into short array
   Syntax:

| sastore = 86 |

Stack: ..., array, index, value => ...

arrayref must be an array of shorts, index must be an integer, and value an integer. The integer value is

-127- stored at position index in the array. If value is too
large to be an short, it is truncated.
    If arrayref is null, a NullPointerException is
thrown. If index is not within the bounds of the array
an ArrayIndexOutOfBoundsException is thrown.

3.7 Stack Instructions nop

Do nothing
Syntax:

> nop = 0

Stack: no change
Do nothing.

pop

Pop top stack word
Syntax:

> pop = 87

Stack: ..., any => ...
Pop the top word from the stack.

pop2

Pop top two stack words
Syntax:

> pop2 = 89

Stack: ..., any2, any1 => ...
Pop the top two words from the stack.

dup

Duplicate top stack word
Syntax:

> dup = 89

-128-

Stack:   ..., any => ..., any,any
Duplicate the top word on the stack.

dup2
       Duplicate top two stack words
       Syntax:

| dup2 = 92 |

Stack:..., any2,any1 => ..., any2, any1,any2, any1
Duplicate the top two words on the stack.

dup_x1
       Duplicate top stack word and put two down
       Syntax:

| dup_x1 = 90 |

Stack:   ..., any2, any1 =>..., any1, any2, any1
       Duplicate the top word on the stack and insert the
       copy two words down in the stack.

dup2_x1
       Duplicate top two stack words and put two down
       Syntax:
       | dup_x1 = 93 |

Stack: ..., any3, any2, any1 => ..., any2, any1,
       any3, any2, any1
       Duplicate the top two words on the stack and
       insert the copies two words down in the stack.

dup_x2
       Duplicate top stack word and put three down
       Syntax:
       | dup_x2 = 91 |

Stack:   ..., any3, any2, any1 => ..., any1, any3,

-129- any2, any1
Duplicate the top word on the stack and insert the copy three words down in the stack.

dup2_x2
Duplicate top two stack words and put three down
Syntax:
| dup2_x2 = 94 |

Stack:   ..., any4, any3, any2, any1 => ..., any2, any1, any4, any3, any2, any1
Duplicate the top two words on the stack and insert the copies three words down in the stack.

swap
Swap top two stack words
Syntax:
| swap = 95 |

Stack:   ..., any2, any1 => ..., any2, any1
Swap the top two elements on the stack.

3.8  Arithmetic Instructions
iadd
Integer add
Syntax:
| iadd = 96 |
Stack:   ..., value1, value2 => ..., result
value1 and value 2 must be integers. The values are added and are replaced on the stack by their integer sum.
   ladd
    Long integer add
    Syntax:

| ladd = 97 |

    Stack: ..., value1-word1, value1-word2, value2-word1, value2-word2 => ..., result-word1, result-word2
    value1 and value 2 must be long integers. The
    values are added and are replaced on the stack by their
    long integer sum.

fadd
    Single floats add
    Syntax:

| fadd = 98 |

Stack: ..., value1, value2 => ..., result
    value1 and value 2 must be single-precision
    floating point numbers. The values are added and are
    replaced on the stack by their single-precision
    floating point sum.

dadd
Double floats add

Syntax:

| dadd = 99 |

    Stack: ..., value1-word1, value1-word2, value2-word1, value2-word2 => ..., result-word1, result-word2
    value1 and value 2 must be double-precision
    floating point numbers. The values are added and are
    replaced on the stack by their double-precision
    floating point sum.

-131- isub
    Integer subtract
    Syntax:
    | isub = 100 |

Stack:  ..., value1, value2 => ..., result
    value1 and value 2 must be integers. value2 is
subtracted from value1, and both values are replaced on
the stack by their integer difference.

lsub
    Long integer subtract
    Syntax:
    | lsub = 101 |

Stack:  ..., **value1-word1, value1-word2,
value2-word1, value2-word2 => ..., result-word1,
result-word2**
    value1 and value 2 must be long integers. value2
is subtracted from value1, and both values are replaced
on the stack by their long integer difference.

fsub
    Single float subtract
    Syntax:
    | fsub = 102 |

Stack:  ..., value1, value2 => ..., result
    value1 and value 2 must be single-precision
floating point numbers. value2 is subtracted from
value1, and both values are replaced on the stack by
their single-precision floating point difference.

dsub
    Double float subtract
    Syntax:
    | dsub = 103 |

-132-

Stack: ..., value1-word1, value1-word2, value2-word1, value2-word2 => ..., result-word1, result-word2 value1 and value 2 must be double-precision floating point numbers. value2 is subtracted from value1, and both values are replaced on the stack by their double-precision floating point difference.

imul
Integer multiply
Syntax:
```
imul = 104
```

Stack: ..., value1, value2 => ..., result
value1 and value 2 must be integers. Both values are replaced on the stack by their integer product.

lmul
Long integer multiply
Syntax:
```
imul = 105
```

Stack: ..., value1-word1, value1-word2, value2-word1, value2-word2 => ..., result-word1, result-word2 value1 and value 2 must be long integers. Both values are replaced on the stack by their long integer product.

fmul
Single float multiply
Syntax:
```
fmul = 106
```

Stack: ..., value1, value2 => ..., result
value1 and value 2 must be single-precision floating point numbers. Both values are replaced on

-133- the stack by their single-precision floating point
product.

dmul

       Double float multiply
       Syntax:

*dmul = 107*

Stack:  ..., value1-word1, value1-word2,
       value2-word1, value2-word2 => ..., result-word1,
       result-word2
       value1 and value 2 must be double-precision
       floating point numbers. Both values are replaced on
       the stack by their double-precision floating point
       product.

idiv

Integer divide
       Syntax:

       *idiv = 108*

Stack:  ..., value1, value2 => ..., result
       value1 and value 2 must be integers. value1 is
       divided by value2, and both values are replaced on the
       stack by their integer quotient.
       The result is truncated to the nearest integer
       that is between it and 0. An attempt to divide by zero
       results in a "/ by zero" ArithmeticException being
       thrown.

   ldiv

Long integer divide
       Syntax:

*ldiv = 109*
       Stack:  ..., value1-word1, value1-word2,
       value2-word1, value2-word2 => ..., result-word1,

-134- result-word2 value1 and value 2 must be long integers. value1 is divided by value2, and both values are replaced on the stack by their long integer quotient.

The result is truncated to the nearest integer that is between it and 0. An attempt to divide by zero results in a "/ by zero" ArithmeticException being thrown.

fdiv

Single float divide
   Syntax:

| fdiv = 110 |

Stack:  ..., value1, value2 => ..., result
   value1 and value 2 must be single-precision floating point numbers. value1 is divided by value2, and both values are replaced on the stack by their single-precision floating point quotient.
   Divide by zero results in the quotient being NaN.

ddiv

Double float divide
   Syntax:

| ddiv = 111 |

Stack:  ..., value1-word1, value1-word2, value2-word1, value2-word2 => ..., result-word1, result-word2
   value1 and value 2 must be double-precision floating point numbers. value1 is divided by value2, and both values are replaced on the stack by their double-precision floating point quotient.
   Divide by zero results in the quotient being NaN.

irem

Integer remainder

Syntax:

> irem = 112

Stack: ..., value1, value2 => ..., result

value1 and value 2 must both be integers. value1 is divided by value2, and both values are replaced on the stack by their integer remainder.

An attempt to divide by zero results in a "/ by zero" ArithmeticException being thrown.

lrem

Long integer remainder
Syntax:

> lrem = 113

Stack: ..., value1-word1, value1-word2, value2-word1, value2-word2 => ..., result-word1, result-word2 value1 and value 2 must both be long integers.
value1 is divided by value2, and both values are replaced on the stack by their long integer remainder.

An attempt to divide by zero results in a "/ by zero" ArithmeticException being thrown.

frem

Single float remainder
Syntax:

> frem = 114

Stack: ..., value1, value2 => ..., result value1 and value 2 must both be single-precision floating point numbers. value1 is divided by value2, and the quotient is truncated to an integer, and then multiplied by value2. The product is subtracted from value1. The result, as a single-precision floating point number, replaces both values on the stack.
result = value1 - (integral_part(value1/value2)

-136-

*value2), where integral_part() rounds to the nearest integer, with a tie going to the even number.

An attempt to divide by zero results in NaN.

drem

Double float remainder

Syntax:

| drem = 115 |

Stack: ..., value1-word1, value1-word2, value2-word1, value2-word2 => ..., result-word1, result-word2 value1 and value 2 must both be double-precision floating point numbers. value1 is divided by value2, and the quotient is truncated to an integer, and then multiplied by value2. The product is subtracted from value1. The result, as a double-precision floating point number, replaces both values on the stack.
result = value1 - (integral_part(value1/value2) * value2), where integral_part() rounds to the nearest integer, with a tie going to the even number.

An attempt to divide by zero results in NaN.

ineg

Integer negate

Syntax:

| ineg = 116 |

Stack: ..., value => ..., result value must be an integer. It is replaced on the stack by its arithmetic negation.

lneg

Long integer negate

Syntax:

| lneg = 117 |

Stack: ..., value-word1, value-word2 => ...,
result-word1, result-word2 value must be a long integer. It is replaced on the stack by its arithmetic negation.

fneg

Single float negate
Syntax:

| fneg = 118 |

Stack: ..., value=> ..., result value must be a single-precision floating point number. It is replaced on the stack by its arithmetic negation.

dneg

Double float negate
Syntax:

| dneg = 119 |

Stack: ..., value-word1, value-word2 => ...,
result-word1, result-word2 value must be a double-precision floating point number. It is replaced on the stack by its arithmetic negation.

3.9 Logical Instructions ishl

Integer shift left
Syntax:

| ishl = 120 |

Stack: ...,value1, value2 => ..., result value1 and value 2 must be integers. value1 is shifted left by the amount indicated by the low five bits of value2. The integer result replaces both values on the stack.

ishr

Integer arithmetic shift right

Syntax:

| ishr = 122 |

Stack: ..., value1, value2 => ..., result value1 and value 2 must be integers. value1 is
shifted right arithmetically (with sign extension) by
the amount indicated by the low five bits of value2.
The integer result replaces both values on the stack.

iushr

Integer logical shift right
Syntax:

| iushr = 124 |

Stack: ..., value1, value2 => ..., result
value1 and value 2 must be integers. value1 is
shifted right logically (with no sign extension) by the
amount indicated by the low five bits of value2. The
integer result replaces both values on the stack.

lshl

Long integer shift left
Syntax:

| lshl = 121 |

Stack: ..., value1-word1, value1-word2, value2 =>
..., result-word1, result-word2 value1 must be a long integer and value 2 must be
an integer. value1 is shifted left by the amount
indicated by the low six bits of value2. The long
integer result replaces both values on the stack.

-139- lshr
   Long integer arithmetic shift right
   Syntax:

| lshr = 123 |

Stack:   ..., value1-word1, value1-word2, value2 => ..., result-word1, result-word2 value1 must be a long integer and value 2 must be an integer. value1 is shifted right arithmetically (with sign extension) by the amount indicated by the low six bits of value2. The long integer result replaces both values on the stack.

lushr
   Long integer logical shift right
   Syntax:

| lushr = 125 |

Stack:   ..., value1-word1, value1-word2, value2-word1, value2-word2 => ..., result-word1, result-word2 value1 must be a long integer and value 2 must be an integer. value1 is shifted right logically (with no sign extension) by the amount indicated by the low six bits of value2. The long integer result replaces both values on the stack.

iand
   Integer boolean AND
   Syntax:

| iand = 126 |

Stack:   ..., value1, value2 => ..., result
   value1 and value 2 must both be integers. They are replaced on the stack by their bitwise logical and (conjunction).

-140- land
    Long integer boolean AND
    Syntax:

| land = 127 |

Stack:   ..., value1-word1, value1-word2, value2-word1, value2-word2 => ..., result-word1, result-word2
    value1 and value 2 must both be long integers. They are replaced on the stack by their bitwise logical and (conjunction).

ior
    Integer boolean OR
    Syntax:

| ior = 128 |

Stack:   ..., value1, value2 => ..., result
    value1 and value 2 must both be integers. They are replaced on the stack by their bitwise logical or (disjunction).

lor
    Long integer boolean OR
    Syntax:

| lor = 129 |

Stack:   ..., value1-word1, value1-word2, value2-word1, value2-word2 => ..., result-word1, result-word2
    value1 and value 2 must both be long integers. They are replaced on the stack by their bitwise logical or (disjunction).

ixor
    Integer boolean XOR
    Syntax:

-141-

```
ixor = 130
```

Stack: ..., value1, value2 => ..., result value1 and value 2 must both be integers. They
are replaced on the stack by their bitwise exclusive or
(exclusive disjunction).

lxor

Long integer boolean XOR

Syntax:
```
lxor = 131
```

Stack: ..., **value1-word1, value1-word2,
value2-word1, value2-word2 => ..., result-word1,
result-word2** value1 and value 2 must both be long integers.
They are replaced on the stack by their bitwise
exclusive or (exclusive disjunction).

3.10 Conversion Operations i2l

Integer to long integer conversion

Syntax:
```
i2l = 133
```

Stack: ..., value => ..., **result-word1,
result-word2** value must be an integer. It is converted to a
long integer. The result replaces value on the stack.

i2f

Integer to single float

Syntax:
```
i2f = 134
```

Stack: ..., value => ..., result

-142- value must be an integer. It is converted to a single-precision floating point number. The result replaces value on the stack.

i2d

Integer to double float
Syntax:

| *i2d = 135* |

Stack:   ..., value => ..., result-word1, result-word2 value must be an integer. It is converted to a double-precision floating point number. The result replaces value on the stack.

l2i

Long integer to integer
Syntax:

| *l2i = 136* |

Stack:   ..., value-word1, value-word2 => ..., result value must be a long integer. It is converted to an integer by taking the low-order 32 bits. The result
replaces value on the stack.

l2f

Long integer to single float
Syntax:

| *l2f = 137* |

Stack:   ..., value-word1, value-word2 => ..., result value must be a long integer. It is converted to
a single-precision floating point number. The result replaces value on the stack.

-143- l2d
Long integer to double float
Syntax:

| l2d = 138 |

Stack: ..., value-word1, value-word2 => ...,
result-word1, result-word2 value must be a long integer. It is converted to a double-precision floating point number. The result replaces value on the stack.

f2i
Single float to integer
Syntax:

| f2i = 139 |

Stack: ..., value => ..., result value must be a single-precision floating point number. It is converted to an integer. The result replaces value on the stack.

f2l
Single float to long integer
Syntax:

| f2l = 140 |

Stack: ..., value => ..., result-word1, result-word2 value must be a single-precision floating point number. It is converted to a long integer. The result replaces value on the stack.

f2d
Single float to double float
Syntax:

| f2d = 141 |

-144-

Stack: ..., value => ..., result-word1, result-word2 value must be a single-precision floating point number. It is converted to a double-precision floating point number. The result replaces value on the stack.

d2i

Double float to integer
Syntax:

| 2di = 142 |

Stack: ..., value-word1, value-word2 => ..., result value must be a double-precision floating point number. It is converted to an integer. The result replaces value on the stack.

d2l

Double float to long integer
Syntax:

| d2l = 143 |

Stack: ..., value-word1, value-word2 => ..., result-word1, result-word2 value must be a double-precision floating point number. It is converted to a long integer. The result replaces value on the stack.

d2f

Double float to single float
Syntax:

| 2df = 144 |

Stack: ..., value-word1, value-word2 => ..., result value must be a double-precision floating point number. It is converted to a single-precision floating

-145- point number. If overflow occurs, the result must be
infinity with the same sign as value. The result
replaces value on the stack.

int2byte
Integer to signed byte
Syntax:

> int2byte = 157

Stack: ..., value => ..., result
value must be an integer. It is truncated to a
signed 8-bit result, then sign extended to an integer.
The result replaces value on the stack.

int2char
Integer to char
Syntax:

> int2char = 146

Stack: ..., value => ..., result
value must be an integer. It is truncated to an
unsigned 16-bit result, then zero extended to an
integer. The result replaces value on the stack.

int2short
Integer to short
Syntax:

> int2short = 147

Stack: ..., value => ..., result
value must be an integer. It is truncated to a
signed 16-bit result, then sign extended to an integer.
The result replaces value on the stack.

3.11 Control Transfer Instructions ifeq
Branch if equal to 0
Syntax:

| ifeq = 153 |
|---|
| branchbyte1 |
| branchbyte2 |

Stack: ..., value => ...
value must be an integer. It is popped from the stack. If value is zero, branchbyte1 and branchbyte2 are used to construct a signed 16-bit offset. Execution proceeds at that offset from the address of
this instruction. Otherwise execution proceeds at the instruction following the ifeq.

ifnull
Branch if null
Syntax:

| ifnull = 198 |
|---|
| branchbyte1 |
| branchbyte2 |

Stack: ..., value => ...
value must be a reference to an object. It is popped from the stack. If value is null, branchbyte1 and branchbyte2 are used to construct a signed 16-bit offset. Execution proceeds at that offset from the
address of this instruction. Otherwise execution proceeds at the instruction following the ifnull.

iflt
Branch if less than 0
Syntax:

| iflt = 155 |
|---|

-147-

| branchbyte1 |
|---|
| branchbyte2 |

Stack: ..., value => ...

value must be an integer. It is popped from the
stack. If value is less than zero, branchbyte1 and
branchbyte2 are used to construct a signed 16-bit
offset. Execution proceeds at that offset from the
address of this instruction. Otherwise execution
proceeds at the instruction following the iflt.

ifle

Branch if less than or equal to 0
Syntax:

| ifle=158 |
|---|
| branchbyte1 |
| branchbyte2 |

Stack: ..., value => ...

value must be an integer. It is popped from the
stack. If value is less than or equal to zero,
branchbyte1 and branchbyte2 are used to construct a
signed 16-bit offset. Execution proceeds at that
offset from the address of this instruction. Otherwise
execution proceeds at the instruction following the
ifle.

ifne

Branch if not equal to 0
Syntax:

| ifne=154 |
|---|
| branchbyte1 |
| branchbyte2 |

Stack: ..., value => ...
value must be an integer. It is popped from the

-148- stack. If value is not equal to zero, branchbyte1 and
branchbyte2 are used to construct a signed 16-bit
offset. Execution proceeds at that offset from the
address of this instruction. Otherwise execution
proceeds at the instruction following the ifne.

ifnonnull
Branch if not null
Syntax:

| ifnonnull=199 |
| branchbyte1 |
| branchbyte2 |

Stack: ..., value => ...
value must be a reference to an object. It is
popped from the stack. If value is notnull,
branchbyte1 and branchbyte2 are used to construct a
signed 16-bit offset. Execution proceeds at that
offset from the address of this instruction. Otherwise
execution proceeds at the instruction following the
ifnonnull.

ifgt
Branch if greater than 0
Syntax:

| ifft=157 |
| branchbyte1 |
| branchbyte2 |

Stack: ..., value => ...
value must be an integer. It is popped from the
stack. If value is greater than zero, branchbyte1 and
branchbyte2 are used to construct a signed 16-bit
offset. Execution proceeds at that offset from the
address of this instruction. Otherwise execution
proceeds at the instruction following the ifgt.

ifge
   Branch if greater than or equal to 0
   Syntax:

| ifge=156 |
   | branchbyte1 |
   | branchbyte2 |

Stack:   ..., value => ...
   value must be an integer.  It is popped from the stack.  If value is greater than or equal to zero, branchbyte1 and branchbyte2 are used to construct a signed 16-bit offset.  Execution proceeds at that offset from the address of this instruction.  Otherwise execution proceeds at the instruction following instruction ifge.

if_icmpeq
   Branch if integers equal
   Syntax:

| if_icmpeq=159 |
   | branchbyte1 |
   | branchbyte2 |

Stack:   ..., value1, value2 => ...
   value1 and value2 must be integers.  They are both popped from the stack.  If value1 is equal to value2, branchbyte1 and branchbyte2 are used to construct a signed 16-bit offset.  Execution proceeds at that offset from the address of this instruction.  Otherwise execution proceeds at the instruction following instruction if_icmpeq.

if_icmpne
   Branch if integers not equal
   Syntax:

| if_icmpne=160 |

|  |
| --- |
| branchbyte1 |
| branchbyte2 |

Stack: ..., value1, value2 => ...

value1 and value2 must be integers. They are both
popped from the stack. If value1 is not equal to
value2, branchbyte1 and branchbyte2 are used to
construct a signed 16-bit offset. Execution proceeds
at that offset from the address of this instruction.
Otherwise execution proceeds at the instruction
following instruction if_icmpne.

if_icmplt
    Branch if integer less than
     Syntax:

|  |
| --- |
| if_icmplt=161 |
| branchbyte1 |
| branchbyte2 |

      Stack: ..., value1, value2 => ...
    value1 and value2 must be integers. They are both
popped from the stack. If value1 is less than value2,
branchbyte1 and branchbyte2 are used to construct a
signed 16-bit offset. Execution proceeds at that
offset from the address of this instruction. Otherwise
execution proceeds at the instruction following
instruction if_icmplt.

if_icmpgt
      Branch if integer greater than
    Syntax:

|  |
| --- |
| if_icmpgt=163 |
| branchbyte1 |
| branchbyte2 |

    Stack: ..., value1, value2 => ...
    value1 and value2 must be integers. They are both popped from the stack. If value1 is greater than
value2, branchbyte1 and branchbyte2 are used to
construct a signed 16-bit offset. Execution proceeds
at that offset from the address of this instruction.
Otherwise execution proceeds at the instruction
following instruction if_icmpgt.

if_icmple
    Branch if integer less than or equal to
    Syntax:

| if_icmple=164 |
| branchbyte1 |
| branchbyte2 |

Stack: ..., value1, value2 => ...
value1 and value2 must be integers. They are both
popped from the stack. If value1 is less than or equal
to value2, branchbyte1 and branchbyte2 are used to
construct a signed 16-bit offset. Execution proceeds
at that offset from the address of this instruction.
Otherwise execution proceeds at the instruction
following instruction if_icmple.

if_icmpge
    Branch if integer greater than or equal to
    Syntax:

| if_icmpge=162 |
| branchbyte1 |
| branchbyte2 |

Stack: ..., value1, value2 => ...
value1 and value2 must be integers. They are both
popped from the stack. If value1 is greater than or
equal to value2, branchbyte1 and branchbyte2 are used
to construct a signed 16-bit offset. Execution
proceeds at that offset from the address of this instruction. Otherwise execution proceeds at the
instruction following instruction if_icmpge.
lcmp
Long integer compare
Syntax:

| lcmp=148 |

Stack: ..., value1-word1,
value1-word2, value2-word1, value2-word1 => ..., result
value1 and value2 must be long integers. They are
both popped from the stack and compared. If value1 is
greater than value2, the integer value1 is pushed onto
the stack. If value1 is equal to value2, the value 0
is pushed onto the stack. If value1 is less than
value2, the value -1 is pushed onto the stack.

fcmpl
Single float compare ( 1 on NaN)
Syntax:

| fcmpl=149 |

Stack: ..., value1, value2=> ...,result
value1 and value2 must be single-precision
floating point numbers. They are both popped from the
stack and compared. If value1 is greater than value2,
the integer value 1 is pushed onto the stack. If
value1 is equal to value2, the value 0 is pushed onto
the stack. If value1 is less than value2, the value -1
is pushed onto the stack.
If either value1 or value2 is NaN, the value -1 is
pushed onto the stack.

fcmpg
Single float compare (1 on NaN)
Syntax:

| fcmpg=150 |

-153-

Stack: ...,value1, value2=> ..., result value1 and value2 must be single-precision floating point numbers. They are both popped from the stack and compared. If value1 is greater than value2, the integer value 1 is pushed onto the stack. If value1 is equal to value2, the value 0 is pushed onto the stack. If value1 is less than value2, the value -1 is pushed onto the stack.

If either value1 or value2 is NaN, the value 1 is pushed onto the stack.

dcmpl

Double float compare (-1 on NaN)
Syntax:

| dcmpl-151 |

Stack: ..., value1-word1, value1-word2, value2-word1, value2-word1=> ..., result value1 and value2 must be double-precision floating point numbers. They are both popped from the stack and compared. If value1 is greater than value2, the integer value 1 is pushed onto the stack. If value1 is equal to value2, the value 0 is pushed onto the stack. If value1 is less than value2, the value 1 is pushed onto the stack.

If either value1 or value2 is NaN, the value 1 is pushed onto the stack.

dcmpg

Double float compare (1 on NaN)
Syntax:

| dcmpg=152 |

Stack: ..., value1-word1, value1-word2, value2-word1, value2-word1 => ..., result value1 and value2 must be double-precision floating point numbers. They are both popped from the

-154- stack and compared. If value1 is greater than value2, the integer value 1 is pushed onto the stack. If value1 is equal to value2, the value 0 is pushed onto the stack. If value1 is less than value2, the value -1 is pushed onto the stack.

If either value1 or value2 is NaN, the value 1 is pushed onto the stack.

if_acmpeq

Branch if object references are equal

Syntax:

| if_acmpeq=165 |
| branchbyte1 |
| branchbyte2 |

Stack: ...,value1,value2 => ...

value1 and value2 must be references to objects. They are both popped from the stack. If the objects referenced are not the same, branchbyte1 and branchbyte2 are used to construct a signed 16-bit offset.

Execution proceeds at that offset from the Address of this instruction. Otherwise execution proceeds at the instruction following the if_acmpeq.

if_acmpne

Branch if object references not equal

Syntax:

| if_acmpne=166 |
| branchbyte1 |
| branchbyte2 |

Stack: ..., value1, value2 => ...

value1 and value2 must be references to objects. They are both popped from the stack. If the objects referenced are not the same, branchbyte1 and branchbyte2 are used to construct a signed 16-bit

-155- offset.

Execution proceeds at that offset from the address of this instruction. Otherwise execution proceeds at the instruction following instruction if_acmpne.

goto

Branch always

Syntax:

| goto=167 |
|----------|
| branchbyte1 |
| branchbyte2 |

Stack: no change branchbyte1 and branchbyte2 are used to construct a signed 16-bit offset. Execution proceeds at that offset from the address of this instruction.

goto_w

Branch always (wide index)

Syntax:

| goto_w=200 |
|------------|
| branchbyte1 |
| branchbyte2 |
| branchbyte3 |
| branchbyte4 |

Stack: no change branchbyte1, branchbyte2, branchbyte3, and branchbyte4 are used to construct a signed 32-bit offset.

Execution proceeds at that offset from the address of this instruction.

jsr

Jump subroutine

Syntax:

| jsr=168 |
|---------|

-156-

|  |
|---|
| branchbyte1 |
| branchbyte2 |

Stack: ...=> ..., return-address branchbyte1 and branchbyte2 are used to construct a signed 16-bit offset. The address of the instruction immediately following the jsr is pushed onto the stack. Execution proceeds at the offset from the address of this instruction.

jsr_w

Jump subroutine (wide index)

Syntax:

|  |
|---|
| jsr_w=201 |
| branchbyte1 |
| branchbyte2 |
| branchbyte3 |
| branchbyte4 |

Stack: ...=> ..., return-address branchbyte1, branchbyte2, branchbyte3, and branchbyte4 are used to construct a signed 32-bit offset. The address of the instruction immediately following the jsr_w is pushed onto the stack. Execution proceeds at the offset from the address of this instruction.

ret

Return from subroutine

Syntax:

|  |
|---|
| ret=169 |
| vindex |

Stack: no change

Local variable vindex in the current JAVA frame must contain a return address. The contents of the local variable are written into the pc.

-157-

Note that jsr pushes the address onto the stack, and ret gets it out of a local variable. This asymmetry is intentional.

ret_w

Return from subroutine (wide index)

Syntax:

| ret_w=209 |
|---|
| vindexbyte1 |
| vindexbyte2 |

Stack: no change vindexbyte1 and vindexbyte2 are assembled into an unsigned 16-bit index to a local variable in the current JAVA frame. That local variable must contain a return address. The contents of the local variable are written into the pc. See the ret instruction for more information.

3.12 Function Return ireturn

Return integer from function

Syntax:

| ireturn=172 |
|---|

Stack: ..., value => [empty]

value must be an integer. The value value is pushed onto the stack of the previous execution environment. Any other values on the operand stack are discarded. The interpreter then returns control to its caller.

lreturn

Return long integer from function

Syntax:

| lreturn=173 |
|---|

-158-

Stack: ..., value-word1, value-word2 => [empty]
value must be a long integer. The value value is pushed onto the stack of the previous execution environment. Any other values on the operand stack are discarded. The interpreter then returns control to its caller.

freturn
Return single float from function
Syntax:

> freturn=174

Stack: ..., value=> [empty]
value must be a single-precision floating point number. The value value is pushed onto the stack of the previous execution environment. Any other values on the operand stack are discarded. The interpreter then returns control to its caller.

dreturn
Return double float from function
Syntax:

> dreturn=175

Stack: ..., value-word1, value-word2 => [empty]
value must be a double-precision floating point number. The value value is pushed onto the stack of the previous execution environment. Any other values on the operand stack are discarded. The interpreter then returns control to its caller.

areturn
Return object reference from function
Syntax:

> areturn=176

Stack: ..., value => [empty]

value must be a reference to an object. The value
value is pushed onto the stack of the previous
execution environment. Any other values on the operand
stack are discarded. The interpreter then returns
control to its caller.

return
Return (void) from procedure
Syntax:

| return=177 |
|---|

Stack: ...=> [empty]
All values on the operand stack are discarded.
The interpreter then returns control to its caller.

breakpoint
Stop and pass control to breakpoint handler
Syntax:

| breakpoint=202 |
|---|

Stack: no change

3.13 Table Jumping tableswitch
Access jump table by index and jump
Syntax:

| tableswitch=170 |
|---|
| ...0-3 byte pad... |
| default-offset1 |
| default-offset2 |
| default-offset3 |
| default-offset4 |
| low1 |
| low2 |
| low3 |

-160-

| |
|---|
| low4 |
| high1 |
| high2 |
| high3 |
| high4 |
| ...jump offsets... |

Stack: ..., index=> ...

tableswitch is a variable length instruction. Immediately after the tableswitch opcode, between zero and three 0's are inserted as padding so that the next byte begins at an address that is a multiple of four. After the padding follow a series of signed 4-byte quantities: default-offset, low, high, and then high-low+1 further signed 4-byte offsets. The high-low+1 signed 4-byte offsets are treated as a 0-based jump table.

The index must be an integer. If index is less than low or index is greater than high, then default-offset is added to the address of this instruction. Otherwise, low is subtracted from index, and the index-low'th element of the jump table is extracted, and added to the address of this instruction.

lookupswitch

Access jump table by key match and jump

Syntax:

| |
|---|
| lookupswitch=171 |
| ...0-3 byte pad.. |
| default-offset1 |
| default-offset2 |
| default-offset3 |
| default-offset4 |
| npairs1 |

| |
|---|
| npairs2 |
| npairs3 |
| npairs4 |
| ...match-offset pairs... |

Stack: ..., key=> ...

lookupswitch is a variable length instruction. Immediately after the lookupswitch opcode, between zero and three 0's are inserted as padding so that the next byte begins at an address that is a multiple of four.

Immediately after the padding are a series of pairs of signed 4-byte quantities. The first pair is special. The first item of that pair is the default offset, and the second item of that pair gives the number of pairs that follow. Each subsequent pair consists of a match and an offset.

The key must be an integer. The integer key on the stack is compared against each of the matches. If it is equal to one of them, the offset is added to the address of this instruction. If the key does not match any of the matches, the default offset is added to the address of this instruction.

3.14 Manipulating Object Fields putfield

Set field in object
    Syntax:

| |
|---|
| putfield=181 |
| indexbyte1 |
| indexbyte2 |

Stack: ..., objectref, value=> ...
    OR
Stack: ..., objectref, value-word1, value-word2=> ...

indexbyte1 and indexbyte2 are used to construct an index into the constant pool of the current class. The
constant pool item will be a field reference to a class
name and a field name. The item is resolved to a field
block pointer which has both the field width (in bytes)
and the field offset (in bytes).

The field at that offset from the start of the
object referenced by objectref will be set to the value
on the top of the stack.

This instruction deals with both 32-bit and 64-bit
wide fields.

If object ref is null, aNullPointerException is
generated.

If the specified field is a static field,
anIncompatibleClassChangeError is thrown.

getfield
Fetch field from object
Syntax:

| getfield=180 |
| indexbyte1 |
| indexbyte2 |

Stack:   ..., objectref=> ...,value
    OR
Stack:   ..., objectref=> ..., value-word1, value-word2 indexbyte1 and indexbyte2 are used to construct an
index into the constant pool of the current class. The
constant pool item will be a field reference to a class
name and a field name. The item is resolved to a field
block pointer which has both the field width (in bytes)
and the field offset (in bytes).

objectref must be a reference to an object. The
value at offset into the object referenced by objectref
replaces objectref on the top of the stack.

This instruction deals with both 32-bit and 64-bit
wide fields.

-163-

If objectref is null, a NullPointerException is generated.
If the specified field is a static field, an IncompatibleClassChangeError is thrown.

putstatic
Set static field in class
Syntax:

| putstatic=179 |
|---|
| indexbyte1 |
| indexbyte2 |

Stack: ..., value=> ...
   OR
Stack: ..., value-word1, value-word2=> ...

indexbyte1 and indexbyte2 are used to construct an index into the constant pool of the current class. The constant pool item will be a field reference to a static field of a class. That field will be set to have the value on the top of the stack.

This instruction works for both 32-bit and 64-bit wide fields.

If the specified field is a dynamic field, an IncompatibleClassChangeError is thrown.

getstatic
Get static field from class
Syntax:

| getstatic=178 |
|---|
| indexbyte1 |
| indexbyte2 |

Stack: ..., => ..., value
   OR
Stack: ..., => ..., value-word1, value-word2

-164- indexbyte1 and indexbyte2 are used to construct an index into the constant pool of the current class. The constant pool item will be a field reference to a static field of a class.

This instruction deals with both 32-bit and 64-bit wide fields.

If the specified field is a dynamic field, an IncompatibleClassChangeError is generated.

3.15 Method Invocation

There are four instructions that implement method invocation.

| | |
|---|---|
| invokevirtual | Invoke an instance method of an object, dispatching based on the runtime (virtual) type of the object. This is the normal method dispatch in JAVA. |
| invokenonvirtual | Invoke an instance method of an object, dispatching based on the compile-time (non-virtual) type of the object. This is used, for example, when the keywordsuper or the name of a superclass is used as a method qualifier. |
| invokestatic | Invoke a class (static) method in a named class. |
| invokeinterface | Invoke a method which is implemented by an interface, searching the methods implemented by the particular run-time object to find the appropriate method. | invokevirtual

Invoke instance method, dispatch based on run-time type

Syntax:

| invokevirtual=182 |
|---|

-165-

|  |
|---|
| indexbyte1 |
| indexbyte2 |

Stack: ..., objectref, [arg1, [arg2 ...]], ...=>
...

The operand stack must contain a reference to an object and some number of arguments. indexbyte1 and indexbyte2 are used to construct an index into the constant pool of the current class. The item at that index in the constant pool contains the complete method signature. A pointer to the object's method table is retrieved from the object reference. The method signature is looked up in the method table. The method signature is guaranteed to exactly match one of the method signatures in the table.

The result of the lookup is an index into the method table of the named class, which is used with the object's dynamic type to look in the method table of that type, where a pointer to the method block for the matched method is found. The method block indicates the type of method (native, synchronized, and so on) and the number of arguments expected on the operand stack.

If the method is marked synchronized the monitor associated with objectref is entered.

The objectref and arguments are popped off this method's stack and become the initial values of the local variables of the new method. Execution continues with the first instruction of the new method.

If the object reference on the operand stack is null, a NullPointerException is thrown. If during the method invocation a stack overflow is detected, a StackOverflowError is thrown.

invokenonvirtual

Invoke instance method, dispatching based on

-166- compile-time type
Syntax:

| invokenonvirtual = 183 |
|---|
| indexbyte1 |
| indexbyte2 |

Stack: ..., objectref, [arg1, [arg2 ...]], ... =>
...

The operand stack must contain a reference to an object and some number of arguments. indexbyte1 and indexbyte2 are used to construct an index into the constant pool of the current class. The item at that index in the constant pool contains a complete method signature and class. The method signature is looked up in the method table of the class indicated. The method signature is guaranteed to exactly match one of the method signatures in the table.

The result of the lookup is a method block. The method block indicates the type of method (native, synchronized, and so on) and the number of arguments (nargs) expected on the operand stack.

If the method is marked synchronized the monitor associated with objectref is entered.

The objectref and arguments are popped off this method's stack and become the initial values of the local variables of the new method. Execution continues with the first instruction of the new method.

If the object reference on the operand stack is null, a NullPointerException is thrown. If during the method invocation a stack overflow is detected, a StackOverflowError is thrown.

invokestatic

Invoke a class (static) method
Syntax:

| invokestatis = 184 |
|---|

-167-

| indexbyte1 |
|---|
| indexbyte2 |

Stack: ..., [arg1, [arg2 ...]], ... => ...

The operand stack must contain some number of arguments. indexbyte1 and indexbyte2 are used to construct an index into the constant pool of the current class. The item at that index in the constant pool contains the complete method signature and class. The method signature is looked up in the method table of the class indicated. The method signature is guaranteed to exactly match one of the method signatures in the class's method table.

The result of the lookup is a method block. The method block indicates the type of method (native, synchronized, and so on) and the number of arguments (nargs) expected on the operand stack.

If the method is marked synchronized the monitor associated with the class is entered.

The arguments are popped off this method's stack and become the initial values of the local variables of the new method. Execution continues with the first instruction of the new method.

If during the method invocation a stack overflow is detected, a StackOverflowError is thrown.

invokeinterface

Invoke interface method

Syntax:

| invokeinterface = 185 |
|---|
| indexbyte1 |
| indexbyte2 |
| nargs |
| reserved |

Stack: ..., objectref, [arg1, [arg2 ...]], ... => ...

The operand stack must contain a reference to an object and nargs-1 arguments. indexbyte1 and indexbyte2 are used to construct an index into the constant pool of the current class. The item at that
index in the constant pool contains the complete method signature. A pointer to the object's method table is retrieved from the object reference. The method signature is looked up in the method table. The method signature is guaranteed to exactly match one of the
method signatures in the table.

The result of the lookup is a method block. The method block indicates the type of method (native, synchronized, and so on) but unlike invokevirtual and invokenonvirtual, the number of available arguments
(nargs) is taken from the bytecode.

If the method is markedsynchronized the monitor associated with objectref is entered.

The objectref and arguments are popped off this method's stack and become the initial values of the
local variables of the new method. Execution continues with the first instruction of the new method.

If the objectref on the operand stack is null, a NullPointerException is thrown. If during the method invocation a stack overflow is detected, a
StackOverflowError is thrown.

3.16 Exception Handling athrow
        Throw exception or error
        Syntax:

| athrow = 191 |

Stack:   ..., objectref => [undefined]
objectref must be a reference to an object which is a subclass of Throwable, which is thrown. The current JAVA stack frame is searched for the most

-169- recent catch clause that catches this class or a
superclass of this class. If a matching catch list
entry is found, the pc is reset to the address
indicated by the catch-list entry, and execution
continues there.

If no appropriate catch clause is found in the
current stack frame, that frame is popped and the
object is rethrown. If one is found, it contains the
location of the code for this exception. The pc is
reset to that location and execution continues. If no
appropriate catch is found in the current stack frame,
that frame is popped and the objectref is rethrown.

If objectref is null, then a NullPointerException
is thrown instead.

3.17 Miscellaneous Object Operations new

Create new object

Syntax:

| new = 187 |
| indexbyte1 |
| indexbyte2 |

Stack: ... => ..., objectref indexbyte1 and indexbyte2 are used to construct an
index into the constant pool of the current class. The
item at that index must be a class name that can be
resolved to a class pointer, class. A new instance of
that class is then created and a reference to the
object is pushed on the stack.

checkcast

Make sure object is of given type

Syntax:

| checkcast = 192 |
|---|
| indexbyte1 |
| indexbyte2 |

Stack: ..., objectref => ..., objectref indexbyte1 and indexbyte2 are used to construct an index into the constant pool of the current class. The string at that index of the constant pool is presumed to be a class name which can be resolved to a class pointer, class. objectref must be a reference to an object.

checkcast determines whether objectref can be cast to be a reference to an object of class class. A null objectref can be cast to any class. Otherwise the referenced object must be an instance of class or one of its superclasses. If objectref can be cast to class execution proceeds at the next instruction, and the objectref remains on the stack.

If objectref cannot be cast to class, a ClassCastException is thrown.

instanceof

Determine if an object is of given type

Syntax:

| instanceof = 193 |
|---|
| indexbyte1 |
| indexbyte2 |

Stack: ..., objectref => ..., result indexbyte1 and indexbyte2 are used to construct an index into the constant pool of the current class. The string at that index of the constant pool is presumed to be a class name which can be resolved to a class pointer, class. objectref must be a reference to an object.

instanceof determines whether objectref can be cast to be a reference to an object of the class class.
This instruction will overwrite objectref with 1 if
objectref is an instance of class or one of its
superclasses. Otherwise, objectref is overwritten by
0. If objectref is null, it's overwritten by 0.

3.18 Monitors monitorenter
   Enter monitored region of code
   Syntax:

| monitorenter = 194 |

Stack:  ..., objectref => ...
   objectref must be a reference to an object.
   The interpreter attempts to obtain exclusive
access via a lock mechanism to objectref. If another
thread already has objectref locked, than the current
thread waits until the object is unlocked. If the
current thread already has the object locked, then
continue execution. If the object is not locked, then
obtain an exclusive lock.
   If objectref is null, then a NullPointerException
is thrown instead.

monitorexit
   Exit monitored region of code
   Syntax:

| monitorexit = 195 |

Stack:  ..., objectref => ...
   objectref must be a reference to an object. The
lock on the object released. If this is the last lock
that this thread has on that object (one thread is
allowed to have multiple locks on a single object),
then other threads that are waiting for the object to
be available are allowed to proceed.

-172-

If objectref is null, then a NullPointerException is thrown instead.

Appendix A: An Optimization

The following set of pseudo-instructions suffixed by _quick are variants of JAVA virtual machine instructions. They are used to improve the speed of interpreting bytecodes. They are not part of the virtual machine specification or instruction set, and are invisible outside of an JAVA virtual machine implementation. However, inside a virtual machine implementation they have proven to be an effective optimization.

A compiler from JAVA source code to the JAVA virtual machine instruction set emits only non-_quick instructions. If the _quick pseudo-instructions are used, each instance of a non-_quick instruction with a _quick variant is overwritten on execution by its_quick variant. Subsequent execution of that instruction instance will be of the_quick variant.

In all cases, if an instruction has an alternative version with the suffix_quick, the instruction references the constant pool. If the_quick optimization is used, each non-_quick instruction with a_quick variant performs the following:

Resolves the specified item in the constant pool;

Signals an error if the item in the constant pool could not be resolved for some reason;

Turns itself into the _quick version of the instruction. The instructions putstatic, getstatic, putfield, and getfield each have two _quick versions; and Performs its intended operation.

This is identical to the action of the instruction without the _quick optimization, except for the additional step in which the instruction overwrites itself with its _quick variant.

The _quick variant of an instruction assumes that the item in the constant pool has already been resolved, and that this resolution did not generate any errors. It simply performs the intended operation on the resolved item.

Note: some of the invoke methods only support a single-byte offset into the method table of the object; for objects with 256 or more methods some invocations cannot be "quicked" with only these bytecodes.

This Appendix doesn't give the opcode values of the pseudo-instructions, since they are invisible and subject to change.

A.1 Constant Pool Resolution

When the class is read in, an array constant_pool [] of size n constants is created and assigned to a field in the class.constant_pool [0] is set to point to a dynamically allocated array which indicates which fields in the constant_pool have already been resolved.constant_pool [1] through constant_pool [nconstants - 1] are set to point at the "type" field that corresponds to this constant item.

When an instruction is executed that references the constant pool, an index is generated, and constant_pool[0] is checked to see if the index has already been resolved. If so, the value of constant_pool [index] is returned. If not, the value of constant_pool [index] is resolved to be the actual pointer or data, and overwrites whatever value was already in constant_pool [index].

A.2 Pushing Constants onto the Stack (_quick variants)

ldc1_quick

Push item from constant pool onto stack
Syntax:

| ldc1_quick |
|---|
| indexbyte1 |

Stack:    ...=>...,item indexbyte1 is used as an unsigned 8-bit index into the constant pool of the current class. The item at that index is pushed onto the stack.

ldc2_quick
Push item from constant pool onto stack
Syntax:

| ldc2_quick |
|---|
| indexbyte1 |
| indexbyte2 |

Stack:    ...=>...,item indexbyte1 and indexbyte2 are used to construct an index into the constant pool of the current class. The constant at that index is resolved and the item at that index is pushed onto the stack.

ldc2w_quick
Push long integer or double float from constant pool onto stack
Syntax:

| ldc2w_quick |
|---|
| indexbyte1 |
| indexbyte2 |

Stack:    ...=>...,constant-word1,constant-word2 indexbyte1 and indexbyte2 are used to construct an index into the constant pool of the current class. The constant at that index is pushed onto the stack.

A.3 Managing Arrays (_quick variants)

anewarray_quick

Allocate new array of references to objects

Syntax:

| anewarray_quick |
|---|
| indexbyte1 |
| indexbyte2 |

Stack: ...,size=>result size must be an integer. It represents the number of elements in the new array.

indexbyte1 and indexbyte2 are used to construct an index into the constant pool of the current class. The entry must be a class.

A new array of the indicated class type and capable of holding size elements is allocated, and result is a reference to this new array. Allocation of an array large enough to contain size items of the given class type is attempted. All elements of the array are initialized to zero.

If size is less than zero, a NegativeArraySizeException is thrown. If there is not enough memory to allocate the array, an OutOfMemoryError is thrown.

multianewarray_quick

Allocate new multi-dimensional array

Syntax:

| multianewarray_quick |
|---|
| indexbyte1 |
| indexbyte2 |
| dimensions |

Stack: ...,size1,size2,...sizen=>result

Each size must be an integer. Each represents the number of elements in a dimension of the array.

indexbyte1 and indexbyte2 are used to construct an index into the constant pool of the current class. The resulting entry must be a class.

dimensions has the following aspects:

It must be an integer ≥1.

It represents the number of dimensions being created. It must be ≤ the number of dimensions of the array class.

It represents the number of elements that are popped off the stack. All must be integers greater than or equal to zero. These are used as the sizes of the dimension.

If any of the size arguments on the stack is less than zero, a NegativeArraySizeException is thrown. If there is not enough memory to allocate the array, an OutOfMemoryError is thrown.

The result is a reference to the new array object.

A.4 Manipulating Object Fields (_quick variants)

putfield_quick

Set field in object

Syntax:

| putfield2_quick |
| --- |
| offset |
| unused |

Stack: ...,objectref,value=>...

30     objectref must be a reference to an object. value must be a value of a type appropriate for the specified field. offset is the offset for the field in that object. value is written at offset into the object. Both objectref and value are popped from the stack.

If objectref is null, a NullPointerException is generated.

putfield2_quick
Set long integer or double float field in object
Syntax:

| putfield2_quick |
|---|
| offset |
| unused |

Stack: ...,objectref,value-word1,value-word2=>...

objectref must be a reference to an object. value must be a value of a type appropriate for the specified field. offset is the offset for the field in that object. value is written at offset into the object. Both objectref and value are popped from the stack.

If objectref is null, a NullPointerException is generated.

getfield_quick
Fetch field from object
Syntax:

| getfield2_quick |
|---|
| offset |
| unused |

Stack: ...,objectref=>...,value objectref must be a handle to an object. The value at offset into the object referenced by objectref replaces objectref on the top of the stack.

If objectref is null, a NullPointerException is generated.

getfield2_quick
Fetch field from object
Syntax:

| getfield2_quick |
|---|
| offset |
| unused |

Stack: ...,objectref=>...,value-word1,value-word2 objectref must be a handle to an object. The value at offset into the object referenced by objectref replaces objectref on the top of the stack.

If objectref is null, a NullPointerException is generated.

putstatic_quick

Set static field in class

Syntax:

| putstatic_quick |
| indexbyte1 |
| indexbyte2 |

Stack: ...,value=>...

indexbyte1 and indexbyte2 are used to construct an index into the constant pool of the current class. The constant pool item will be a field reference to a static field of a class.value must be the type appropriate to that field. That field will be set to have the value value.

putstatic2_quick

Set static field in class

Syntax:

| putstatic2_quick |
| indexbyte1 |
| indexbyte2 |

Stack: ...,value-word1,value-word2=>...

indexbyte1 and indexbyte2 are used to construct an index into the constant pool of the current class. The constant pool item will be a field reference to a static field of a class. That field must either be a long integer or a double precision floating point number. value must be the type appropriate to that field.  That field will be set to have the value value.

getstatic_quick
    Get static field from class
    Syntax:

| getstatic_quick |
| indexbyte1 |
| indexbyte2 |

Stack:   ...,=>...,value
    indexbyte1 and indexbyte2 are used to construct an index into the constant pool of the current class.  The constant pool item will be a field reference to a static field of a class.  The value of that field will replace handle on the stack.

getstatic2_quick
    Get static field from class
    Syntax:

| getstatic2_quick |
| indexbyte1 |
| indexbyte2 |

Stack:   ...,=>...,value-word1,value-word2
    indexbyte1 and indexbyte2 are used to construct an index into the constant pool of the current class.  The constant pool item will be a field reference to a static field of a class.  The field must be a long integer or a double precision floating point number.  The value of that field will replace handle on the stack

A.5  Method Invocation (_quick variants)

invokevirtual_quick

Invoke instance method, dispatching based on
run-time type
Syntax:

| invokevirtual_quick |
|---|
| offset |
| nargs |

Stack: ...,objectref,[arg1,[arg2...]]=>...

The operand stack must contain objectref, a reference to an object and nargs-1 arguments. The method block at offset in the object's method table, as determined by the object's dynamic type, is retrieved. The method block indicates the type of method (native, synchronized, etc.).

If the method is marked synchronized the monitor associated with the object is entered.

The base of the local variables array for the new JAVA stack frame is set to point to objectref on the stack, making objectref and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokevirtualobject_quick

Invoke instance method of class JAVA.lang.Object, specifically for benefit of arrays Syntax:

| invokevirtualobject_quick |
|---|
| offset |
| nargs |

Stack: ...,objectref,[arg1,[arg2...]]=>...

The operand stack must contain objectref, a reference to an object or to an array and nargs-1 arguments. The method block at offset in JAVA.lang.Object's method table is retrieved. The method block indicates the type of method (native, synchronized, etc.).

If the method is marked synchronized the monitor associated with handle is entered.

The base of the local variables array for the new JAVA stack frame is set to point to objectref on the stack, making objectref and the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokenonvirtual_quick

Invoke instance method, dispatching based on compile-time type

-182-

Syntax:

| invokenonvirtual_quick |
|---|
| indexbyte1 |
| indexbyte2 |

Stack: ...,objectref,[arg1,[arg2...]]=>...

The operand stack must contain objectref, a reference to an object and some number of arguments. indexbyte1 and indexbyte2 are used to construct an index into the constant pool of the current class. The item at that index in the constant pool contains a method slot index and a pointer to a class. The method block at the method slot index in the indicated class is retrieved. The method block indicates the type of method (native, synchronized, etc.) and the number of arguments (nargs) expected on the operand stack.

If the method is marked synchronized the monitor associated with the object is entered.

The base of the local variables array for the new JAVA stack frame is set to point to objectref on the stack, making objectref and the supplied arguments (arg1, arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If objectref is null, a NullPointerException is thrown. If during the method invocation a stack overflow is detected, a StackOverflowError is thrown.

invokestatic_quick

Invoke a class (static) method

-183-

Syntax:

| invokestatic_quick |
| --- |
| indexbyte1 |
| indexbyte2 |

Stack: ..., [arg1, [arg2...]] =>...

The operand stack must contain some number of arguments. indexbyte1 and indexbyte2 are used to construct an index into the constant pool of the current class. The item at that index in the constant pool contains a method slot index and a pointer to a class. The method block at the method slot index in the indicated class is retrieved. The method block indicates the type of method (native, synchronized, etc.) and the number of arguments (nargs) expected on the operand stack.

If the method is marked synchronized the monitor associated with the method's class is entered.

The base of the local variables array for the new JAVA stack frame is set to point to the first argument on the stack, making the supplied arguments (arg1,arg2,...) the first nargs local variables of the new frame. The total number of local variables used by the method is determined, and the execution environment of the new frame is pushed after leaving sufficient room for the locals. The base of the operand stack for this method invocation is set to the first word after the execution environment. Finally, execution continues with the first instruction of the matched method.

If the object handle on the operand stack is null, a NullPointerException is thrown. If during the method invocation a stack overflow is detected, a StackOverflowError is thrown.

invokeinterface_quick

Invoke interface method
Syntax:

| invokeinterface_quick |
|---|
| idbyte1 |
| idbyte2 |
| nargs |
| guess |

Stack: ...,objectref,[arg1,[arg2...]]=>...

The operand stack must contain objectref, a reference to an object, and nargs-1 arguments. idbyte1 and idbyte2 are used to construct an index into the constant pool of the current class. The item at that index in the constant pool contains the complete method signature. A pointer to the object's method table is retrieved from the object handle.

The method signature is searched for in the object's method table. As a short-cut, the method signature at slot guess is searched first. If that fails, a complete search of the method table is performed. The method signature is guaranteed to exactly match one of the method signatures in the table.

The result of the lookup is a method block. The method block indicates the type of method (native, synchronized, etc.) but the number of available arguments (nargs) is taken from the bytecode.

If the method is marked synchronized the monitor associated with handle is entered.

The base of the local variables array for the new JAVA stack frame is set to point to handle on the stack, making handle and the supplied arguments (arg1,arg2,...) the first nargs local variables of the new frame. The total number of local variables used by the method is determined, and the execution environment of the new frame is pushed after leaving sufficient

-185- room for the locals. The base of the operand stack for
this method invocation is set to the first word after
the execution environment. Finally, execution
continues with the first instruction of the matched
method.

If objectref is null, a NullPointerException is
thrown. If during the method invocation a stack
overflow is detected, a StackOverflowError is thrown.

guess is the last guess. Each time through, guess
is set to the method offset that was used.

A.6 Miscellaneous Object Operations (_quick variants)

new_quick

Create new object

Syntax:

| new_quick |
|---|
| indexbyte1 |
| indexbyte2 |

Stack: ...=>...,objectref indexbyte1 and indexbyte2 are used to construct an
index into the constant pool of the current class. The
item at that index must be a class. A new instance of
that class is then created and objectref, a reference
to that object is pushed on the stack.

checkcast_quick

Make sure object is of given type

Syntax:

| checkcast_quick |
|---|
| indexbyte1 |
| indexbyte2 |

Stack: ...,objectref=>...,objectref objectref must be a reference to an object.
indexbyte1 and indexbyte2 are used to construct an
index into the constant pool of the current class. The
object at that index of the constant pool must have
already been resolved.

checkcast then determines whether objectref can be
cast to a reference to an object of class class. A
null reference can be cast to any class, and otherwise
the superclasses of objectref's type are searched for
class. If class is determined to be a superclass of
objectref's type, or if objectref is null, it can be
cast to objectref cannot be cast to class, a
ClassCastException is thrown.

instanceof_quick

Determine if object is of given type

Syntax:

| instanceof_quick |
| --- |
| indexbyte1 |
| indexbyte2 |

Stack: ...,objectref=>...,result objectref must be a reference to an object.
indexbyte1 and indexbyte2 are used to construct an
index into the constant pool of the current class. The
item of class class at that index of the constant pool
must have already been resolved.

Instance of determines whether objectref can be
cast to an object of the class class. A null objectref
can be cast to any class, and otherwise the
superclasses of objectref's type are searched for
class. If class is determined to be a superclass of
objectref's type, result is 1 (true). Otherwise,
result is 0 (false). If handle is null, result is 0
(false).

-187-

We claim:

1. In a processor having a stack, a stack cache management unit for caching said stack comprising:
   a stack cache having a stack cache memory circuit coupled to said stack, said stack cache memory circuit having a plurality of memory locations;
   a cache bottom pointer pointing to and defining a bottom memory location within said stack cache memory circuit;
   a spill control unit coupled to transfer a first data word stored in said bottom memory location from said stack cache to said stack; and
   a fill control unit coupled to transfer a second data word from said stack to said bottom memory location or a memory location adjacent said bottom memory location.

2. The stack cache management unit of claim 1, wherein said stack cache further comprises:
   a first read port coupled between said stack cache memory circuit and said stack, wherein said spill control unit controls said first read port; and
   a first write port coupled between said stack cache memory circuit and said stack, wherein said fill control unit controls said first write port.

3. The stack cache management unit of claim 2, further comprising an optop pointer pointing to and defining a top memory location of said stack cache memory circuit.

4. The stack cache management unit of claim 3, further comprising a stack cache status circuit coupled to receive said optop pointer and said cache bottom pointer, said stack cache status circuit configured to calculate a number of free memory locations in said stack cache memory circuit.

5. The stack cache management unit of claim 4, wherein said spill control unit transfers said first data word only if said number of free memory locations is less than a cache high threshold.

6. The stack cache management unit of claim 5, wherein said spill control unit comprises:
   a programmable register containing said cache high threshold; and
   a comparator coupled to said stack cache status circuit and said programmable register.

7. The stack cache management unit of claim 4, wherein said fill control unit transfers said second data word only if said number of free memory locations is greater than a cache low threshold.

8. The stack cache management unit of claim 7, wherein said fill control unit comprises:
   a programmable register containing said cache low threshold; and
   a comparator coupled to said stack cache status circuit and said programmable register.

9. The stack cache management unit of claim 3, wherein said spill control unit transfers said first data word only if said optop pointer is greater than a high water mark.

10. The stack cache management unit of claim 9, wherein said spill control unit comprises:
    a programmable register containing said high water mark; and
    a comparator coupled to said stack cache status circuit and said programmable register.

11. The stack cache management unit of claim 3, wherein said fill control unit transfers said second data word only if said optop pointer is less than a low water mark.

12. The stack cache management unit of claim 11, wherein said spill control unit comprises:
    a programmable register configured to contain said low water mark; and
    a comparator coupled to said stack cache status circuit and said programmable register.

13. The stack cache management unit of claim 1, wherein said stack cache memory circuit is organized as a circular buffer.

14. The stack cache management unit of claim 1, wherein said first data word and said second data word are the same data word.

15. In a processor having a stack, a stack cache management unit for caching said stack comprising:
    a stack cache having a stack cache memory circuit coupled to said stack, said stack cache memory circuit having a plurality of memory locations;
    a cache bottom pointer pointing to and defining a bottom memory location within said stack cache memory circuit;
    a spill control unit coupled to transfer a first data word stored in said bottom memory location from said stack cache to said stack;
    a fill control unit coupled to transfer a second data word from said stack to said bottom memory location or a memory location adjacent said bottom memory location;
    a first read port coupled between said stack cache memory circuit and said stack, wherein said spill control unit controls said first read port;
    a first write port coupled between said stack cache memory circuit and said stack, wherein said fill control unit controls said first write port;
    a second read port coupled to said stack cache memory circuit;
    a third read port coupled to said stack cache memory circuit; and
    a second write port coupled to said stack cache memory circuit; and
    a stack control unit configured to control said second read port, said third read port and said second write port.

16. The stack cache management unit of claim 15 wherein said stack is for a JAVA virtual machine.

17. The stack cache management unit of claim 15, wherein each of said memory locations comprises:
    a valid bit;
    a saved bit; and
    a data section.

18. The stack cache management unit of claim 17, wherein said spill control unit sets said saved bit of said bottom memory location to a saved logic state if said first data word is transferred to said stack.

19. The stack cache management unit of claim 17, wherein said fill control unit sets said valid bit of said memory location preceding said bottom memory location if said second data word is transferred from said stack.

20. In a processor, a method for caching a stack in a stack cache having a plurality of memory locations, an optop pointer pointed at a top memory location of said stack cache, and a bottom pointer pointed at a bottom memory location of said stack cache, said method comprising:
    writing a new data word for said stack at said optop memory location;
    incrementing said optop pointer;
    spilling a first data word from said stack cache to said stack if a spill condition exists; and filling a second data word from said stack to said stack cache if a fill condition exists wherein said filling a second data word from said stack to said stack cache comprises:
decrementing said bottom pointer; and
transferring said second data word from said stack to said bottom memory location, or to a memory location preceding said bottom memory location.

21. The method of claim 20, further comprising:
reading a stacked data word from said stack cache at said top memory location; and
decrementing said optop pointer.

22. A method for caching a stack in a stack cache having a plurality of memory locations, an optop pointer pointed at a top memory location of said stack cache, and a bottom pointer pointed at a bottom memory location of said stack cache, said method comprising:
writing a new data word for said stack at said optop memory location;
incrementing said optop pointer;
spilling a first data word from said stack cache to said stack if a spill condition exists;
filling a second data word from said stack to said stack cache if a fill condition exists;
reading a first stacked data word from said stack cache at said top memory location; and
reading a second stacked data word from said stack cache at a memory location preceding said top memory location; and
decrementing said optop pointer by two.

23. A method for caching a stack in a stack cache having a plurality of memory locations, an optop pointer pointed at a top memory location of said stack cache, and a bottom pointer pointed at a bottom memory location of said stack cache, said method comprising:
writing a new data word for said stack at said optop memory location;
incrementing said optop pointer;
spilling a first data word from said stack cache to said stack if a spill condition exists; and
filling a second data word from said stack to said stack cache if a fill condition exists and;
determining if said spill condition exists wherein said determining if said spill condition exists comprises:
calculating a number of free memory locations; and
comparing said number of free memory locations to a high cache threshold.

24. A method for caching a stack in a stack cache having a plurality of memory locations, an optop pointer pointed at a top memory location of said stack cache, and a bottom pointer pointed at a bottom memory location of said stack cache, said method comprising:
writing a new data word for said stack at said optop memory location;
incrementing said optop pointer;
spilling a first data word from said stack cache to said stack if a spill condition exists;
filling a second data word from said stack to said stack cache if a fill condition exists;
determining if said spill condition exists wherein said determining if said spill condition exists comprises:
comparing said optop pointer to a high water mark;
incrementing said high water mark if said spill condition exists; and
decrementing said high water mark if said fill condition exists;
determining if said fill condition exists wherein said determining if said fill condition exists comprises:
comparing said optop pointer to a low water mark;
incrementing said low water mark if said spill condition exists; and
decrementing said low water mark if said fill condition exists.

25. A method for caching a stack in a stack cache having a plurality of memory locations, an optop pointer pointed at a top memory location of said stack cache, and a bottom pointer pointed at a bottom memory location of said stack cache, said method comprising:
writing a new data word for said stack at said optop memory location;
incrementing said optop pointer;
spilling a first data word from said stack cache to said stack if a spill condition exists; and
filling a second data word from said stack to said stack cache if a fill condition exists and;
determining if said fill condition exists wherein said determining if said fill condition exists includes:
calculating a number of used memory locations; and
comparing said number of used memory locations to a low cache threshold.

26. A method for caching a stack in a stack cache having a plurality of memory locations, an optop pointer pointed at a top memory location of said stack cache, and a bottom pointer pointed at a bottom memory location of said stack cache, said method comprising:
writing a new data word for said stack at said optop memory location;
incrementing said optop pointer;
spilling a first data word from said stack cache to said stack if a spill condition exists; and
filling a second data word from said stack to said stack cache if a fill condition exists and;
determining if said fill condition exists wherein said determining if said fill condition exists comprises:
comparing said optop pointer to a low water mark;
incrementing said low water mark if said spill condition exists; and
decrementing said low water mark if said fill condition exists.

* * * * *